US011869514B2

(12) United States Patent
Schnabel et al.

(10) Patent No.: US 11,869,514 B2
(45) Date of Patent: *Jan. 9, 2024

(54) APPARATUS AND METHOD FOR IMPROVED SIGNAL FADE OUT FOR SWITCHED AUDIO CODING SYSTEMS DURING ERROR CONCEALMENT

(71) Applicant: Fraunhofer-Gesellschaft zur Foerderung der angewandten Forschung e.V., Munich (DE)

(72) Inventors: Michael Schnabel, Geroldsgruen (DE); Goran Markovic, Nuremberg (DE); Ralph Sperschneider, Ebermannstadt (DE); Jérémie Lecomte, Fuerth (DE); Christian Helmrich, Erlangen (DE)

(73) Assignee: Fraunhofer-Gesellschaft zur Foerderung der angewandten Forschung e.V., Munich (DE)

( * ) Notice: Subject to any disclaimer, the term of this patent is extended or adjusted under 35 U.S.C. 154(b) by 230 days.

This patent is subject to a terminal disclaimer.

(21) Appl. No.: 16/849,815

(22) Filed: Apr. 15, 2020

(65) Prior Publication Data

US 2020/0312338 A1 Oct. 1, 2020

Related U.S. Application Data

(63) Continuation of application No. 15/879,287, filed on Jan. 24, 2018, now Pat. No. 10,679,632, which is a (Continued)

(30) Foreign Application Priority Data

Jun. 21, 2013 (EP) .................................... 13173154
May 5, 2014 (EP) .................................... 14166998

(51) Int. Cl.
*G10L 19/005* (2013.01)
*G10L 19/06* (2013.01)
(Continued)

(52) U.S. Cl.
CPC .......... *G10L 19/005* (2013.01); *G10L 19/002* (2013.01); *G10L 19/012* (2013.01);
(Continued)

(58) Field of Classification Search
CPC ... G10L 19/005; G10L 19/002; G10L 19/012; G10L 19/06; G10L 19/07; G10L 19/083;
(Continued)

(56) References Cited

U.S. PATENT DOCUMENTS 4,933,973 A 6/1990 Porter
5,097,507 A 3/1992 Zinser et al.
(Continued)

FOREIGN PATENT DOCUMENTS

CN 1134581 A 10/1996
CN 1243621 A 2/2000
(Continued)

OTHER PUBLICATIONS

3GPP, "3GPP TS 26.290", V9.0.0 Technical Specification Group Service and System Aspects; Audio Codec Processing Functions; Extended Adaptive Multi-Rate-Wideband (AMR-WB+) Codec; Transcoding Functions (Release 9), Sep. 2009, 1-85.
(Continued)

*Primary Examiner* — Fariba Sirjani
(74) *Attorney, Agent, or Firm* — Perkins Coie LLP; Michael A. Glenn

(57) ABSTRACT

An apparatus for decoding an audio signal includes a receiving interface, wherein the receiving interface is configured to receive a first frame and a second frame. Moreover, the apparatus includes a noise level tracing unit for
(Continued)

determining noise level information being represented in a tracing domain. Furthermore, the apparatus includes a first reconstruction unit for reconstructing a third audio signal portion of the audio signal depending on the noise level information and a second reconstruction unit for reconstructing a fourth audio signal portion depending on noise level information being represented in the second reconstruction domain.

16 Claims, 16 Drawing Sheets

Related U.S. Application Data continuation of application No. 14/973,726, filed on Dec. 18, 2015, now Pat. No. 9,916,833, which is a continuation of application No. PCT/EP2014/063171, filed on Jun. 23, 2014.

(51) Int. Cl.

| | |
|---|---|
| ***G10L 19/002*** | (2013.01) |
| ***G10L 19/012*** | (2013.01) |
| ***G10L 19/083*** | (2013.01) |
| ***G10L 19/09*** | (2013.01) |
| ***G10L 19/12*** | (2013.01) |
| ***G10L 19/07*** | (2013.01) |
| ***G10L 19/22*** | (2013.01) |
| ***G10L 19/02*** | (2013.01) |
| ***G10L 19/00*** | (2013.01) |

(52) U.S. Cl.

CPC .............. *G10L 19/06* (2013.01); *G10L 19/07* (2013.01); *G10L 19/083* (2013.01); *G10L 19/09* (2013.01); *G10L 19/12* (2013.01); *G10L 19/22* (2013.01); *G10L 19/0212* (2013.01); *G10L 2019/0002* (2013.01); *G10L 2019/0011* (2013.01); *G10L 2019/0016* (2013.01)

(58) Field of Classification Search

CPC ......... G10L 19/09; G10L 19/12; G10L 19/22; G10L 19/0212; G10L 2019/0002; G10L 2019/0011; G10L 2019/0016; H03M 7/30

See application file for complete search history.

(56) References Cited

U.S. PATENT DOCUMENTS

| | | | |
|---|---|---|---|
| 5,148,487 | A | 9/1992 | Nagai et al. |
| 5,271,011 | A | 12/1993 | Mcmullan, Jr. et al. |
| 5,444,816 | A | 8/1995 | Adoul et al. |
| 5,598,506 | A | 1/1997 | Wigren et al. |
| 5,600,754 | A | 2/1997 | Gardner et al. |
| 5,615,298 | A | 3/1997 | Chen |
| 5,673,363 | A | 9/1997 | Jeon et al. |
| 5,699,485 | A | 12/1997 | Shoham |
| 5,752,223 | A | 5/1998 | Aoyagi et al. |
| 5,873,058 | A | 2/1999 | Yajima et al. |
| 5,915,234 | A | 6/1999 | Itoh |
| 5,974,377 | A | 10/1999 | Navarro et al. |
| 6,055,497 | A | 4/2000 | Hallkvist et al. |
| 6,075,974 | A | 6/2000 | Saints et al. |
| 6,289,309 | B1 | 9/2001 | Devries |
| 6,377,915 | B1 | 4/2002 | Sasaki |
| 6,384,438 | B2 | 5/2002 | Cho et al. |
| 6,529,604 | B1 | 3/2003 | Park et al. |
| 6,584,438 | B1 | 6/2003 | Manjunath et al. |
| 6,604,070 | B1 * | 8/2003 | Gao ........................ G10L 19/00 704/E19.048 |
| 6,636,829 | B1 | 10/2003 | Benyassine et al. |
| 6,640,209 | B1 | 10/2003 | Das |
| 6,661,793 | B1 | 12/2003 | Pogrebinsky |
| 6,687,667 | B1 | 2/2004 | Gournay et al. |
| 6,757,654 | B1 | 6/2004 | Westerlund et al. |
| 6,810,273 | B1 * | 10/2004 | Mattila ............... G10L 21/0208 379/406.01 |
| 6,813,602 | B2 | 11/2004 | Thyssen |
| 6,826,527 | B1 | 11/2004 | Unno |
| 7,002,913 | B2 | 2/2006 | Huang et al. |
| 7,174,292 | B2 | 2/2007 | Deng et al. |
| 7,299,189 | B1 | 11/2007 | Sato |
| 7,492,703 | B2 | 2/2009 | Lusky et al. |
| 7,590,525 | B2 | 9/2009 | Chen |
| 7,610,195 | B2 | 10/2009 | Ojanperä |
| 7,630,890 | B2 | 12/2009 | Son et al. |
| 7,804,836 | B2 | 9/2010 | Hyldgaard |
| 7,869,990 | B2 | 1/2011 | Gao |
| 8,095,361 | B2 | 1/2012 | Wang |
| 8,255,213 | B2 | 8/2012 | Yoshida et al. |
| 8,355,911 | B2 | 1/2013 | Zhan et al. |
| 8,489,396 | B2 | 7/2013 | Hetherington et al. |
| 8,676,573 | B2 | 3/2014 | Sun et al. |
| 8,737,501 | B2 | 5/2014 | Shah et al. |
| 9,008,329 | B1 | 4/2015 | Mandel et al. |
| 9,426,566 | B2 | 8/2016 | Takahashi |
| 9,514,755 | B2 | 12/2016 | Huang et al. |
| 9,532,139 | B1 | 12/2016 | Lu et al. |
| 9,761,230 | B2 | 9/2017 | Daniel et al. |
| 9,916,833 | B2 * | 3/2018 | Schnabel ................ G10L 19/06 |
| 9,978,378 | B2 * | 5/2018 | Schnabel .............. G10L 19/012 |
| 9,997,163 | B2 | 6/2018 | Schnabel et al. |
| 10,679,632 | B2 * | 6/2020 | Schnabel .............. G10L 19/012 |
| 10,854,208 | B2 | 12/2020 | Schnabel et al. |
| 10,867,613 | B2 * | 12/2020 | Schnabel ................ G10L 19/09 |
| 2001/0014857 | A1 | 8/2001 | Wang |
| 2001/0028634 | A1 | 10/2001 | Huang et al. |
| 2001/0044712 | A1 | 11/2001 | Vainio et al. |
| 2002/0007273 | A1 | 1/2002 | Chen |
| 2002/0069052 | A1 | 6/2002 | Chen |
| 2002/0091523 | A1 | 7/2002 | Makinen et al. |
| 2002/0119212 | A1 | 8/2002 | Kestle et al. |
| 2002/0123887 | A1 | 9/2002 | Unno |
| 2002/0133764 | A1 | 9/2002 | Wang |
| 2003/0009325 | A1 | 1/2003 | Kirchherr et al. |
| 2003/0012221 | A1 | 1/2003 | El-maleh et al. |
| 2003/0078769 | A1 | 4/2003 | Chen |
| 2003/0093746 | A1 | 5/2003 | Kang et al. |
| 2003/0162518 | A1 | 8/2003 | Baldwin et al. |
| 2003/0187663 | A1 | 10/2003 | Truman et al. |
| 2004/0002855 | A1 | 1/2004 | Jabri et al. |
| 2004/0064307 | A1 | 4/2004 | Scalart et al. |
| 2004/0204935 | A1 | 10/2004 | Anandakumar et al. |
| 2004/0267543 | A1 | 12/2004 | Ojanperä |
| 2005/0053130 | A1 | 3/2005 | Jabri et al. |
| 2005/0058301 | A1 | 3/2005 | Brown |
| 2005/0071153 | A1 | 3/2005 | Tammi et al. |
| 2005/0131689 | A1 | 6/2005 | Garner et al. |
| 2005/0154584 | A1 | 7/2005 | Jelinek et al. |
| 2005/0278172 | A1 | 12/2005 | Koishida et al. |
| 2006/0031066 | A1 | 2/2006 | Hetherington et al. |
| 2006/0178872 | A1 | 8/2006 | Sung et al. |
| 2006/0184861 | A1 | 8/2006 | Sun et al. |
| 2006/0265216 | A1 | 11/2006 | Chen |
| 2006/0271359 | A1 | 11/2006 | Khalil et al. |
| 2007/0010999 | A1 | 1/2007 | Klein et al. |
| 2007/0050189 | A1 | 3/2007 | Cruz-Zeno et al. |
| 2007/0094009 | A1 | 4/2007 | Ryu et al. |
| 2007/0129036 | A1 | 6/2007 | Arora |
| 2007/0198254 | A1 | 8/2007 | Goto et al. |
| 2007/0225971 | A1 | 9/2007 | Bessette |
| 2007/0239462 | A1 | 10/2007 | Makinen et al. |
| 2007/0255535 | A1 | 11/2007 | Marro et al. |
| 2007/0271480 | A1 | 11/2007 | Oh et al. |
| 2007/0282600 | A1 | 12/2007 | Ojanpera |
| 2008/0033718 | A1 | 2/2008 | Zopf et al. |
| 2008/0071530 | A1 | 3/2008 | Ehara |
| 2008/0126096 | A1 | 5/2008 | Oh et al. |
| 2008/0147414 | A1 | 6/2008 | Son et al. |
| 2008/0189104 | A1 | 8/2008 | Zong et al. |
| 2008/0195910 | A1 | 8/2008 | Sung et al. |

(56) References Cited

U.S. PATENT DOCUMENTS

| | | | | |
|---|---|---|---|---|
| 2008/0201137 | A1 | 8/2008 | Vos et al. | |
| 2008/0240108 | A1 | 10/2008 | Hyldgaard | |
| 2008/0240413 | A1* | 10/2008 | Mohammad .......... | H04M 9/082 379/406.08 |
| 2008/0253692 | A1 | 10/2008 | Suematsu et al. | |
| 2008/0310328 | A1 | 12/2008 | Li et al. | |
| 2009/0055171 | A1 | 2/2009 | Zopf | |
| 2009/0089050 | A1 | 4/2009 | Mo et al. | |
| 2009/0154726 | A1 | 6/2009 | Taenzer | |
| 2009/0204394 | A1 | 8/2009 | Xu et al. | |
| 2009/0240492 | A1 | 9/2009 | Zopf et al. | |
| 2009/0285271 | A1 | 11/2009 | Perez de Aranda Alonso et al. | |
| 2010/0017200 | A1 | 1/2010 | Oshikiri et al. | |
| 2010/0054279 | A1 | 3/2010 | Feldbauer et al. | |
| 2010/0088092 | A1 | 4/2010 | Bruhn | |
| 2010/0191523 | A1 | 7/2010 | Sung et al. | |
| 2010/0191525 | A1* | 7/2010 | Rabenko ............. | H04L 12/2801 704/211 |
| 2010/0228557 | A1 | 9/2010 | Chen et al. | |
| 2010/0251051 | A1 | 9/2010 | Sun et al. | |
| 2010/0274565 | A1 | 10/2010 | Kapilow | |
| 2010/0284281 | A1 | 11/2010 | Sperschneider | |
| 2010/0286805 | A1* | 11/2010 | Gao ...................... | G10L 19/005 700/94 |
| 2010/0318352 | A1 | 12/2010 | Taddei et al. | |
| 2010/0324907 | A1 | 12/2010 | Virette et al. | |
| 2011/0007827 | A1 | 1/2011 | Virette et al. | |
| 2011/0099008 | A1 | 4/2011 | Zopf | |
| 2011/0125505 | A1 | 5/2011 | Vaillancourt et al. | |
| 2011/0137663 | A1 | 6/2011 | Beack et al. | |
| 2011/0142257 | A1* | 6/2011 | Goodwin .............. | G10L 19/005 381/94.4 |
| 2011/0145003 | A1* | 6/2011 | Bessette .............. | G10L 19/0212 704/500 |
| 2011/0173008 | A1 | 7/2011 | Lecomte et al. | |
| 2011/0173010 | A1 | 7/2011 | Lecomte et al. | |
| 2011/0178795 | A1 | 7/2011 | Bayer et al. | |
| 2011/0191111 | A1 | 8/2011 | Chu et al. | |
| 2011/0200198 | A1 | 8/2011 | Grill et al. | |
| 2011/0202354 | A1* | 8/2011 | Grill ..................... | G10L 19/008 704/500 |
| 2011/0202355 | A1 | 8/2011 | Grill et al. | |
| 2011/0270614 | A1 | 11/2011 | Liu et al. | |
| 2011/0320196 | A1 | 12/2011 | Choo et al. | |
| 2012/0137189 | A1 | 5/2012 | Macours | |
| 2012/0179458 | A1 | 7/2012 | Oh et al. | |
| 2012/0191447 | A1 | 7/2012 | Joshi et al. | |
| 2012/0239389 | A1 | 9/2012 | Jeon et al. | |
| 2012/0245947 | A1 | 9/2012 | Neuendorf et al. | |
| 2012/0278085 | A1 | 11/2012 | Naslund et al. | |
| 2012/0323567 | A1 | 12/2012 | Gao | |
| 2013/0144632 | A1* | 6/2013 | Sung ..................... | G10L 19/005 704/503 |
| 2013/0297322 | A1 | 11/2013 | Oh et al. | |
| 2014/0142957 | A1 | 5/2014 | Sung et al. | |
| 2015/0255079 | A1 | 9/2015 | Huang et al. | |
| 2015/0332696 | A1 | 11/2015 | Fuchs et al. | |
| 2016/0055852 | A1 | 2/2016 | Daniel et al. | |
| 2016/0104488 | A1* | 4/2016 | Schnabel ................ | G10L 19/06 704/204 |
| 2016/0111095 | A1 | 4/2016 | Schnabel et al. | |
| 2016/0178872 | A1 | 6/2016 | Huang | |
| 2017/0125022 | A1 | 5/2017 | Huang et al. | |
| 2017/0270934 | A1 | 9/2017 | Atti et al. | |
| 2018/0151184 | A1 | 5/2018 | Schnabel et al. | |
| 2021/0082442 | A1 | 3/2021 | Li et al. | |
| 2021/0142809 | A1 | 5/2021 | Schnabel et al. | |

FOREIGN PATENT DOCUMENTS

| | | | |
|---|---|---|---|
| CN | 1427989 | A | 7/2003 |
| CN | 1441950 | A | 9/2003 |
| CN | 1488136 | A | 4/2004 |
| CN | 1488137 | A | 4/2004 |
| CN | 1491142 | A | 4/2004 |
| CN | 1653521 | A | 8/2005 |
| CN | 1659625 | A | 8/2005 |
| CN | 1701353 | A | 11/2005 |
| CN | 1737906 | A | 2/2006 |
| CN | 1765072 | A | 4/2006 |
| CN | 1873778 | A | 12/2006 |
| CN | 1930607 | A | 3/2007 |
| CN | 1975860 | A | 6/2007 |
| CN | 1989548 | A | 6/2007 |
| CN | 101141644 | A | 3/2008 |
| CN | 101155140 | A | 4/2008 |
| CN | 101268506 | A | 9/2008 |
| CN | 101335002 | A | 12/2008 |
| CN | 101361112 | A | 2/2009 |
| CN | 101366079 | A | 2/2009 |
| CN | 101379551 | A | 3/2009 |
| CN | 101430880 | A | 5/2009 |
| CN | 101627426 | A | 1/2010 |
| CN | 101689961 | A | 3/2010 |
| CN | 101763859 | A | 6/2010 |
| CN | 101779377 | A | 7/2010 |
| CN | 101894558 | A | 11/2010 |
| CN | 101937679 | A | 1/2011 |
| CN | 101952886 | A | 1/2011 |
| CN | 102089758 | A | 6/2011 |
| CN | 102089811 | A | 6/2011 |
| CN | 102105930 | A | 6/2011 |
| CN | 102124517 | A | 7/2011 |
| CN | 102150201 | A | 8/2011 |
| CN | 102460570 | A | 5/2012 |
| CN | 102648493 | A | 8/2012 |
| CN | 102750955 | A | 10/2012 |
| CN | 105359209 | A | 2/2016 |
| EP | 1145227 | A1 | 10/2001 |
| EP | 1509903 | A1 | 3/2005 |
| EP | 1088303 | B1 | 8/2006 |
| EP | 1688916 | A2 | 8/2006 |
| EP | 1701340 | A2 | 9/2006 |
| EP | 1775717 | A1 | 4/2007 |
| EP | 1973254 | A1 | 9/2008 |
| EP | 2026330 | A1 | 2/2009 |
| EP | 2037450 | A1 | 3/2009 |
| EP | 2360682 | A1 | 8/2011 |
| EP | 2472241 | A1 | 7/2012 |
| EP | 2026330 | B1 | 11/2012 |
| EP | 2757559 | A1 | 7/2014 |
| EP | 3011557 | A1 | 4/2016 |
| EP | 3011561 | A1 | 4/2016 |
| JP | H10308708 | A | 11/1998 |
| JP | 2002328700 | A | 11/2002 |
| JP | 2004501391 | A | 1/2004 |
| JP | 2004120619 | A | 4/2004 |
| JP | 2006215569 | A | 8/2006 |
| JP | 2007049491 | A | 2/2007 |
| JP | 2009522588 | A | 6/2009 |
| JP | 2011158906 | A | 8/2011 |
| JP | 2016515725 | A | 5/2016 |
| KR | 20060124371 | A | 12/2006 |
| KR | 20080047230 | A | 5/2008 |
| KR | 20080070026 | A | 7/2008 |
| KR | 20080080235 | A | 9/2008 |
| RU | 2120668 | C1 | 10/1998 |
| RU | 2197776 | C2 | 1/2003 |
| RU | 2251750 | C2 | 5/2005 |
| RU | 2408089 | C9 | 4/2011 |
| RU | 2418323 | C2 | 5/2011 |
| RU | 2419167 | C2 | 5/2011 |
| RU | 2419891 | C2 | 5/2011 |
| RU | 2455709 | C2 | 7/2012 |
| RU | 2483364 | C2 | 5/2013 |
| WO | 9914866 | A2 | 3/1999 |
| WO | 0031720 | A2 | 6/2000 |
| WO | 0068934 | A1 | 11/2000 |
| WO | 0233694 | A1 | 4/2002 |
| WO | 03058407 | A2 | 7/2003 |
| WO | 03102921 | A1 | 12/2003 |
| WO | 2007051124 | A1 | 5/2007 |
| WO | 2007073604 | A1 | 7/2007 |

(56) References Cited

FOREIGN PATENT DOCUMENTS

| | | | |
|---|---|---|---|
| WO | 2008040250 | A1 | 4/2008 |
| WO | 2008062959 | A1 | 5/2008 |
| WO | 2009067883 | A1 | 6/2009 |
| WO | 2010003491 | A1 | 1/2010 |
| WO | 2010003663 | A1 | 1/2010 |
| WO | 2010127617 | A1 | 11/2010 |
| WO | 2011013983 | A2 | 2/2011 |
| WO | 2011072551 | A1 | 6/2011 |
| WO | 2012110447 | A1 | 8/2012 |
| WO | 2014202790 | A1 | 12/2014 |

OTHER PUBLICATIONS

3GPP, "Technical Specification Group Services and System Aspects, Audio codec processing functions; Extended Adaptive Multi-Rate-Wideband (AMR-WB+) codec; Transforming functions (Release 9)", 3GPP TS 26.290, 3rd Generation Partnership Project, 2009, 85 pages.
3GPP, TS 26.090, "Technical Specification Group Services and System Aspects; Mandatory Speech Codec speech processing functions; Adaptive Multi-Rate (AMR) Speech Codec; Transcoding Functions (Release 11)", 3GPP TS 26.090, 3rd Generation Partnership Project, Sep. 2012, 55 pages.
3GPP, TS 26.091, "Technical Specification Group Services and System Aspects; Mandatory Speech Codec speech processing functions; Adaptive Multi-Rate (AMR) Speech Codec, Error Concealment of Lost Frames (Release 11)", 3GPP TS 26.091, 3rd Generation Partnership Project, Sep. 2012, 13 pages.
3GPP, TS 26.104, "Technical Specification Group Services and System Aspects; ANSI-C Code For The Floating-Point Adaptive Multi-Rate (AMR) Speech Codec (Release 11)", 3GPP TS 26.104, 3rd Generation Partnership Project, Sep. 2012, 23 Pages.
3GPP, TS 26.173, "Technical Specification Group Services and System Aspects; ANSI-C Code For The Adaptive Multi-Rate-Wideband (AMR-WB) Speech Codec (Release 11)", 3GPP TS 26.173, 3rd Generation Partnership Project, Sep. 2012, 18 pages.
3GPP, TS 26.190, "Technical Specification Group Services and System Aspects; Speech Codec Speech Processing Functions; Adaptive Multi-Rate Wideband (AMRWB) Speech Codec; Transcoding Functions (Release 11)", 3GPP TS 26.190, 3rd Generation Partnership Project, Sep. 2012, 51 pages.
3GPP, TS 26.19 , "Technical Specification Group Services and System Aspects; Speech Coded Speech Processing Functions; Adaptive Multi-Rate-Wideband (AMR-WB) Speech Codec; Error Concealment of Erroneous or Lost Frames (Release 11)", 3GPP TS 26.191, 3rd Generation Partnership Project, Sep. 2012, 14 pages.
3GPP, TS 26.204, "Technical Specification Group Services and System Aspects; Speech Codec Speech Processing Functions; Adaptive Multi-Rate-Wideband (AMR-WB) Speech Codec; Ansi-C Code (Release 11)", 3GPP TS 26.204, 3rd Generation Partnership Project, Sep. 2012, 19 pages.
3GPP, TS 26.290, "Technical Specification Group Services and System Aspects: Audio codec processing functions; Extended Adaptive Multi-Rate Wideband (AMR-WB+) codec; Transcoding functions (Release 11)", 3GPP TS 26.290, 3rd Generation Partnership Project, Sep. 2012, 85 pages.
3GPP, TS 26.402, "Technical Specification Group Services and System Aspects; General Audio Codec Audio Processing Functions; Enhanced aacPlus General Audio Codec; Additional Decoder Tools (Release 11)", 3GPP TS 26.402 3rd Generation Partnership Project, Sep. 2012, 17 pages.
3GPP, TS26.304, "Technical Specification Group Services and System Aspects; Extended Adaptive Multi-Rate Wideband (AMR-WB+) Codec; Floating-Point ANSI-C Code (Release 9)", 3GPP TS 26.304 , 3rd Generation Partnership Project, Dec. 2009, 32 pages.
Batina, Ivo et al., "Noise Power Spectrum Estimation for Speech Enhancement Using an Autoregressive Model for Speech Power Spectrum Dynamics", Acoustics, Speech and Signal Processing, ICASSP 2006 Proceedings, 2006 IEEE International Conference on. vol. 3. IEEE, 2006, pp. 1064-1067.
Borowicz, Adam et al., "Minima controlled Noise Estimation for KLT-Based Speech Enhancement", CD-ROM, Italy, Florence, Sep. 2006, 5 pages.
Cho, Choong S. et al., "A Packet loss concealment algorithm robust to burst packet loss for CELP-type speech coders", The 23rd International Technical Conference on Circuits/Systems, Computers and Communications (ITC-CSCC 2008), 2008, pp. 941-944.
Cohen, Israel, "Noise spectrum estimation in adverse environments: Improved minima controlled recursive averaging", IEEE Trans. on Speech and Audio Processing, 11(5), Sep. 2003, pp. 466-475.
Doblinger, Gerhard , "Computationally Efficient Speech Enhancement by spectral Minima Tracking in Subbands", in Proc. Eurospeech, Sep. 1995, pp. 1513-1516/.
Ephraim, Yariv et al., "Speech Enhancement Using a Minimum Mean-Square Error Short-Time Spectral Amplitude Estimator", IEEE Transactions on Acoustics, Speech and Signal Processing, vol. ASSP-32, No. 6, Dec. 6, 1984, pp. 1109-1121.
Ephraim, Yariv et al., "Speech Enhancement Using a Minium Mean-Square Error Log-Spectral Amplitude Estimator", IEEE Transactions on Acoustics, Speech, and Signal Processing vol. ASSP-33, No. 2, Apr. 1985, pp. 443-445.
Erkelens, Jan S. et al., "Tracking of Nonstationary Noise Based on Data-Driven Recursive Noise Power Estimation, Audio, Speech, and Language Processing", IEEE Transactions on 16 (2008), No. 6, 2008, pp. 1112-1123.
ETSI, , "Digital Audio Broadcasting (DAB), Digital Audio Broadcasting (DAB); Transport of Advanced Audio Coding (AAC) audio", ETSI TS 102 563 V1.2.1, May 2010, pp. 1-27.
ETSI, , "Digital Radio Mondiale (DRM)", ETSI ES 201 980, Jun. 2009, 1-221.
ETSI, , "ETSI TS 126 190 V5.1.0 (3GPP TS 26.190)", Universal Mobile Telecommunications Systems (UMTS); Mandatory Speech Codec Speech Processing Functions AMR Wideband Speech Codec; Transcoding Functions (3GPP TS 26.190 Version 5.1.0 Release 5), Dec. 2001, Cover-54.
ETSI, , "ETSI TS 126 290 V9.0.0, Digital cellular telecommunications system (Phase 2+); Universal Mobile Telecommunications System (UMTS);", LTE; Audio codec processing functions; Extended Adaptive Multi-Rate-Wideband (AMR-WB+) codec; Transcoding functions (3GPP TS 26.290 version 9.0.0 Release 9), Jan. 1, 2010, 1-86.
ETSI, , "Technical Specification, Digital cellular telecommunications system", ETSI ES 126 290 V9.0.0, Jan. 2010, 7, 11-12, 66-68.
ETSI TS 126 290 V9.0.0, , "Digital cellular telecommunications system (Phase 2+); Universal Mobile Telecommunications System (UMTS); LTE;", Audio codec processing functions; Extended Adaptive Multi-Rate-Wideband (AMR-WB+) codec; Transcoding functions (3GPP TS 26.290 version 9.0.0 Release 9), Jan. 1, 2010, 1-85.
Gannot, Sharon, "Speech Enhancement: Application of the Kalman Filter in the Estimate Maximize (EM) Framework)", [online], [Retrieved on May 3, 2016], Retrieved from: <https://link.springer.com/chapter/10.1007%2F3-540-27489-8_8>, Springer Berlin Heidelberg, Abstract, 2005, 5 pages.
Hendriks, Richard C. et al., "MMSE based noise PSD tracking with low complexity", IEEE Int. Conf. Acoustics, Speech, and Signal Processing;, Mar. 2010, pp. 4266-4269.
Hendriks, Richard C. et al., "Noise Tracking Using DFT Domain Subspace Decompositions", IEEE Trans. Audio, Speech, Language Processing vol. 16, No. 3, Mar. 2008, pp. 541-553.
Herre, Jurgen et al., "Error Concealment in the spectral domain", Presented at the 93rd Audio Engineering Society Convention, San Francisco, Oct. 1-4, 1992, 17 pages.
Hirsch, H. G. et al., "Noise estimation techniques for robust speech recognition", Institute of Communication Systems and Data Processing,Aachen University of Technology, Proc. of the IEEE Int. Cont. on Acoustics, Speech, and Signal Processing, ICASSP, Detroit, USA, May 1995, 153-156.
ISO, , "Information technology—Coding of audio-visual objects", ISO/IEC JTC 1/SC 29/WG 11, 1999, 199 pages.

(56) References Cited

OTHER PUBLICATIONS

ISO/IEC, FDIS23003-3:2011 , "Information Techonology—MPEG Audio Technologies—Part 3: Unified Speech and Audio Coding", ISO/IEC JTC 1/SC 29/WG 11, 2011, Sep. 20, 2011, 291 pages.
ITU-T, , "G.719: Low-complexity, full-band audio coding for high-quality, conversational applications", Recommendation ITU-T G.719, Telecommunication Standardization Sector of ITU,, Jun. 2008, 58 pages.
ITU-T, G.718 , "Frame error robust narrow-band and wideband embedded variable bit-rate coding of speech and audio from 8-32 kbit/s", Recommendation ITU-T G.718, Jun. 2008, 257 pages.
ITU-T, G.722 , "A High-Complexity Algorithm for Packet Loss Concealment for G.722", Series G: Transmission Systems and Media, Digital Systems and Networks, ITU-G Recommendation G.722, Appendix III, Nov. 2006, 46 pages.
ITU-T, G.722 , "Appendix IV: A Low-Complexity Algorith for Packet-Loss Concealment with ITU-T G.722", Series G: Transmission Systems and Media, Digital Systems and Networks, ITU-T Recommendation, Nov. 2009, 24 pages.
Itu-T, G.722.1 , "Low-Complexity Coding at 24 and 32 kbit/s for Hands-Free Operation in Systems with Low Frame Loss", Series G: Transmission Systems and Media, Digital Systems and Networks, Recommendation ITU-T G. 722.1, Telecommunication Standardization Sector of ITU, May 2005, 36 pages.
ITU-T, G.7222.2 , "Wideband Coding of Speech at Around 16 kbit/s Using Adaptive Multi-Rate Wideband (amr-wb)", Series G: Transmission Systems and Media, Digital Systems and Networks, Recommendation ITU-T G.7222.2, Telecommunication Standardization Sector of ITU, Jul. 2003, 72 pages.
ITU-T, G.729 , "Coding of Speech at 8 kbit/s Using Conjugate-Structure Algebraic-Code-Excited Linear Prediction (CS-ACELP)", Series G: Transmission Systems and Media, Digital Systems and Networks, Recommendation ITU-T G.729, Telecommunication Standardization Sector of ITU, Jun. 2012, 152 pages.
ITU-T, G.729.1 , "G.729-Based Embedded Variable Bit-Rate Coder: An 8-32 kbit/s Scalable Wideband Coder Bitstream Interoperable with G.729", Series G: Transmission Systems and Media, Digital Systems and Networks, Recommendation ITU-T G.729.1 Telecommunication Standardization Sector of ITU, May 2006, 100 pages.
Jelinek, Milan et al., "G.718: A new Embedded Speech and Audio Coding Standard with High Resilience to Error-Prone Transmission Channels", IEEE Communications Magazine, IEEE Service Center, Piscataway, US, vol. 47, No. 10, Oct. 1, 2009, pp. 117-123.
Lauber, Pierre et al., "Error Concealment for Compressed Digital Audio", Audio Engineering Society Convention Paper 5460, Presented at the 111th Convention, XP008075936, Sep. 21-24, 2001, 12 Pages.
Lecomte, Jeremie et al., "Enhanced Time Domain Packet Loss Concealment in Switched Speech/Audio Codec", 2015 IEEE International Conference on Acoustics, Speech and Signal Processing (ICASSP), Apr. 1, 2015 (Apr. 1, 2015), pp. 5922-5926, XP055245261, Apr. 1, 2015, pp. 5922-5926.
Mahieux, Y. et al., "Transform coding of audio signals using correlation between successive transform blocks, Acoustics, Speech, and Signal Processing", ICASSP-89., 1989 International Conference on, 1989, vol. 3, 1989, pp. 2021-2024.
Malah, David et al., "Tracking speech-presence uncertainty to improve speech enhancement in nonstationary noise environments", IEEE International Conference on Acoustics, Speech, and Signal Processing, vol. 2, 1999, pp. 789-792.
Martin, Rainer et al., "New Speech Enhancement Techniques for Low Bit Rate Speech Coding", 1999 IEEE Workshop on Speech Coding Proceedings, Jun. 1999, pp. 165-167.
Martin, Rainer , "Noise Power Spectral Density Estimation Based on Optimal Smoothing and Minimum Statistics", IEEE Transactions on Speech and Audio Processing, vol. 9, No. 5, Jul. 2001, pp. 504-512.
Martin, Rainer , "Statistical methods for the enhancement of noisy speech", International Workshop on Acoustic Echo and Noise Control (IWAENC2003), Sep. 2003, pp. 1-6.
Mclaughlin, Michael , "Channel coding for Digital Speech Transmission in Japanese Digital Cellular System", (RCS90-27, Technical Committee on Radio Communication System, Institute of Electronics, Information and Communication Engineers.
Neuendorf, Max et al., "MPEG Unified Speech and Audio Coding—The ISO/MPEG Standard for High-Efficienacy Audio Coding of All Content Types", Audio Engineering Society Convention Paper 8654, Presented at the 132nd Convention, Budapest, Hungary. Also to appear in the Journal of the AES, 2013, Apr. 26-29, 2012, 22 pp.
Neuendorf, Max et al., "MPEG Unified Speech and Audio Coding—The ISO/MPEG Standard for High-Efficiency Audio Coding of all Content Types", Audio Engineering Society Convention Paper 8654, Presented at the 132nd Convention, Apr. 26, 2012, pp. 1-22.
Park, Nam I. et al., "Burst Packet Loss Concealment Using Multiple Codebooks and Comfort Noise for CELP-Type Speech Coders in Wireless Sensor Networks", Sensors 11, No. 5, May 2011, pp. 5323-5336.
Perkins, Colin et al., "A Survey of Packet Loss Recovery Techniques for Streaming Audio", IEEE Network, vol. 12, No. 5, Sep./Oct. 1998, pp. 40-48.
Purnhagen, Heiko et al., "Error Protection and Concealment for HILN MPEG-4 Parametric Audio Coding", Audio Engineering Society Convention Paper Presented at the 110th Convention, May 12-15, 2001, pp. 1-7.
Quackenbush, Schuyler et al., "Error Mitigation in MPEG-4 Audio Packet Communication Systems", Audio Engineering Society Convention Paper, Presented at the 115th Convention,, XP002423160. p. 6, left-hand column, paragraph 3, Oct. 10-13, 2003, pp. 1-11.
Rangachari, Sundarrajan et al., "A noise-estimation algorithm for highly non-stationary environments", Speech Commun. 48, 2006, pp. 220-231.
Salami, Redwan et al., "Design and Description of CS-ACELP: A Toll Quality 8kb/s Speech Coder", IEEE Transactions on Speech and Audio Processing, vol. 6 No. 2, Mar. 1998, 116-130.
Sohn, Jongseo et al., "A Voice Activity Detector Employing Soft Decision Based Noise Spectrum Adaptation", Proceedings IEEE International Conference on Acoustics, Speech, and Signal Processing, May 1998, pp. 365-368.
Stahl, Volker et al., "Quantile based noise estimation for spectral subtraction and wiener filtering", in Proc. IEEE Int. Conf. Acoust., Speech and Signal Process, 2000, pp. 1875-1878.
Valin, JM et al., "Defintion of the Opus Audio Codec", IETF, Sep. 2012, pp. 1-326.
Yu, Rongshan , "A low-complexity noise estimation algorithm based on smoothing of noise power estimation and estimation bias correction", Acoustics, Speech and Signal Processing, ICASSP, IEEE International Conference, Apr. 2009, 2009, pp. 4421-4424.
Hendriks, Richard C., et al., "Perceptual Linear Predictive Noise Modelling for Sinusoid-Plus-Noise Audio Coding", (JCASSP 2004), 4 pp.
Maerkle, R., "Channel codes based on hidden puncturing with applications to hybrid in band on channel digital audio broadcasting systems", IEEE Transactions on Broadcasting, 7 pp.
Vaidyanathan, P.P., "Multirate Digital Filters, Filter Banks, Polyphase Networks, and Applications: A Tutorial", Proceedings of the IEEE., 38 pp.
Zhang, Shuhua, et al., "MDCT Sinusoidal Analysis for Audio Signals Analysis and Processing", IEEE Transaction Audio, Speech, and Language Processing, 12 pp.
Zhu, Mengyao, "[Uploaded in 13 parts] Audio Subsystem Design and Audio Signal Processing Algorithm Research for Digital Television", , Dec. 2010, 15 pp.
Geng, Wang, "[Uploaded in 5 parts] G.729 Speech Codec Algorithm Research and Implementation Based on ARM9", China Excellent Doctoral Dissertation Full-Text Database (Master) Information Technology Series (80 pages), 17 pp.
Jie, Yang, "The Study of Speech Codec based on Perceptual Quality, Wuhan", China, Apr. 2010, 60 pp.
Yue, Lang, et al., "An Improved Multiple Descriptions Sinusoidal Speech Coder Adaptive to Packet-loss Rate", Jun. 2008, 5 pp.

(56) References Cited

OTHER PUBLICATIONS

Zhen, Fang, "[Uploaded in 3 parts] Optimized Design of Audio Perceptual Coding Algorithm on AAC", China Excellent Doctoral Dissertation Full-Text Database (Master) Information Technology Series (53 pages), 18 pp.

* cited by examiner

APPARATUS AND METHOD FOR IMPROVED SIGNAL FADE OUT FOR SWITCHED AUDIO CODING SYSTEMS DURING ERROR CONCEALMENT

CROSS-REFERENCE TO RELATED APPLICATIONS

This application is a continuation of copending U.S. patent application Ser. No. 15/879,287, filed Jan. 24, 2018, which in turn is a continuation of copending U.S. patent application Ser. No. 14/973,726, filed Dec. 18, 2015 (U.S. Pat. No. 9,916,833 issued Mar. 13, 2018), which in turn is a continuation of copending International Application No. PCT/EP2014/063171, filed Jun. 23, 2014, which is incorporated herein by reference in its entirety, and additionally claims priority from European Applications Nos. EP 13 173 154.9, filed Jun. 21, 2013, and EP 14 166 998.6, filed May 5, 2014, both which are incorporated herein by reference in their entirety.

The present invention relates to audio signal encoding, processing and decoding, and, in particular, to an apparatus and method for improved signal fade out for switched audio coding systems during error concealment.

BACKGROUND OF THE INVENTION

In the following, the state of the art is described regarding speech and audio codecs fade out during packet loss concealment (PLC). The explanations regarding the state of the art start with the ITU-T codecs of the G-series (G.718, G.719, G.722, G.722.1, G.729. G.729.1), are followed by the 3GPP codecs (AMR, AMR-WB, AMR-WB+) and one IETF codec (OPUS), and conclude with two MPEG codecs (HE-AAC, HILN) (ITU=International Telecommunication Union; 3GPP=3rd Generation Partnership Project; AMR=Adaptive Multi-Rate; WB=Wideband; IETF=Internet Engineering Task Force). Subsequently, the state-of-the art regarding tracing the background noise level is analysed, followed by a summary which provides an overview.

At first, G.718 is considered. G.718 is a narrow-band and wideband speech codec, that supports DTX/CNG (DTX=Digital Theater Systems; CNG=Comfort Noise Generation). As embodiments particularly relate to low delay code, the low delay version mode will be described in more detail, here.

Considering ACELP (Layer 1) (ACELP=Algebraic Code Excited Linear Prediction), the ITU-T recommends for G.718 [ITU08a, section 7.11] an adaptive fade out in the linear predictive domain to control the fading speed. Generally, the concealment follows this principle:

According to G.718, in case of frame erasures, the concealment strategy can be summarized as a convergence of the signal energy and the spectral envelope to the estimated parameters of the background noise. The periodicity of the signal is converged to zero. The speed of the convergence is dependent on the parameters of the last correctly received frame and the number of consecutive erased frames, and is controlled by an attenuation factor, α. The attenuation factor α, is further dependent on the stability, θ, of the LP filter (LP=Linear Prediction) for UNVOICED frames. In general, the convergence is slow if the last good received frame is in a stable segment and is rapid if the frame is in a transition segment.

The attenuation factor α depends on the speech signal class, which is derived by signal classification described in [ITU08a, section 6.8.1.3.1 and 7.11.1.1]. The stability factor θ is computed based on a distance measure between the adjacent ISF (Immittance Spectral Frequency) filters [ITU08a, section 7.1.2.4.2].

Table 1 shows the calculation scheme of α:

TABLE 1

Values of the attenuation factor α, the value θ is a stability factor computed from a distance measure between the adjacent LP filters. [ITU08a, section 7.1.2.4.2].

| last good received frame | Number of successive erased frames | α |
|---|---|---|
| ARTIFICIAL ONSET | | 0.6 |
| ONSET, VOICED | ≤3 | 1.0 |
| | >3 | 0.4 |
| VOICED TRANSITION | | 0.4 |
| UNVOICED TRANSITION | | 0.8 |
| UNVOICED | =1 | 0.2 · θ + 0.8 |
| | =2 | 0.6 |
| | >2 | 0.4 |

Moreover, G.718 provides a fading method in order to modify the spectral envelope. The general idea is to converge the last ISF parameters towards an adaptive ISF mean vector. At first, an average ISF vector is calculated from the last 3 known ISF vectors. Then the average ISF vector is again averaged with an offline trained long term ISF vector (which is a constant vector) [ITU08a, section 7.11.1.2].

Moreover, G.718 provides a fading method to control the long term behavior and thus the interaction with the background noise, where the pitch excitation energy (and thus the excitation periodicity) is converging to 0, while the random excitation energy is converging to the CNG excitation energy [ITU08a, section 7.11.1.6]. The innovation gain attenuation is calculated as $$g_s^{[1]}=\alpha g_s^{[0]}+(1-\alpha)g_n \quad (1)$$

where $g_s^{[1]}$ is the innovative gain at the beginning of the next frame, $g_s^{[0]}$ is the innovative gain at the beginning of the current frame, $g^n$ is the gain of the excitation used during the comfort noise generation and the attenuation factor α.

Similarly to the periodic excitation attenuation, the gain is attenuated linearly throughout the frame on a sample-by-sample basis starting with, $g_s^{[0]}$, and reaches $g_s^{[1]}$ at the beginning of the next frame.

FIG. 2 outlines the decoder structure of G.718. In particular, FIG. 2 illustrates a high level G.718 decoder structure for PLC, featuring a high pass filter.

By the above-described approach of G.718, the innovative gain $g_s$ converges to the gain used during comfort noise generation $g_n$ for long bursts of packet losses. As described in [ITU08a, section 6.12.3], the comfort noise gain $g_n$ is given as the square root of the energy $\tilde{E}$. The conditions of the update of $\tilde{E}$ are not described in detail. Following the reference implementation (floating point C-code, stat_noise_uv_mod.c), $\tilde{E}$ is derived as follows:

```
if(unvoiced_vad == 0) {
  if( unv_cnt >20 ) {
    ftmp = lp_gainc * lp_gainc;
    lp_ener = 0.7f * lp_ener + 0.3f * ftmp;
  }
  else{
    unv_cnt++;
  }
}
```

-continued

```
else {
  unv_cnt = 0;
}
```

wherein unvoiced_vad holds the voice activity detection, wherein unv_cnt holds the number of unvoiced frames in a row, wherein lp_gainc holds the low passed gains of the fixed codebook, and wherein lp_ener holds the low passed CNG energy estimate Ê, it is initialized with 0.

Furthermore, G.718 provides a high pass filter, introduced into the signal path of the unvoiced excitation, if the signal of the last good frame was classified different from UNVOICED, see FIG. 2, also see [ITU08a, section 7.11.1.6]. This filter has a low shelf characteristic with a frequency response at DC being around 5 dB lower than at Nyquist frequency.

Moreover, G.718 proposes a decoupled LTP feedback loop (LTP=Long-Term Prediction): While during normal operation the feedback loop for the adaptive codebook is updated subframe-wise ([ITU08a, section 7.1.2.1.4]) based on the full excitation. During concealment this feedback loop is updated frame-wise (see [ITU08a, sections 7.11.1.4, 7.11.2.4, 7.11.1.6, 7.11.2.6; dec_GV_exc@dec_gen_voic.c and syn_bfi_post@syn_bfi_pre_post.c]) based on the voiced excitation only. With this approach, the adaptive codebook is not "polluted" with noise having its origin in by the randomly chosen innovation excitation.

Regarding the transform coded enhancement layers (3-5) of G.718, during concealment, the decoder behaves regarding the high layer decoding similar to the normal operation, just that the MDCT spectrum is set to zero. No special fade-out behavior is applied during concealment.

With respect to CNG, in G.718, the CNG synthesis is done in the following order. At first, parameters of a comfort noise frame are decoded. Then, a comfort noise frame is synthesized. Afterwards the pitch buffer is reset. Then, the synthesis for the FER (Frame Error Recovery) classification is saved. Afterwards, spectrum deemphasis is conducted. Then low frequency post-filtering is conducted. Then, the CNG variables are updated.

In the case of concealment, exactly the same is performed, except the CNG parameters are not decoded from the bitstream. This means that the parameters are not updated during the frame loss, but the decoded parameters from the last good SID (Silence Insertion Descriptor) frame are used.

Now, G.719 is considered. G.719, which is based on Siren 22, is a transform based full-band audio codec. The ITU-T recommends for G.719 a fade-out with frame repetition in the spectral domain [ITU08b, section 8.6]. According to G.719, a frame erasure concealment mechanism is incorporated into the decoder. When a frame is correctly received, the reconstructed transform coefficients are stored in a buffer. If the decoder is informed that a frame has been lost or that a frame is corrupted, the transform coefficients reconstructed in the most recently received frame are decreasingly scaled with a factor 0.5 and then used as the reconstructed transform coefficients for the current frame. The decoder proceeds by transforming them to the time domain and performing the windowing-overlap-add operation.

In the following, G.722 is described. G.722 is a 50 to 7000 Hz coding system which uses subband adaptive differential pulse code modulation (SB-ADPCM) within a bitrate up to 64 kbit/s. The signal is split into a higher and a lower subband, using a QMF analysis (QMF=Quadrature Mirror Filter). The resulting two bands are ADPCM-coded (ADPCM=Adaptive Differential Pulse Code Modulation).

For G.722, a high-complexity algorithm for packet loss concealment is specified in Appendix III [ITU06a] and a low-complexity algorithm for packet loss concealment is specified in Appendix IV [ITU07]. G.722-Appendix III ([ITU06a, section 111.5]) proposes a gradually performed muting, starting after 20 ms of frame-loss, being completed after 60 ms of frame-loss. Moreover, G.722-Appendix IV proposes a fade-out technique which applies "to each sample a gain factor that is computed and adapted sample by sample" [ITU07, section IV.6.1.2.7].

In G.722, the muting process takes place in the subband domain just before the QMF synthesis and as the last step of the PLC module. The calculation of the muting factor is performed using class information from the signal classifier which also is part of the PLC module. The distinction is made between classes TRANSIENT, UV_TRANSITION and others. Furthermore, distinction is made between single losses of 10-ms frames and other cases (multiple losses of 10-ms frames and single/multiple losses of 20-ms frames).

This is illustrated by FIG. 3. In particular, FIG. 3 depicts a scenario, where the fade-out factor of G.722, depends on class information and wherein 80 samples are equivalent to 10 ms.

According to G.722, the PLC module creates the signal for the missing frame and some additional signal (10 ms) which is supposed to be cross-faded with the next good frame. The muting for this additional signal follows the same rules. In highband concealment of G.722, cross-fading does not take place.

In the following, G.722.1 is considered. G.722.1, which is based on Siren 7, is a transform based wide band audio codec with a super wide band extension mode, referred to as G.722.1C. G. 722.1C itself is based on Siren 14. The ITU-T recommends for G.722.1 a frame-repetition with subsequent muting [ITU05, section 4.7]. If the decoder is informed, by means of an external signaling mechanism not defined in this recommendation, that a frame has been lost or corrupted, it repeats the previous frame's decoded MLT (Modulated Lapped Transform) coefficients. It proceeds by transforming them to the time domain, and performing the overlap and add operation with the previous and next frame's decoded information. If the previous frame was also lost or corrupted, then the decoder sets all the current frames MLT coefficients to zero.

Now, G.729 is considered. G.729 is an audio data compression algorithm for voice that compresses digital voice in packets of 10 milliseconds duration. It is officially described as Coding of speech at 8 kbit/s using code-excited linear prediction speech coding (CS-ACELP) [ITU12].

As outlined in [CPK08], G.729 recommends a fade-out in the LP domain. The PLC algorithm employed in the G.729 standard reconstructs the speech signal for the current frame based on previously-received speech information. In other words, the PLC algorithm replaces the missing excitation with an equivalent characteristic of a previously received frame, though the excitation energy gradually decays finally, the gains of the adaptive and fixed codebooks are attenuated by a constant factor.

The attenuated fixed-codebook gain is given by:

$$g_c^{(m)}=0.98\cdot g_c^{(m-1)}$$

with m is the subframe index.

The adaptive-codebook gain is based on an attenuated version of the previous adaptive-codebook gain:

$$g_p^{(m)}=0.9\cdot g_p^{(m-1)},\ \text{bounded by}\ g_p^{(m)}<0.9$$

Nam in Park et al. suggest for G.729, a signal amplitude control using prediction by means of linear regression [CPK08, PKJ+11]. It is addressed to burst packet loss and uses linear regression as a core technique. Linear regression is based on the linear model as $$g_i'=a+bi \quad (2)$$

where $g_i'$ is the newly predicted current amplitude, a and b are coefficients for the first order linear function, and i is the index of the frame. In order to find the optimized coefficients a* and b*, the summation of the squared prediction error is minimized:

$$\epsilon = \sum_{j=i-4}^{i-1} (g_j - g_j')^2 \quad (3)$$

ε is the squared error, $g_j$ is the original past j-th amplitude. To minimize this error, simply the derivative regarding a and b is set to zero. By using the optimized parameters a* and b*, an estimate of each $g_i$* is denoted by $$g_i^*=a^*+b^*i \quad (4)$$

FIG. 4 shows the amplitude prediction, in particular, the prediction of the amplitude $g_i$*, by using linear regression.

To obtain the amplitude $A_i'$ of the lost packet i, a ratio $\sigma_i$ $$\sigma_i = \frac{g_i^*}{g_{i-1}} \quad (5)$$

is multiplied with a scale factor $S_i$:

$$A_i'=S_i*\sigma_i \quad (6)$$

wherein the scale factor $S_i$ depends on the number of consecutive concealed frames l(i):

$$S_i = \begin{cases} 1.0, & \text{if } l(i) = 1, 2 \\ 0.9, & \text{if } l(i) = 3, 4 \\ 0.8, & \text{if } l(i) = 5, 6 \\ 0, & \text{otherwise} \end{cases} \quad (7)$$

In [PKJ+11], a slightly different scaling is proposed.

According to G.729, afterwards, $A_i'$ will be smoothed to prevent discrete attenuation at frame borders. The final, smoothed amplitude $A_i(n)$ is multiplied to the excitation, obtained from the previous PLC components.

In the following, G.729.1 is considered. G.729.1 is a G.729-based embedded variable bitrate coder: An 8-32 kbit/s scalable wideband coder bitstream inter-operable with G.729 [ITU06b].

According to G.729.1, as in G.718 (see above), an adaptive fade out is proposed, which depends on the stability of the signal characteristics ([ITU06b, section 7.6.1]). During concealment, the signal is usually attenuated based on an attenuation factor α which depends on the parameters of the last good received frame class and the number of consecutive erased frames. The attenuation factor α is further dependent on the stability of the LP filter for UNVOICED frames. In general, the attenuation is slow if the last good received frame is in a stable segment and is rapid if the frame is in a transition segment.

Furthermore, the attenuation factor α depends on the average pitch gain per subframe $\bar{g}_p$ ([ITU06b, eq. 163, 164]):

$$\bar{g}_p=0.1g_p^{(0)}+0.2g_p^{(1)}+0.3g_p^{(2)}+0.4g_p^{(3)} \quad (8)$$

where $g_p^{(i)}$ is the pitch gain in subframe i.

Table 2 shows the calculation scheme of α, where $$\beta=\sqrt{\bar{g}_p} \text{ with } 0.85\geq\beta\geq0.98 \quad (9)$$

During the concealment process, a is used in the following concealment tools:

TABLE 2

Values of the attenuation factor α, the value θ is a stability factor computed from a distance measure between the adjacent LP filters. [ITU06b, section 7.6.1].

| last good received frame | Number of successive erased frames | α |
|---|---|---|
| VOICED | 1 | β |
| | 2, 3 | $\bar{g}_p$ |
| | >3 | 0.4 |
| ONSET | 1 | 0.8 β |
| | 2, 3 | $\bar{g}_p$ |
| | >3 | 0.4 |
| ARTIFICIAL ONSET | 1 | 0.6 β |
| | 2, 3 | $\bar{g}_p$ |
| | >3 | 0.4 |
| VOICED TRANSITION | ≤2 | 0.8 |
| | >2 | 0.2 |
| UNVOICED TRANSITION | | 0.88 |
| UNVOICED | 1 | 0.95 |
| | 2.3 | 0.6 θ + 0.4 |
| | >3 | 0.4 |

According to G.729.1, regarding glottal pulse resynchronization, as the last pulse of the excitation of the previous frame is used for the construction of the periodic part, its gain is approximately correct at the beginning of the concealed frame and can be set to 1. The gain is then attenuated linearly throughout the frame on a sample-by-sample basis to achieve the value of α at the end of the frame. The energy evolution of voiced segments is extrapolated by using the pitch excitation gain values of each subframe of the last good frame. In general, if these gains are greater than 1, the signal energy is increasing, if they are lower than 1, the energy is decreasing. α is thus set to $\beta=\sqrt{\bar{g}_p}$ as described above, see [ITU06b, eq. 163, 164]. The value of β is clipped between 0.98 and 0.85 to avoid strong energy increases and decreases, see [ITU06b, section 7.6.4].

Regarding the construction of the random part of the excitation, according to G.729.1, at the beginning of an erased block, the innovation gain $g_s$ is initialized by using the innovation excitation gains of each subframe of the last good frame:

$$g_s=0.1g^{(0)}+0.2g^{(1)}+0.3g^{(2)}+0.4g^{(3)}$$

wherein $g^{(0)}$, $g^{(1)}$, $g^{(2)}$ and $g^{(3)}$ are the fixed codebook, or innovation, gains of the four subframes of the last correctly received frame. The innovation gain attenuation is done as:

$$g_s^{(1)}=\alpha\cdot g_s^{(0)}$$

wherein $g_s^{(1)}$ is the innovation gain at the beginning of the next frame, $g_s^{(0)}$ is the innovation gain at the beginning of the current frame, and a is as defined in Table 2 above. Similarly to the periodic excitation attenuation, the gain is thus linearly attenuated throughout the frame on a sample by sample basis starting with $g_s^{(0)}$ and going to the value of $g_s^{(1)}$ that would be achieved at the beginning of the next frame.

According, to G.729.1, if the last good frame is UNVOICED, only the innovation excitation is used and it is further attenuated by a factor of 0.8. In this case, the past excitation buffer is updated with the innovation excitation as no periodic part of the excitation is available, see [ITU06b, section 7.6.6].

In the following, AMR is considered. 3GPP AMR [3GP12b] is a speech codec utilizing the ACELP algorithm. AMR is able to code speech with a sampling rate of 8000 samples/s and a bitrate between 4.75 and 12.2 kbit/s and supports signaling silence descriptor frames (DTX/CNG).

In AMR, during error concealment (see [3GP12a]), it is distinguished between frames which are error prone (bit errors) and frames, that are completely lost (no data at all).

For ACELP concealment, AMR introduces a state machine which estimates the quality of the channel: The larger the value of the state counter, the worse the channel quality is. The system starts in state 0. Each time a bad frame is detected, the state counter is incremented by one and is saturated when it reaches 6. Each time a good speech frame is detected, the state counter is reset to zero, except when the state is 6, where the state counter is set to 5. The control flow of the state machine can be described by the following C code (BFI is a bad frame indicator, State is a state variable):

```
if(BFI != 0 ) {
   State = State + 1;
}
else if (State == 6) {
   State = 5;
}
else {
   State = 0;
}
if (State > 6 ) {
   State = 6;
}
```

In addition to this state machine, in AMR, the bad frame flags from the current and the previous frames are checked (prevBFI).

Three different combinations are possible:

The first one of the three combinations is BFI=0, prevBFI=0, State=0: No error is detected in the received or in the previous received speech frame. The received speech parameters are used in the normal way in the speech synthesis. The current frame of speech parameters is saved.

The second one of the three combinations is BFI=0, prevBFI=1, State=0 or 5: No error is detected in the received speech frame, but the previous received speech frame was bad. The LTP gain and fixed codebook gain are limited below the values used for the last received good subframe:

$$g_p = \begin{cases} g_p, & g_p \le g_p(-1) \\ g_p(-1), & g_p > g_p(-1) \end{cases} \tag{10}$$

where $g_p$=current decoded LTP gain, $g_p(-1)$=LTP gain used for the last good subframe (BFI=0), and $$g_c = \begin{cases} g_c, & g_c \le g_c(-1) \\ g_c(-1), & g_c > g_c(-1) \end{cases} \tag{11}$$

where $g_c$=current decoded fixed codebook gain, and $g_c(-1)$= fixed codebook gain used for the last good subframe (BFI=0).

The rest of the received speech parameters are used normally in the speech synthesis. The current frame of speech parameters is saved.

The third one of the three combinations is BFI=1, prevBFI=0 or 1, State=1 . . . 6: An error is detected in the received speech frame and the substitution and muting procedure is started. The LTP gain and fixed codebook gain are replaced by attenuated values from the previous subframes:

$$g_p = \begin{cases} P(\text{state}) \cdot g_p(-1), & g_p(-1) \le \text{median5}(g_p(-1), \ldots, g_p(-5)) \\ P(\text{state}) \cdot \text{median5}(g_p(-1), \ldots, g_p(-5)) & g_p(-1) > \text{median5}(g_p(-1), \ldots, g_p(-5)) \end{cases} \tag{12}$$

where $g_p$ indicates the current decoded LTP gain and $g_p(-1), \ldots, g_p(-n)$ indicate the LTP gains used for the last n subframes and median5( ) indicates a 5-point median operation and P(state)=attenuation factor, where (P(1)=0.98, P(2)=0.98, P(3)=0.8, P(4)=0.3, P(5)=0.2, P(6)=0.2) and state=state number, and $$g_c = \begin{cases} C(\text{state}) \cdot g_c(-1), & g_c(-1) \le \text{median5}(g_c(-1), \ldots, g_c(-5)) \\ C(\text{state}) \cdot \text{median5}(g_c(-1), \ldots, g_c(-5)) & g_c(-1) > \text{median5}(g_c(-1), \ldots, g_c(-5)) \end{cases} \tag{13}$$

where $g_c$ indicates the current decoded fixed codebook gain and $g_c(-1), \ldots, g_c(-n)$ indicate the fixed codebook gains used for the last n subframes and median5( ) indicates a 5-point median operation and C(state)=attenuation factor, where (C(1)=0.98, C(2)=0.98, C(3)=0.98, C(4)=0.98, C(5)=0.98, C(6)=0.7) and state=state number.

In AMR, the LTP-lag values (LTP=Long-Term Prediction) are replaced by the past value from the 4$^{th}$ subframe of the previous frame (12.2 mode) or slightly modified values based on the last correctly received value (all other modes).

According to AMR, the received fixed codebook innovation pulses from the erroneous frame are used in the state in which they were received when corrupted data are received. In the case when no data were received random fixed codebook indices should be employed.

Regarding CNG in AMR, according to [3GP12a, section 6.4], each first lost SID frame is substituted by using the SID information from earlier received valid SID frames and the procedure for valid SID frames is applied. For subsequent lost SID frames, an attenuation technique is applied to the comfort noise that will gradually decrease the output level.

Therefore it is checked if the last SID update was more than 50 frames (=1 s) ago, if yes, the output will be muted (level attenuation by −6/8 dB per frame [3GP12d, dtx_dec { } @sp_dec.c] which yields 37.5 dB per second). Note that the fade-out applied to CNG is performed in the LP domain.

In the following, AMR-WB is considered. Adaptive Multirate-WB [ITU03, 3GP09c] is a speech codec, ACELP, based on AMR (see section 1.8). It uses parametric bandwidth extension and also supports DTX/CNG. In the description of the standard [3GP12g] there are concealment example solutions given which are the same as for AMR [3GP12a] with minor deviations. Therefore, just the differences to AMR are described here. For the standard description, see the description above.

Regarding ACELP, in AMR-WB, the ACELP fade-out is performed based on the reference source code [3GP12c] by modifying the pitch gain $g_p$ (for AMR above referred to as LTP gain) and by modifying the code gain $g_c$.

In case of lost frame, the pitch gain $g_p$ for the first subframe is the same as in the last good frame, except that it is limited between 0.95 and 0.5. For the second, the third and the following subframes, the pitch gain $g_p$ is decreased by a factor of 0.95 and again limited.

AMR-WB proposes that in a concealed frame, $g_c$ is based on the last $g_c$:

$$g_{c,current} = g_{c,past} * (1.4 - g_{p,past}) \tag{14}$$

$$g_c = g_{c,current} * g_{c_{inov}} \tag{15}$$

$$g_{c_{inov}} = \frac{1.0}{\sqrt{\frac{ener_{inov}}{\text{subframe\_size}}}} \tag{16}$$

$$ener_{inov} = \sum_{i=0}^{subframe\_size-1} \text{code}[i] \tag{17}$$

For concealing the LTP-lags, in AMR-WB, the history of the five last good LTP-lags and LTP-gains are used for finding the best method to update, in case of a frame loss. In case the frame is received with bit errors a prediction is performed, whether the received LTP lag is usable or not [3GP12g].

Regarding CNG, in AMR-WB, if the last correctly received frame was a SID frame and a frame is classified as lost, it shall be substituted by the last valid SID frame information and the procedure for valid SID frames should be applied.

For subsequent lost SID frames, AMR-WB proposes to apply an attenuation technique to the comfort noise that will gradually decrease the output level. Therefore it is checked if the last SID update was more than 50 frames (=1 s) ago, if yes, the output will be muted (level attenuation by −3/8 dB per frame [3GP12f, dtx_dec{ }@dtx.c] which yields 18.75 dB per second). Note that the fade-out applied to CNG is performed in the LP domain.

Now, AMR-WB+ is considered. Adaptive Multirate-WB+ [3GP09a] is a switched codec using ACELP and TCX (TCX=Transform Coded Excitation) as core codecs. It uses parametric bandwidth extension and also supports DTX/CNG.

In AMR-WB+, a mode extrapolation logic is applied to extrapolate the modes of the lost frames within a distorted superframe. This mode extrapolation is based on the fact that there exists redundancy in the definition of mode indicators. The decision logic (given in [3GP09a, FIG. 18]) proposed by AMR-WB+ is as follows:

A vector mode, ($m_{-1}$, $m_0$, $m_1$, $m_2$, $m_3$), is defined, where $m_{-1}$ indicates the mode of the last frame of the previous superframe and $m_0$, $m_1$, $m_2$, $m_3$ indicate the modes of the frames in the current superframe (decoded from the bitstream), where $m_k$=−1, 0, 1, 2 or 3 (−1: lost, 0: ACELP, 1: TCX20, 2: TCX40, 3: TCX80), and where the number of lost frames nloss may be between 0 and 4.

If $m_{-1}$=3 and two of the mode indicators of the frames 0-3 are equal to three, all indicators will be set to three because then it is for sure that one TCX80 frame was indicated within the superframe.

If only one indicator of the frames 0-3 is three (and the number of lost frames nloss is three), the mode will be set to (1, 1, 1, 1), because then ¾ of the TCX80 target spectrum is lost and it is very likely that the global TCX gain is lost.

If the mode is indicating (x, 2, −1, x, x) or (x, −1, 2, x, x), it will be extrapolated to (x, 2, 2, x, x), indicating a TCX40 frame. If the mode indicates (x, x, x, 2, −1) or (x, x, −1, 2) it will be extrapolated to (x, x, x, 2, 2), also indicating a TCX40 frame. It should be noted that (x, [0, 1], 2, 2, [0, 1]) are invalid configurations.

After that, for each frame that is lost (mode=−1), the mode is set to ACELP (mode=0) if the preceding frame was ACELP and the mode is set to TCX20 (mode=1) for all other cases.

Regarding ACELP, according to AMR-WB+, if a lost frames mode results in $m_k$=0 after the mode extrapolation, the same approach as in [3GP12g] is applied for this frame (see above).

In AMR-WB+, depending on the number of lost frames and the extrapolated mode, the following TCX related concealment approaches are distinguished (TCX=Transform Coded Excitation):

If a full frame is lost, then an ACELP like concealment is applied: The last excitation is repeated and concealed ISF coefficients (slightly shifted towards their adaptive mean) are used to synthesize the time domain signal. Additionally, a fade-out factor of 0.7 per frame (20 ms) [3GP09b, dec_tcx.c] is multiplied in the linear predictive domain, right before the LPC (Linear Predictive Coding) synthesis.

If the last mode was TCX80 as well as the extrapolated mode of the (partially lost) superframe is TCX80 (nloss=[1, 2], mode=(3, 3, 3, 3, 3)), concealment is performed in the FFT domain, utilizing phase and amplitude extrapolation, taking the last correctly received frame into account. The extrapolation approach of the phase information is not of any interest here (no relation to fading strategy) and therefore not described. For further details, see [3GP09a, section 6.5.1.2.4]. With respect to the amplitude modification of AMR-WB+, the approach performed for TCX concealment consists of the following steps [3GP09a, section 6.5.1.2.3]:

The previous frame magnitude spectrum is computed:

$$\text{old}A[k]=|\text{old}\hat{X}[k]|$$

The current frame magnitude spectrum is computed:

$$A[k]=|\hat{X}[k]|$$

The gain difference of energy of non-lost spectral coefficients between the previous and the current frame is computed:

$$\text{gain}=\sqrt{\frac{\sum A[k]^2}{\sum \text{old}A[k]^2}}$$

The amplitude of the missing spectral coefficients is extrapolated using:

$$\text{if}(\text{lost}[k])\ A[k]=\text{gain}\cdot\text{old}A[k]$$

In every other case of a lost frame with $m_k$=[2, 3], the TCX target (inverse FFT of decoded spectrum plus noise fill-in (using a noise level decoded from the bitstream)) is synthesized using all available info (including global TCX gain). No fade-out is applied in this case.

Regarding CNG in AMR-WB+, the same approach as in AMR-WB is used (see above).

In the following, OPUS is considered. OPUS [IET12] incorporates technology from two codecs: the speech-oriented SILK (known as the Skype codec) and the low-latency CELT (CELT=Constrained-Energy Lapped Transform). Opus can be adjusted seamlessly between high and low bitrates, and internally, it switches between a linear prediction codec at lower bitrates (SILK) and a transform codec at higher bitrates (CELT) as well as a hybrid for a short overlap.

Regarding SILK audio data compression and decompression, in OPUS, there are several parameters which are attenuated during concealment in the SILK decoder routine. The LTP gain parameter is attenuated by multiplying all LPC coefficients with either 0.99, 0.95 or 0.90 per frame, depending on the number of consecutive lost frames, where the excitation is built up using the last pitch cycle from the excitation of the previous frame. The pitch lag parameter is very slowly increased during consecutive losses. For single losses it is kept constant compared to the last frame. Moreover, the excitation gain parameter is exponentially attenuated with $0.99^{lost_{cnt}}$ per frame, so that the excitation gain parameter is 0.99 for the first excitation gain parameter, so that the excitation gain parameter is 0.992 for the second excitation gain parameter, and so on. The excitation is generated using a random number generator which is generating white noise by variable overflow. Furthermore, the LPC coefficients are extrapolated/averaged based on the last correctly received set of coefficients. After generating the attenuated excitation vector, the concealed LPC coefficients are used in OPUS to synthesize the time domain output signal.

Now, in the context of OPUS, CELT is considered. CELT is a transform based codec. The concealment of CELT features a pitch based PLC approach, which is applied for up to five consecutively lost frames. Starting with frame 6, a noise like concealment approach is applied, which generating background noise, which characteristic is supposed to sound like preceding background noise.

FIG. 5 illustrates the burst loss behavior of CELT. In particular, FIG. 5 depicts a spectrogram (x-axis: time; y-axis: frequency) of a CELT concealed speech segment. The light grey box indicates the first 5 consecutively lost frames, where the pitch based PLC approach is applied. Beyond that, the noise like concealment is shown. It should be noted that the switching is performed instantly, it does not transit smoothly.

Regarding pitch based concealment, in OPUS, the pitch based concealment consists of finding the periodicity in the decoded signal by autocorrelation and repeating the windowed waveform (in the excitation domain using LPC analysis and synthesis) using the pitch offset (pitch lag). The windowed waveform is overlapped in such a way as to preserve the time-domain aliasing cancellation with the previous frame and the next frame [IET12]. Additionally a fade-out factor is derived and applied by the following code:

```
opus_val32 E1=1, E2=1;
int period;
if (pitch_index <= MAX_PERIOD/2) {
   period = pitch_index;
}
else {
   period = MAX_PERIOD/2;
}
for (i=0;i<period;i++)
{
   E1 += exc[MAX_PERIOD- period+i] * exc[MAX_PERIOD- period+i];
   E2 += exc[MAX_PERIOD-2*period+i] * exc[MAX_PERIOD-2*period+i];
}
if (E1 > E2) {
   E1 = E2;
}
decay = sqrt(E1/E2));
attenuation = decay;
```

In this code, exc contains the excitation signal up to MAX_PERIOD samples before the loss.

The excitation signal is later multiplied with attenuation, then synthesized and output via LPC synthesis.

The fading algorithm for the time domain approach can be summarized like this:

Find the pitch synchronous energy of the last pitch cycle before the loss.

Find the pitch synchronous energy of the second last pitch cycle before the loss.

If the energy is increasing, limit it to stay constant: attenuation=1

If the energy is decreasing, continue with the same attenuation during concealment.

Regarding noise like concealment, according to OPUS, for the $6^{th}$ and following consecutive lost frames a noise substitution approach in the MDCT domain is performed, in order to simulate comfort background noise.

Regarding tracing of the background noise level and shape, in OPUS, the background noise estimate is performed as follows: After the MDCT analysis, the square root of the MDCT band energies is calculated per frequency band, where the grouping of the MDCT bins follows the bark scale according to [IET12, Table 55]. Then the square root of the energies is transformed into the $\log_2$ domain by:

$$\text{band Log}\,E[i]=\log_2(e)\cdot\log_e(\text{band}E[i]-e\text{Means}[i])\ \text{for}\ i=0\ldots21 \tag{18}$$

wherein e is the Euler's number, bandE is the square root of the MDCT band and eMeans is a vector of constants (useful for getting the result zero mean, which results in an enhanced coding gain).

In OPUS, the background noise is logged on the decoder side like this [IET12, amp2 Log 2 and log 2Amp @ quant_bands.c]:

$$\text{background Log } E[i]=\min(\text{background Log } E[i]+8\cdot 0.001,\text{band Log } E[i]) \text{ for } i=0 \ldots 21 \quad (19)$$

The traced minimum energy is basically determined by the square root of the energy of the band of the current frame, but the increase from one frame to the next is limited by 0.05 dB.

Regarding the application of the background noise level and shape, according to OPUS, if the noise like PLC is applied, backgroundLogE as derived in the last good frame is used and converted back to the linear domain:

$$\text{band}E[i]=e^{(\log_e(2)\cdot(\text{background Log } E[i]+\text{eMeans}[i]))} \text{ for } i=0 \ldots 21 \quad (20)$$

where e is the Euler's number and eMeans is the same vector of constants as for the "linear to log" transform.

The current concealment procedure is to fill the MDCT frame with white noise produced by a random number generator, and scale this white noise in a way that it matches band wise to the energy of bandE. Subsequently, the inverse MDCT is applied which results in a time domain signal. After the overlap add and deemphasis (like in regular decoding) it is put out.

In the following, MPEG-4 HE-AAC is considered (MPEG=Moving Picture Experts Group; HE-AAC=High Efficiency Advanced Audio Coding). High Efficiency Advanced Audio Coding consists of a transform based audio codec (AAC), supplemented by a parametric bandwidth extension (SBR).

Regarding AAC (AAC=Advanced Audio Coding), the DAB consortium specifies for AAC in DAB+, a fade-out to zero in the frequency domain [EBU10, section A1.2] (DAB=Digital Audio Broadcasting). Fade-out behavior, e.g., the attenuation ramp, might be fixed or adjustable by the user. The spectral coefficients from the last AU (AU=Access Unit) are attenuated by a factor corresponding to the fade-out characteristics and then passed to the frequency-to-time mapping. Depending on the attenuation ramp, the concealment switches to muting after a number of consecutive invalid AUs, which means the complete spectrum will be set to 0.

The DRM (DRM=Digital Rights Management) consortium specifies for AAC in DRM a fade-out in the frequency domain [EBU12, section 5.3.3]. Concealment works on the spectral data just before the final frequency to time conversion. If multiple frames are corrupted, concealment implements first a fadeout based on slightly modified spectral values from the last valid frame. Moreover, similar to DAB+, fade-out behavior, e.g., the attenuation ramp, might be fixed or adjustable by the user. The spectral coefficients from the last frame are attenuated by a factor corresponding to the fade-out characteristics and then passed to the frequency to-time mapping. Depending on the attenuation ramp, the concealment switches to muting after a number of consecutive invalid frames, which means the complete spectrum will be set to 0.

3GPP introduces for AAC in Enhanced aacPlus the fade-out in the frequency domain similar to DRM [3GP12e, section 5.1]. Concealment works on the spectral data just before the final frequency to time conversion. If multiple frames are corrupted, concealment implements first a fade-out based on slightly modified spectral values from the last good frame. A complete fading out takes 5 frames. The spectral coefficients from the last good frame are copied and attenuated by a factor of:

$$\text{fadeOutFac}=2^{-(nFadeOutFrame/2)}$$

with nFadeOutFrame as frame counter since the last good frame. After five frames of fading out the concealment switches to muting, that means the complete spectrum will be set to 0.

Lauber and Sperschneider introduce for AAC a frame-wise fade-out of the MDCT spectrum, based on energy extrapolation [LS01, section 4.4]. Energy shapes of a preceding spectrum might be used to extrapolate the shape of an estimated spectrum. Energy extrapolation can be performed independent of the concealment techniques as a kind of post concealment.

Regarding AAC, the energy calculation is performed on a scale factor band basis in order to be close to the critical bands of the human auditory system. The individual energy values are decreased on a frame by frame basis in order to reduce the volume smoothly, e.g., to fade out the signal. This is done since the probability, that the estimated values represent the current signal, decreases rapidly over time.

For the generation of the spectrum to be fed out they suggest frame repetition or noise substitution [LS01, sections 3.2 and 3.3].

Quackenbusch and Driesen suggest for AAC an exponential frame-wise fade-out to zero [QD03]. A repetition of adjacent set of time/frequency coefficients is proposed, wherein each repetition has exponentially increasing attenuation, thus fading gradually to mute in the case of extended outages.

Regarding SBR (SBR=Spectral Band Replication) in MPEG-4 HE-AAC, 3GPP suggests for SBR in Enhanced aacPlus to buffer the decoded envelope data and, in case of a frame loss, to reuse the buffered energies of the transmitted envelope data and to decrease them by a constant ratio of 3 dB for every concealed frame. The result is fed into the normal decoding process where the envelope adjuster uses it to calculate the gains, used for adjusting the patched highbands created by the HF generator. SBR decoding then takes place as usual. Moreover, the delta coded noise floor and sine level values are being deleted. As no difference to the previous information remains available, the decoded noise floor and sine levels remain proportional to the energy of the HF generated signal [3GP12e, section 5.2].

The DRM consortium specified for SBR in conjunction with AAC the same technique as 3GPP [EBU12, section 5.6.3.1]. Moreover, The DAB consortium specifies for SBR in DAB+ the same technique as 3GPP [EBU10, section A2].

In the following, MPEG-4 CELP and MPEG-4 HVXC (HVXC=Harmonic Vector Excitation Coding) are considered. The DRM consortium specifies for SBR in conjunction with CELP and HVXC [EBU12, section 5.6.3.2] that the minimum requirement concealment for SBR for the speech codecs is to apply a predetermined set of data values, whenever a corrupted SBR frame has been detected. Those values yield a static highband spectral envelope at a low relative playback level, exhibiting a roll-off towards the higher frequencies. The objective is simply to ensure that no ill-behaved, potentially loud, audio bursts reach the listner's ears, by means of inserting "comfort noise" (as opposed to strict muting). This is in fact no real fade-out but rather a jump to a certain energy level in order to insert some kind of comfort noise.

Subsequently, an alternative is mentioned [EBU12, section 5.6.3.2] which reuses the last correctly decoded data and slowly fading the levels (L) towards 0, analogously to the AAC+SBR case.

Now, MPEG-4 HILN is considered (HILN=Harmonic and Individual Lines plus Noise). Meine et al. introduce a fade-out for the parametric MPEG-4 HILN codec [ISO09] in a parametric domain [MEP01]. For continued harmonic components a good default behavior for replacing corrupted differentially encoded parameters is to keep the frequency constant, to reduce the amplitude by an attenuation factor (e.g., −6 dB), and to let the spectral envelope converge towards that of the averaged low-pass characteristic. An alternative for the spectral envelope would be to keep it unchanged. With respect to amplitudes and spectral envelopes, noise components can be treated the same way as harmonic components.

In the following, tracing of the background noise level in conventional technology is considered. Rangachari and Loizou [RL06] provide a good overview of several methods and discuss some of their limitations. Methods for tracing the background noise level are, e.g., minimum tracking procedure [RL06] [Coh03] [SFB00] [Dob95], VAD based (VAD=voice activity detection); Kalman filtering [Gan05] [BJH06], subspace decompositions [BP06] [HJH08]; Soft Decision [SS98] [MPC89] [HE95], and minimum statistics.

The minimum statistics approach was chosen to be used within the scope for USAC-2, (USAC=Unified Speech and Audio Coding) and is subsequently outlined in more detail.

Noise power spectral density estimation based on optimal smoothing and minimum statistics [March01] introduces a noise estimator, which is capable of working independently of the signal being active speech or background noise. In contrast to other methods, the minimum statistics algorithm does not use any explicit threshold to distinguish between speech activity and speech pause and is therefore more closely related to soft-decision methods than to the traditional voice activity detection methods. Similar to soft-decision methods, it can also update the estimated noise PSD (Power Spectral Density) during speech activity.

The minimum statistics method rests on two observations namely that the speech and the noise are usually statistically independent and that the power of a noisy speech signal frequently decays to the power level of the noise. It is therefore possible to derive an accurate noise PSD (PSD=power spectral density) estimate by tracking the minimum of the noisy signal PSD. Since the minimum is smaller than (or in other cases equal to) the average value, the minimum tracking method involves a bias compensation.

The bias is a function of the variance of the smoothed signal PSD and as such depends on the smoothing parameter of the PSD estimator. In contrast to earlier work on minimum tracking, which utilizes a constant smoothing parameter and a constant minimum bias correction, a time and frequency dependent PSD smoothing is used, which also involves a time and frequency dependent bias compensation.

Using minimum tracking provides a rough estimate of the noise power. However, there are some shortcomings. The smoothing with a fixed smoothing parameter widens the peaks of speech activity of the smoothed PSD estimate. This will lead to inaccurate noise estimates as the sliding window for the minimum search might slip into broad peaks. Thus, smoothing parameters close to one cannot be used, and, as a consequence, the noise estimate will have a relatively large variance. Moreover, the noise estimate is biased toward lower values. Furthermore, in case of increasing noise power, the minimum tracking lags behind.

MMSE based noise PSD tracking with low complexity [HHJ10] introduces a background noise PSD approach utilizing an MMSE search used on a DFT (Discrete Fourier Transform) spectrum. The algorithm consists of these processing steps:

- The maximum likelihood estimator is computed based on the noise PSD of the previous frame.
- The minimum mean square estimator is computed.
- The maximum likelihood estimator is estimated using the decision-directed approach [EM84].
- The inverse bias factor is computed assuming that speech and noise DFT coefficients are Gaussian distributed.
- The estimated noise power spectral density is smoothed.

There is also a safety-net approach applied in order to avoid a complete dead lock of the algorithm.

Tracking of non-stationary noise based on data-driven recursive noise power estimation [EH08] introduces a method for the estimation of the noise spectral variance from speech signals contaminated by highly non-stationary noise sources. This method is also using smoothing in time/frequency direction.

A low-complexity noise estimation algorithm based on smoothing of noise power estimation and estimation bias correction [Yu09] enhances the approach introduced in [EH08]. The main difference is, that the spectral gain function for noise power estimation is found by an iterative data-driven method.

Statistical methods for the enhancement of noisy speech [March03] combine the minimum statistics approach given in [March01] by soft-decision gain modification [MCA99], by an estimation of the a-priori SNR [MCA99], by an adaptive gain limiting [MC99] and by a MMSE log spectral amplitude estimator [EM85].

Fade out is of particular interest for a plurality of speech and audio codecs, in particular, AMR (see [3GP12b]) (including ACELP and CNG), AMR-WB (see [3GP09c]) (including ACELP and CNG), AMR-WB+(see [3GP09a]) (including ACELP, TCX and CNG), G.718 (see [ITU08a]), G.719 (see [ITU08b]), G.722 (see [ITU07]), G.722.1 (see [ITU05]), G.729 (see [ITU12, CPK08, PKJ+11]), MPEG-4 HE-AAC/Enhanced aacPlus (see [EBU10, EBU12, 3GP12e, LS01, QD03]) (including AAC and SBR), MPEG-4 HILN (see [ISO09, MEP01]) and OPUS (see [IET12]) (including SILK and CELT).

Depending on the codec, fade-out is performed in different domains:

For codecs that utilize LPC, the fade-out is performed in the linear predictive domain (also known as the excitation domain). This holds true for codecs which are based on ACELP, e.g., AMR, AMR-WB, the ACELP core of AMR-WB+, G.718, G.729, G.729.1, the SILK core in OPUS; codecs which further process the excitation signal using a time-frequency transformation, e.g., the TCX core of AMR-WB+, the CELT core in OPUS; and for comfort noise generation (CNG) schemes, that operate in the linear predictive domain, e.g., CNG in AMR, CNG in AMR-WB, CNG in AMR-WB+.

For codecs that directly transform the time signal into the frequency domain, the fade-out is performed in the spectral/subband domain. This holds true for codecs which are based on MDCT or a similar transformation, such as AAC in MPEG-4 HE-AAC, G.719, G.722 (subband domain) and G.722.1.

For parametric codecs, fade-out is applied in the parametric domain. This holds true for MPEG-4 HILN.

Regarding fade-out speed and fade-out curve, a fade-out is commonly realized by the application of an attenuation factor, which is applied to the signal representation in the appropriate domain. The size of the attenuation factor controls the fade-out speed and the fade-out curve. In most cases the attenuation factor is applied frame wise, but also a sample wise application is utilized see, e.g., G.718 and G.722.

The attenuation factor for a certain signal segment might be provided in two manners, absolute and relative.

In the case where an attenuation factor is provided absolutely, the reference level is the one of the last received frame. Absolute attenuation factors usually start with a value close to 1 for the signal segment immediately after the last good frame and then degrade faster or slower towards 0. The fade-out curve directly depends on these factors. This is, e.g., the case for the concealment described in Appendix IV of G.722 (see, in particular, [ITU07, FIG. IV.7]), where the possible fade-out curves are linear or gradually linear. Considering a gain factor g(n), whereas g(0) represents the gain factor of the last good frame, an absolute attenuation factor $\alpha_{abs}(n)$, the gain factor of any subsequent lost frame can be derived as $$g(n)=\alpha_{abs}(n)\cdot g(0) \tag{21}$$

In the case where an attenuation factor is provided relatively, the reference level is the one from the previous frame. This has advantages in the case of a recursive concealment procedure, e.g., if the already attenuated signal is further processed and attenuated again.

If an attenuation factor is recursively applied, then this might be a fixed value independent of the number of consecutively lost frames, e.g., 0.5 for G.719 (see above); a fixed value relative to the number of consecutively lost frames, e.g., as proposed for G.729 in [CPK08]: 1.0 for the first two frames, 0.9 for the next two frames, 0.8 for the frames 5 and 6, and 0 for all subsequent frames (see above); or a value which is relative to the number of consecutively lost frames and which depends on signal characteristics, e.g., a faster fade-out for an instable signal and a slower fade-out for a stable signal, e.g., G.718 (see section above and [ITU08a, table 44]);

Assuming a relative fade-out factor $0\leq\alpha_{rel}(n)\leq 1$, whereas n is the number of the lost frame ($n\geq 1$); the gain factor of any subsequent frame can be derived as $$g(n)=\alpha_{rel}(n)\cdot g(n-1) \tag{22}$$

$$g(n)=\left(\prod_{m=1}^{n}\alpha(m)\right)\cdot g(0) \tag{23}$$

$$g(n)=\alpha_{rel}^{n}\cdot g(0) \tag{24}$$

resulting in an exponential fading.

Regarding the fade-out procedure, usually, the attenuation factor is specified, but in some application standards (DRM, DAB+) the latter is left to the manufacturer.

If different signal parts are faded separately, different attenuation factors might be applied, e.g., to fade tonal components with a certain speed and noise-like components with another speed (e.g., AMR, SILK).

Usually, a certain gain is applied to the whole frame. When the fading is performed in the spectral domain, this is the only way possible. However, if the fading is done in the time domain or the linear predictive domain, a more granular fading is possible. Such more granular fading is applied in G.718, where individual gain factors are derived for each sample by linear interpolation between the gain factor of the last frame and the gain factor of the current frame.

For codecs with a variable frame duration, a constant, relative attenuation factor leads to a different fade-out speed depending on the frame duration. This is, e.g., the case for AAC, where the frame duration depends on the sampling rate.

To adopt the applied fading curve to the temporal shape of the last received signal, the (static) fade-out factors might be further adjusted. Such further dynamic adjustment is, e.g., applied for AMR where the median of the previous five gain factors is taken into account (see [3GP12b] and section 1.8.1). Before any attenuation is performed, the current gain is set to the median, if the median is smaller than the last gain, otherwise the last gain is used. Moreover, such further dynamic adjustment is, e.g., applied for G729, where the amplitude is predicted using linear regression of the previous gain factors (see [CPK08, PKJ+11] and section 1.6). In this case, the resulting gain factor for the first concealed frames might exceed the gain factor of the last received frame.

Regarding the target level of the fade-out, with the exception of G.718 and CELT, the target level is 0 for all analyzed codecs, including those codecs' comfort noise generation (CNG).

In G.718, fading of the pitch excitation (representing tonal components) and fading of the random excitation (representing noise-like components) is performed separately. While the pitch gain factor is faded to zero, the innovation gain factor is faded to the CNG excitation energy.

Assuming that relative attenuation factors are given, this leads—based on formula (23)—to the following absolute attenuation factor:

$$g(n)=\alpha_{rel}(n)\cdot g(n-1)+(1-\alpha_{rel}(n))\cdot g_n \tag{25}$$

with $g_n$ being the gain of the excitation used during the comfort noise generation. This formula corresponds to formula (23), when $g_n=0$.

G.718 performs no fade-out in the case of DTX/CNG.

In CELT there is no fading towards the target level, but after 5 frames of tonal concealment (including a fade-out) the level is instantly switched to the target level at the $6^{th}$ consecutively lost frame. The level is derived band wise using formula (19).

Regarding the target spectral shape of the fade-out, all analyzed pure transform based codecs (AAC, G.719, G.722, G.722.1) as well as SBR simply prolong the spectral shape of the last good frame during the fade-out.

Various speech codecs fade the spectral shape to a mean using the LPC synthesis. The mean might be static (AMR) or adaptive (AMR-WB, AMR-WB+, G.718), whereas the latter is derived from a static mean and a short term mean (derived by averaging the last n LP coefficient sets) (LP=Linear Prediction).

All CNG modules in the discussed codecs AMR, AMR-WB, AMR-WB+, G.718 prolong the spectral shape of the last good frame during the fade-out.

Regarding background noise level tracing, there are five different approaches known from the literature:

Voice Activity Detector based: based on SNR/VAD, but very difficult to tune and hard to use for low SNR speech.

Soft-decision scheme: The soft-decision approach takes the probability of speech presence into account [SS98] [MPC89] [HE95].

Minimum statistics: The minimum of the PSD is tracked holding a certain amount of values over time in a buffer, thus enabling to find the minimal noise from the past samples [March01] [HHJ10] [EH08] [Yu09].

Kalman Filtering: The algorithm uses a series of measurements observed over time, containing noise (random variations), and produces estimates of the noise PSD that tend to be more precise than those based on a single measurement alone. The Kalman filter operates recursively on streams of noisy input data to produce a statistically optimal estimate of the system state [Gan05] [BJH06].

Subspace Decomposition: This approach tries to decompose a noise like signal into a clean speech signal and a noise part, utilizing for example the KLT (Karhunen-Loève transform, also known as principal component analysis) and/or the DFT (Discrete Time Fourier Transform). Then the eigenvectors/eigenvalues can be traced using an arbitrary smoothing algorithm [BP06] [HJH08].

SUMMARY

According to an embodiment, an apparatus for decoding an audio signal may have: a receiving interface for receiving a plurality of frames, wherein the receiving interface is configured to receive a first frame of the plurality of frames, said first frame including a first audio signal portion of the audio signal, said first audio signal portion being represented in a first domain, and wherein the receiving interface is configured to receive a second frame of the plurality of frames, said second frame including a second audio signal portion of the audio signal, a transform unit for transforming the second audio signal portion or a value or signal derived from the second audio signal portion from a second domain to a tracing domain to acquire a second signal portion information, wherein the second domain is different from the first domain, wherein the tracing domain is different from the second domain, and wherein the tracing domain is equal to or different from the first domain, a noise level tracing unit, wherein the noise level tracing unit is configured to receive a first signal portion information being represented in the tracing domain, wherein the first signal portion information depends on the first audio signal portion, wherein the noise level tracing unit is configured to receive the second signal portion being represented in the tracing domain, and wherein the noise level tracing unit is configured to determine noise level information depending on the first signal portion information being represented in the tracing domain and depending on the second signal portion information being represented in the tracing domain, wherein the noise level information is represented in the tracing domain, and a reconstruction unit for reconstructing a third audio signal portion of the audio signal depending on the noise level information, if a third frame of the plurality of frames is not received by the receiving interface or if said third frame is received by the receiving interface but is corrupted.

According to another embodiment, a method for decoding an audio signal may have the steps of: receiving a first frame of a plurality of frames, said first frame including a first audio signal portion of the audio signal, said first audio signal portion being represented in a first domain, receive a second frame of the plurality of frames, said second frame including a second audio signal portion of the audio signal, transforming the second audio signal portion or a value or signal derived from the second audio signal portion from a second domain to a tracing domain to acquire a second signal portion information, wherein the second domain is different from the first domain, wherein the tracing domain is different from the second domain, and wherein the tracing domain is equal to or different from the first domain, determining noise level information depending on first signal portion information, being represented in the tracing domain, and depending on the second signal portion information being represented in the tracing domain, wherein the first signal portion information depends on the first audio signal portion, reconstructing a third audio signal portion of the audio signal depending on the noise level information, if a third frame of the plurality of frames is not received or if said third frame is received but is corrupted.

Another embodiment may have a computer program for implementing the method of claim 21 when being executed on a computer or signal processor.

An apparatus for decoding an audio signal is provided.

The apparatus comprises a receiving interface. The receiving interface is configured to receive a plurality of frames, wherein the receiving interface is configured to receive a first frame of the plurality of frames, said first frame comprising a first audio signal portion of the audio signal, said first audio signal portion being represented in a first domain, and wherein the receiving interface is configured to receive a second frame of the plurality of frames, said second frame comprising a second audio signal portion of the audio signal.

Moreover, the apparatus comprises a transform unit for transforming the second audio signal portion or a value or signal derived from the second audio signal portion from a second domain to a tracing domain to obtain a second signal portion information, wherein the second domain is different from the first domain, wherein the tracing domain is different from the second domain, and wherein the tracing domain is equal to or different from the first domain.

Furthermore, the apparatus comprises a noise level tracing unit, wherein the noise level tracing unit is configured to receive a first signal portion information being represented in the tracing domain, wherein the first signal portion information depends on the first audio signal portion. The noise level tracing unit is configured to receive the second signal portion being represented in the tracing domain, and wherein the noise level tracing unit is configured to determine noise level information depending on the first signal portion information being represented in the tracing domain and depending on the second signal portion information being represented in the tracing domain.

Moreover, the apparatus comprises a reconstruction unit for reconstructing a third audio signal portion of the audio signal depending on the noise level information, if a third frame of the plurality of frames is not received by the receiving interface but is corrupted.

An audio signal may, for example, be a speech signal, or a music signal, or signal that comprises speech and music, etc.

The statement that the first signal portion information depends on the first audio signal portion means that the first signal portion information either is the first audio signal portion, or that the first signal portion information has been obtained/generated depending on the first audio signal portion or in some other way depends on the first audio signal portion. For example, the first audio signal portion may have been transformed from one domain to another domain to obtain the first signal portion information.

Likewise, a statement that the second signal portion information depends on a second audio signal portion means that the second signal portion information either is the second audio signal portion, or that the second signal portion information has been obtained/generated depending on the second audio signal portion or in some other way depends on the second audio signal portion. For example, the second audio signal portion may have been transformed from one domain to another domain to obtain second signal portion information.

In an embodiment, the first audio signal portion may, e.g., be represented in a time domain as the first domain. Moreover, transform unit may, e.g., be configured to transform the second audio signal portion or the value derived from the second audio signal portion from an excitation domain being the second domain to the time domain being the tracing domain. Furthermore, the noise level tracing unit may, e.g., be configured to receive the first signal portion information being represented in the time domain as the tracing domain. Moreover, the noise level tracing unit may, e.g., be configured to receive the second signal portion being represented in the time domain as the tracing domain.

According to an embodiment, the first audio signal portion may, e.g., be represented in an excitation domain as the first domain. Moreover, the transform unit may, e.g., be configured to transform the second audio signal portion or the value derived from the second audio signal portion from a time domain being the second domain to the excitation domain being the tracing domain. Furthermore, the noise level tracing unit may, e.g., be configured to receive the first signal portion information being represented in the excitation domain as the tracing domain. Moreover, the noise level tracing unit may, e.g., be configured to receive the second signal portion being represented in the excitation domain as the tracing domain.

In an embodiment, the first audio signal portion may, e.g., be represented in an excitation domain as the first domain, wherein the noise level tracing unit may, e.g., be configured to receive the first signal portion information, wherein said first signal portion information is represented in the FFT domain, being the tracing domain, and wherein said first signal portion information depends on said first audio signal portion being represented in the excitation domain, wherein the transform unit may, e.g., be configured to transform the second audio signal portion or the value derived from the second audio signal portion from a time domain being the second domain to an FFT domain being the tracing domain, and wherein the noise level tracing unit may, e.g., be configured to receive the second audio signal portion being represented in the FFT domain.

In an embodiment, the apparatus may, e.g., further comprise a first aggregation unit for determining a first aggregated value depending on the first audio signal portion. Moreover, the apparatus may, e.g., further comprise a second aggregation unit for determining, depending on the second audio signal portion, a second aggregated value as the value derived from the second audio signal portion. Furthermore, the noise level tracing unit may, e.g., be configured to receive the first aggregated value as the first signal portion information being represented in the tracing domain, wherein the noise level tracing unit may, e.g., be configured to receive the second aggregated value as the second signal portion information being represented in the tracing domain, and wherein the noise level tracing unit may, e.g., be configured to determine noise level information depending on the first aggregated value being represented in the tracing domain and depending on the second aggregated value being represented in the tracing domain.

According to an embodiment, the first aggregation unit may, e.g., be configured to determine the first aggregated value such that the first aggregated value indicates a root mean square of the first audio signal portion or of a signal derived from the first audio signal portion. Moreover, the second aggregation unit may, e.g., be configured to determine the second aggregated value such that the second aggregated value indicates a root mean square of the second audio signal portion or of a signal derived from the second audio signal portion.

In an embodiment, the transform unit may, e.g., be configured to transform the value derived from the second audio signal portion from the second domain to the tracing domain by applying a gain value on the value derived from the second audio signal portion.

According to embodiments, the gain value may, e.g., indicate a gain introduced by Linear predictive coding synthesis, or the gain value may, e.g., indicate a gain introduced by Linear predictive coding synthesis and deemphasis.

In an embodiment, the noise level tracing unit may, e.g., be configured to determine noise level information by applying a minimum statistics approach.

According to an embodiment, the noise level tracing unit may, e.g., be configured to determine a comfort noise level as the noise level information. The reconstruction unit may, e.g., be configured to reconstruct the third audio signal portion depending on the noise level information, if said third frame of the plurality of frames is not received by the receiving interface or if said third frame is received by the receiving interface but is corrupted.

In an embodiment, the noise level tracing unit may, e.g., be configured to determine a comfort noise level as the noise level information derived from a noise level spectrum, wherein said noise level spectrum is obtained by applying the minimum statistics approach. The reconstruction unit may, e.g., be configured to reconstruct the third audio signal portion depending on a plurality of Linear Predictive coefficients, if said third frame of the plurality of frames is not received by the receiving interface or if said third frame is received by the receiving interface but is corrupted.

According to another embodiment, the noise level tracing unit may, e.g., be configured to determine a plurality of Linear Predictive coefficients indicating a comfort noise level as the noise level information, and the reconstruction unit may, e.g., be configured to reconstruct the third audio signal portion depending on the plurality of Linear Predictive coefficients.

In an embodiment, the noise level tracing unit is configured to determine a plurality of FFT coefficients indicating a comfort noise level as the noise level information, and the first reconstruction unit is configured to reconstruct the third audio signal portion depending on a comfort noise level derived from said FFT coefficients, if said third frame of the plurality of frames is not received by the receiving interface or if said third frame is received by the receiving interface but is corrupted.

In an embodiment, the reconstruction unit may, e.g., be configured to reconstruct the third audio signal portion depending on the noise level information and depending on the first audio signal portion, if said third frame of the plurality of frames is not received by the receiving interface or if said third frame is received by the receiving interface but is corrupted.

According to an embodiment, the reconstruction unit may, e.g., be configured to reconstruct the third audio signal portion by attenuating or amplifying a signal derived from the first or the second audio signal portion.

In an embodiment, the apparatus may, e.g., further comprise a long-term prediction unit comprising a delay buffer.

Moreover, the long-term prediction unit may, e.g., be configured to generate a processed signal depending on the first or the second audio signal portion, depending on a delay buffer input being stored in the delay buffer and depending on a long-term prediction gain. Furthermore, the long-term prediction unit may, e.g., be configured to fade the long-term prediction gain towards zero, if said third frame of the plurality of frames is not received by the receiving interface or if said third frame is received by the receiving interface but is corrupted.

According to an embodiment, the long-term prediction unit may, e.g., be configured to fade the long-term prediction gain towards zero, wherein a speed with which the long-term prediction gain is faded to zero depends on a fade-out factor.

In an embodiment, the long-term prediction unit may, e.g., be configured to update the delay buffer input by storing the generated processed signal in the delay buffer, if said third frame of the plurality of frames is not received by the receiving interface or if said third frame is received by the receiving interface but is corrupted.

According to an embodiment, the transform unit may, e.g., be a first transform unit, and the reconstruction unit is a first reconstruction unit. The apparatus further comprises a second transform unit and a second reconstruction unit. The second transform unit may, e.g., be configured to transform the noise level information from the tracing domain to the second domain, if a fourth frame of the plurality of frames is not received by the receiving interface or if said fourth frame is received by the receiving interface but is corrupted. Moreover, the second reconstruction unit may, e.g., be configured to reconstruct a fourth audio signal portion of the audio signal depending on the noise level information being represented in the second domain if said fourth frame of the plurality of frames is not received by the receiving interface or if said fourth frame is received by the receiving interface but is corrupted.

In an embodiment, the second reconstruction unit may, e.g., be configured to reconstruct the fourth audio signal portion depending on the noise level information and depending on the second audio signal portion.

According to an embodiment, the second reconstruction unit may, e.g., be configured to reconstruct the fourth audio signal portion by attenuating or amplifying a signal derived from the first or the second audio signal portion.

Moreover, a method for decoding an audio signal is provided.

The method comprises:

Receiving a first frame of a plurality of frames, said first frame comprising a first audio signal portion of the audio signal, said first audio signal portion being represented in a first domain.

Receiving a second frame of the plurality of frames, said second frame comprising a second audio signal portion of the audio signal.

Transforming the second audio signal portion or a value or signal derived from the second audio signal portion from a second domain to a tracing domain to obtain a second signal portion information, wherein the second domain is different from the first domain, wherein the tracing domain is different from the second domain, and wherein the tracing domain is equal to or different from the first domain.

Determining noise level information depending on first signal portion information, being represented in the tracing domain, and depending on the second signal portion information being represented in the tracing domain, wherein the first signal portion information depends on the first audio signal portion. And:

Reconstructing a third audio signal portion of the audio signal depending on the noise level information being represented in the tracing domain, if a third frame of the plurality of frames is not received of if said third frame is received but is corrupted.

Furthermore, a computer program for implementing the above-described method when being executed on a computer or signal processor is provided.

Some of embodiments of the present invention provide a time varying smoothing parameter such that the tracking capabilities of the smoothed periodogram and its variance are better balanced, to develop an algorithm for bias compensation, and to speed up the noise tracking in general.

Embodiments of the present invention are based on the finding that with regard to the fade-out, the following parameters are of interest: The fade-out domain; the fade-out speed, or, more general, fade-out curve; the target level of the fade-out; the target spectral shape of the fade-out; and/or the background noise level tracing. In this context, embodiments are based on the finding that conventional technology has significant drawbacks.

An apparatus and method for improved signal fade out for switched audio coding systems during error concealment is provided.

Moreover, a computer program for implementing the above-described method when being executed on a computer or signal processor is provided.

Embodiments realize a fade-out to comfort noise level. According to embodiments, a common comfort noise level tracing in the excitation domain is realized. The comfort noise level being targeted during burst packet loss will be the same, regardless of the core coder (ACELP/TCX) in use, and it will be up to date. There is no conventional technology known where a common noise level tracing is mandatory. Embodiments provide the fading of a switched codec to a comfort noise like signal during burst packet losses.

Moreover, embodiments realize that the overall complexity will be lower compared to having two independent noise level tracing modules, since functions (PROM) and memory can be shared.

In embodiments, the level derivation in the excitation domain (compared to the level derivation in the time domain) provides more minima during active speech, since part of the speech information is covered by the LP coefficients.

In the case of ACELP, according to embodiments, the level derivation takes place in the excitation domain. In the case of TCX, in embodiments, the level is derived in the time domain, and the gain of the LPC synthesis and de-emphasis is applied as a correction factor in order to model the energy level in the excitation domain. Tracing the level in the excitation domain, e.g., before the FDNS, would theoretically also be possible, but the level compensation between the TCX excitation domain and the ACELP excitation domain is deemed to be rather complex.

No conventional technology incorporates such a common background level tracing in different domains. The conventional techniques do not have such a common comfort noise level tracing, e.g., in the excitation domain, in a switched codec system. Thus, embodiments are advantageous over conventional technology, as for the conventional techniques, the comfort noise level that is targeted during burst packet losses may be different, depending on the preceding coding mode (ACELP/TCX), where the level was traced; as in conventional technology, tracing which is separate for each coding mode will cause unnecessary overhead and additional computational complexity; and as in conventional technology, no up-to-date comfort noise level might be available in either core due to recent switching to this core.

According to some embodiments, level tracing is conducted in the excitation domain, but TCX fade-out is conducted in the time domain. By fading in the time domain, failures of the TDAC are avoided, which would cause aliasing. This becomes of particular interest when tonal signal components are concealed. Moreover, level conversion between the ACELP excitation domain and the MDCT spectral domain is avoided and thus, e.g., computation resources are saved. Because of switching between the excitation domain and the time domain, a level adjustment may be used between the excitation domain and the time domain. This is resolved by the derivation of the gain that would be introduced by the LPC synthesis and the preemphasis and to use this gain as a correction factor to convert the level between the two domains.

In contrast, conventional techniques do not conduct level tracing in the excitation domain and TCX Fade-Out in the Time Domain. Regarding state of the art transform based codecs, the attenuation factor is applied either in the excitation domain (for time-domain/ACELP like concealment approaches, see [3GP09a]) or in the frequency domain (for frequency domain approaches like frame repetition or noise substitution, see [LS01]). A drawback of the approach of conventional technology to apply the attenuation factor in the frequency domain is that aliasing will be caused in the overlap-add region in the time domain. This will be the case for adjacent frames to which different attenuation factors are applied, because the fading procedure causes the TDAC (time domain alias cancellation) to fail. This is particularly relevant when tonal signal components are concealed. The above-mentioned embodiments are thus advantageous over conventional technology.

Embodiments compensate the influence of the high pass filter on the LPC synthesis gain. According to embodiments, to compensate for the unwanted gain change of the LPC analysis and emphasis caused by the high pass filtered unvoiced excitation, a correction factor is derived. This correction factor takes this unwanted gain change into account and modifies the target comfort noise level in the excitation domain such that the correct target level is reached in the time domain.

In contrast, conventional technology, for example, G.718 [ITU08a], introduces a high pass filter into the signal path of the unvoiced excitation, as depicted in FIG. 2, if the signal of the last good frame was not classified as UNVOICED. By this, the conventional techniques cause unwanted side effects, since the gain of the subsequent LPC synthesis depends on the signal characteristics, which are altered by this high pass filter. Since the background level is traced and applied in the excitation domain, the algorithm relies on the LPC synthesis gain, which in return again depends on the characteristics of the excitation signal. In other words: The modification of the signal characteristics of the excitation due to the high pass filtering, as conducted by conventional technology, might lead to a modified (usually reduced) gain of the LPC synthesis. This leads to a wrong output level even though the excitation level is correct.

Embodiments overcome these disadvantages of conventional technology.

In particular, embodiments realize an adaptive spectral shape of comfort noise. In contrast to G.718, by tracing the spectral shape of the background noise, and by applying (fading to) this shape during burst packet losses, the noise characteristic of preceding background noise will be matched, leading to a pleasant noise characteristic of the comfort noise. This avoids obtrusive mismatches of the spectral shape that may be introduced by using a spectral envelope which was derived by offline training and/or the spectral shape of the last received frames.

Moreover, an apparatus for decoding an audio signal is provided. The apparatus comprises a receiving interface, wherein the receiving interface is configured to receive a first frame comprising a first audio signal portion of the audio signal, and wherein the receiving interface is configured to receive a second frame comprising a second audio signal portion of the audio signal.

Moreover, the apparatus comprises a noise level tracing unit, wherein the noise level tracing unit is configured to determine noise level information depending on at least one of the first audio signal portion and the second audio signal portion (this means: depending on the first audio signal portion and/or the second audio signal portion), wherein the noise level information is represented in a tracing domain.

Furthermore, the apparatus comprises a first reconstruction unit for reconstructing, in a first reconstruction domain, a third audio signal portion of the audio signal depending on the noise level information, if a third frame of the plurality of frames is not received by the receiving interface or if said third frame is received by the receiving interface but is corrupted, wherein the first reconstruction domain is different from or equal to the tracing domain.

Moreover, the apparatus comprises a transform unit for transforming the noise level information from the tracing domain to a second reconstruction domain, if a fourth frame of the plurality of frames is not received by the receiving interface or if said fourth frame is received by the receiving interface but is corrupted, wherein the second reconstruction domain is different from the tracing domain, and wherein the second reconstruction domain is different from the first reconstruction domain, and Furthermore, the apparatus comprises a second reconstruction unit for reconstructing, in the second reconstruction domain, a fourth audio signal portion of the audio signal depending on the noise level information being represented in the second reconstruction domain, if said fourth frame of the plurality of frames is not received by the receiving interface or if said fourth frame is received by the receiving interface but is corrupted.

According to some embodiments, the tracing domain may, e.g., be wherein the tracing domain is a time domain, a spectral domain, an FFT domain, an MDCT domain, or an excitation domain. The first reconstruction domain may, e.g., be the time domain, the spectral domain, the FFT domain, the MDCT domain, or the excitation domain. The second reconstruction domain may, e.g., be the time domain, the spectral domain, the FFT domain, the MDCT domain, or the excitation domain.

In an embodiment, the tracing domain may, e.g., be the FFT domain, the first reconstruction domain may, e.g., be the time domain, and the second reconstruction domain may, e.g., be the excitation domain.

In another embodiment, the tracing domain may, e.g., be the time domain, the first reconstruction domain may, e.g., be the time domain, and the second reconstruction domain may, e.g., be the excitation domain.

According to an embodiment, said first audio signal portion may, e.g., be represented in a first input domain, and said second audio signal portion may, e.g., be represented in a second input domain. The transform unit may, e.g., be a second transform unit. The apparatus may, e.g., further comprise a first transform unit for transforming the second audio signal portion or a value or signal derived from the second audio signal portion from the second input domain to the tracing domain to obtain a second signal portion information. The noise level tracing unit may, e.g., be configured to receive a first signal portion information being represented in the tracing domain, wherein the first signal portion information depends on the first audio signal portion, wherein the noise level tracing unit is configured to receive the second signal portion being represented in the tracing domain, and wherein the noise level tracing unit is configured to the determine the noise level information depending on the first signal portion information being represented in the tracing domain and depending on the second signal portion information being represented in the tracing domain.

According to an embodiment, the first input domain may, e.g., be the excitation domain, and the second input domain may, e.g., be the MDCT domain.

In another embodiment, the first input domain may, e.g., be the MDCT domain, and wherein the second input domain may, e.g., be the MDCT domain.

According to an embodiment, the first reconstruction unit may, e.g., be configured to reconstruct the third audio signal portion by conducting a first fading to a noise like spectrum. The second reconstruction unit may, e.g., be configured to reconstruct the fourth audio signal portion by conducting a second fading to a noise like spectrum and/or a second fading of an LTP gain. Moreover, the first reconstruction unit and the second reconstruction unit may, e.g., be configured to conduct the first fading and the second fading to a noise like spectrum and/or a second fading of an LTP gain with the same fading speed.

In an embodiment, the apparatus may, e.g., further comprise a first aggregation unit for determining a first aggregated value depending on the first audio signal portion. Moreover, the apparatus further may, e.g., comprise a second aggregation unit for determining, depending on the second audio signal portion, a second aggregated value as the value derived from the second audio signal portion. The noise level tracing unit may, e.g., be configured to receive the first aggregated value as the first signal portion information being represented in the tracing domain, wherein the noise level tracing unit may, e.g., be configured to receive the second aggregated value as the second signal portion information being represented in the tracing domain, and wherein the noise level tracing unit is configured to determine the noise level information depending on the first aggregated value being represented in the tracing domain and depending on the second aggregated value being represented in the tracing domain.

According to an embodiment, the first aggregation unit may, e.g., be configured to determine the first aggregated value such that the first aggregated value indicates a root mean square of the first audio signal portion or of a signal derived from the first audio signal portion. The second aggregation unit is configured to determine the second aggregated value such that the second aggregated value indicates a root mean square of the second audio signal portion or of a signal derived from the second audio signal portion.

In an embodiment, the first transform unit may, e.g., be configured to transform the value derived from the second audio signal portion from the second input domain to the tracing domain by applying a gain value on the value derived from the second audio signal portion.

According to an embodiment, the gain value may, e.g, indicate a gain introduced by Linear predictive coding synthesis, or wherein the gain value indicates a gain introduced by Linear predictive coding synthesis and deemphasis.

In an embodiment, the noise level tracing unit may, e.g., be configured to determine the noise level information by applying a minimum statistics approach.

According to an embodiment, the noise level tracing unit may, e.g., be configured to determine a comfort noise level as the noise level information. The reconstruction unit may, e.g., be configured to reconstruct the third audio signal portion depending on the noise level information, if said third frame of the plurality of frames is not received by the receiving interface or if said third frame is received by the receiving interface but is corrupted.

In an embodiment, the noise level tracing unit may, e.g., be configured to determine a comfort noise level as the noise level information derived from a noise level spectrum, wherein said noise level spectrum is obtained by applying the minimum statistics approach. The reconstruction unit may, e.g., be configured to reconstruct the third audio signal portion depending on a plurality of Linear Predictive coefficients, if said third frame of the plurality of frames is not received by the receiving interface or if said third frame is received by the receiving interface but is corrupted.

According to an embodiment, the first reconstruction unit may, e.g., be configured to reconstruct the third audio signal portion depending on the noise level information and depending on the first audio signal portion, if said third frame of the plurality of frames is not received by the receiving interface or if said third frame is received by the receiving interface but is corrupted.

In an embodiment, the first reconstruction unit may, e.g., be configured to reconstruct the third audio signal portion by attenuating or amplifying the first audio signal portion.

According to an embodiment, the second reconstruction unit may, e.g., be configured to reconstruct the fourth audio signal portion depending on the noise level information and depending on the second audio signal portion.

In an embodiment, the second reconstruction unit may, e.g., be configured to reconstruct the fourth audio signal portion by attenuating or amplifying the second audio signal portion.

According to an embodiment, the apparatus may, e.g., further comprise a long-term prediction unit comprising a delay buffer, wherein the long-term prediction unit may, e.g, be configured to generate a processed signal depending on the first or the second audio signal portion, depending on a delay buffer input being stored in the delay buffer and depending on a long-term prediction gain, and wherein the long-term prediction unit is configured to fade the long-term prediction gain towards zero, if said third frame of the plurality of frames is not received by the receiving interface or if said third frame is received by the receiving interface but is corrupted.

In an embodiment, the long-term prediction unit may, e.g., be configured to fade the long-term prediction gain towards zero, wherein a speed with which the long-term prediction gain is faded to zero depends on a fade-out factor.

In an embodiment, the long-term prediction unit may, e.g., be configured to update the delay buffer input by storing the generated processed signal in the delay buffer, if said third frame of the plurality of frames is not received by the receiving interface or if said third frame is received by the receiving interface but is corrupted.

Moreover, a method for decoding an audio signal is provided. The method comprises:

Receiving a first frame comprising a first audio signal portion of the audio signal, and receiving a second frame comprising a second audio signal portion of the audio signal.

Determining noise level information depending on at least one of the first audio signal portion and the second audio signal portion, wherein the noise level information is represented in a tracing domain.

Reconstructing, in a first reconstruction domain, a third audio signal portion of the audio signal depending on the noise level information, if a third frame of the plurality of frames is not received or if said third frame is received but is corrupted, wherein the first reconstruction domain is different from or equal to the tracing domain.

Transforming the noise level information from the tracing domain to a second reconstruction domain, if a fourth frame of the plurality of frames is not received or if said fourth frame is received but is corrupted, wherein the second reconstruction domain is different from the tracing domain, and wherein the second reconstruction domain is different from the first reconstruction domain. And:

Reconstructing, in the second reconstruction domain, a fourth audio signal portion of the audio signal depending on the noise level information being represented in the second reconstruction domain, if said fourth frame of the plurality of frames is not received or if said fourth frame is received but is corrupted.

Moreover, a computer program for implementing the above-described method when being executed on a computer or signal processor is provided.

Moreover, an apparatus for decoding an encoded audio signal to obtain a reconstructed audio signal is provided. The apparatus comprises a receiving interface for receiving one or more frames, a coefficient generator, and a signal reconstructor. The coefficient generator is configured to determine, if a current frame of the one or more frames is received by the receiving interface and if the current frame being received by the receiving interface is not corrupted, one or more first audio signal coefficients, being comprised by the current frame, wherein said one or more first audio signal coefficients indicate a characteristic of the encoded audio signal, and one or more noise coefficients indicating a background noise of the encoded audio signal. Moreover, the coefficient generator is configured to generate one or more second audio signal coefficients, depending on the one or more first audio signal coefficients and depending on the one or more noise coefficients, if the current frame is not received by the receiving interface or if the current frame being received by the receiving interface is corrupted. The audio signal reconstructor is configured to reconstruct a first portion of the reconstructed audio signal depending on the one or more first audio signal coefficients, if the current frame is received by the receiving interface and if the current frame being received by the receiving interface is not corrupted. Moreover, the audio signal reconstructor is configured to reconstruct a second portion of the reconstructed audio signal depending on the one or more second audio signal coefficients, if the current frame is not received by the receiving interface or if the current frame being received by the receiving interface is corrupted.

In some embodiments, the one or more first audio signal coefficients may, e.g., be one or more linear predictive filter coefficients of the encoded audio signal. In some embodiments, the one or more first audio signal coefficients may, e.g., be one or more linear predictive filter coefficients of the encoded audio signal.

According to an embodiment, the one or more noise coefficients may, e.g., be one or more linear predictive filter coefficients indicating the background noise of the encoded audio signal. In an embodiment, the one or more linear predictive filter coefficients may, e.g., represent a spectral shape of the background noise.

In an embodiment, the coefficient generator may, e.g., be configured to determine the one or more second audio signal portions such that the one or more second audio signal portions are one or more linear predictive filter coefficients of the reconstructed audio signal, or such that the one or more first audio signal coefficients are one or more immittance spectral pairs of the reconstructed audio signal.

According to an embodiment, the coefficient generator may, e.g., be configured to generate the one or more second audio signal coefficients by applying the formula:

$$f_{current}[i]=\alpha\cdot f_{last}[i]+(1-\alpha)\cdot pt_{mean}[i]$$

wherein $f_{current}[i]$ indicates one of the one or more second audio signal coefficients, wherein $f_{last}[i]$ indicates one of the one or more first audio signal coefficients, wherein $pt_{mean}[i]$ is one of the one or more noise coefficients, wherein $\alpha$ is a real number with $0\leq\alpha\leq1$, and wherein i is an index. In an embodiment, $0<\alpha<1$.

According to an embodiment, $f_{last}[i]$ indicates a linear predictive filter coefficient of the encoded audio signal, and wherein $f_{current}[i]$ indicates a linear predictive filter coefficient of the reconstructed audio signal.

In an embodiment, $pt_{mean}[i]$ may, e.g., indicate the background noise of the encoded audio signal.

In an embodiment, the coefficient generator may, e.g., be configured to determine, if the current frame of the one or more frames is received by the receiving interface and if the current frame being received by the receiving interface is not corrupted, the one or more noise coefficients by determining a noise spectrum of the encoded audio signal.

According to an embodiment, the coefficient generator may, e.g., be configured to determine LPC coefficients representing background noise by using a minimum statistics approach on the signal spectrum to determine a background noise spectrum and by calculating the LPC coefficients representing the background noise shape from the background noise spectrum.

Moreover, a method for decoding an encoded audio signal to obtain a reconstructed audio signal is provided. The method comprises:

Receiving one or more frames.

Determining, if a current frame of the one or more frames is received and if the current frame being received is not corrupted, one or more first audio signal coefficients, being comprised by the current frame, wherein said one or more first audio signal coefficients indicate a characteristic of the encoded audio signal, and one or more noise coefficients indicating a background noise of the encoded audio signal.

Generating one or more second audio signal coefficients, depending on the one or more first audio signal coefficients and depending on the one or more noise coefficients, if the current frame is not received or if the current frame being received is corrupted.

Reconstructing a first portion of the reconstructed audio signal depending on the one or more first audio signal coefficients, if the current frame is received and if the current frame being received is not corrupted. And:

Reconstructing a second portion of the reconstructed audio signal depending on the one or more second audio signal coefficients, if the current frame is not received or if the current frame being received is corrupted.

Moreover, a computer program for implementing the above-described method when being executed on a computer or signal processor is provided.

Having common means to trace and apply the spectral shape of comfort noise during fade out has several advantages. By tracing and applying the spectral shape such that it can be done similarly for both core codecs allows for a simple common approach. CELT teaches only the band wise tracing of energies in the spectral domain and the band wise forming of the spectral shape in the spectral domain, which is not possible for the CELP core.

In contrast, in conventional technology, the spectral shape of the comfort noise introduced during burst losses is either fully static, or partly static and partly adaptive to the short term mean of the spectral shape (as realized in G.718 [ITU08a]), and will usually not match the background noise in the signal before the packet loss. This mismatch of the comfort noise characteristics might be disturbing. According to conventional technology, an offline trained (static) background noise shape may be employed that may be sound pleasant for particular signals, but less pleasant for others, e.g., car noise sounds totally different to office noise.

Moreover, in conventional technology, an adaptation to the short term mean of the spectral shape of the previously received frames may be employed which might bring the signal characteristics closer to the signal received before, but not necessarily to the background noise characteristics. In conventional technology, tracing the spectral shape band wise in the spectral domain (as realized in CELT [IET12]) is not applicable for a switched codec using not only an MDCT domain based core (TCX) but also an ACELP based core. The above-mentioned embodiments are thus advantageous over conventional technology.

Moreover, an apparatus for decoding an encoded audio signal to obtain a reconstructed audio signal is provided. The apparatus comprises a receiving interface for receiving one or more frames comprising information on a plurality of audio signal samples of an audio signal spectrum of the encoded audio signal, and a processor for generating the reconstructed audio signal. The processor is configured to generate the reconstructed audio signal by fading a modified spectrum to a target spectrum, if a current frame is not received by the receiving interface or if the current frame is received by the receiving interface but is corrupted, wherein the modified spectrum comprises a plurality of modified signal samples, wherein, for each of the modified signal samples of the modified spectrum, an absolute value of said modified signal sample is equal to an absolute value of one of the audio signal samples of the audio signal spectrum. Moreover, the processor is configured to not fade the modified spectrum to the target spectrum, if the current frame of the one or more frames is received by the receiving interface and if the current frame being received by the receiving interface is not corrupted.

According to an embodiment, the target spectrum may, e.g., be a noise like spectrum.

In an embodiment, the noise like spectrum may, e.g., represent white noise.

According to an embodiment, the noise like spectrum may, e.g., be shaped.

In an embodiment, the shape of the noise like spectrum may, e.g., depend on an audio signal spectrum of a previously received signal.

According to an embodiment, the noise like spectrum may, e.g., be shaped depending on the shape of the audio signal spectrum.

In an embodiment, the processor may, e.g., employ a tilt factor to shape the noise like spectrum.

According to an embodiment, the processor may, e.g., employ the formula $$\text{shaped\_noise}[i]=\text{noise}*\text{power}(\text{tilt\_factor},i/N)$$

wherein N indicates the number of samples, wherein i is an index, wherein 0<=i<N, with tilt_factor>0, and wherein power is a power function.

power (x, y) indicates $x^y$ power (tilt_factor, i/N) indicates $$\text{tilt\_factor}^{\frac{i}{N}}$$

If the tilt_factor is smaller 1 this means attenuation with increasing i. If the tilt_factor is larger 1 means amplification with increasing i.

According to another embodiment, the processor may, e.g., employ the formula $$\text{shaped\_noise}[i]=\text{noise}*(1+i/(N-1)*(\text{tilt\_factor}-1))$$

wherein N indicates the number of samples, wherein i is an index, wherein 0<=i<N, with tilt_factor>0.

If the tilt_factor is smaller 1 this means attenuation with increasing i. If the tilt_factor is larger 1 means amplification with increasing i.

According to an embodiment, the processor may, e.g., be configured to generate the modified spectrum, by changing a sign of one or more of the audio signal samples of the audio signal spectrum, if the current frame is not received by the receiving interface or if the current frame being received by the receiving interface is corrupted.

In an embodiment, each of the audio signal samples of the audio signal spectrum may, e.g., be represented by a real number but not by an imaginary number.

According to an embodiment, the audio signal samples of the audio signal spectrum may, e.g., be represented in a Modified Discrete Cosine Transform domain.

In another embodiment, the audio signal samples of the audio signal spectrum may, e.g., be represented in a Modified Discrete Sine Transform domain.

According to an embodiment, the processor may, e.g., be configured to generate the modified spectrum by employing a random sign function which randomly or pseudo-randomly outputs either a first or a second value.

In an embodiment, the processor may, e.g., be configured to fade the modified spectrum to the target spectrum by subsequently decreasing an attenuation factor.

According to an embodiment, the processor may, e.g., be configured to fade the modified spectrum to the target spectrum by subsequently increasing an attenuation factor.

In an embodiment, if the current frame is not received by the receiving interface or if the current frame being received by the receiving interface is corrupted, the processor may, e.g., be configured to generate the reconstructed audio signal by employing the formula:

$$x[i]=(1-\text{cum\_damping})*\text{noise}[i]+\text{cum\_damping}*\text{random\_sign}(\,)*x\_\text{old}[i]$$

wherein i is an index, wherein x [i] indicates a sample of the reconstructed audio signal, wherein cum_damping is an attenuation factor, wherein x_old [i] indicates one of the audio signal samples of the audio signal spectrum of the encoded audio signal, wherein random_sign ( ) returns 1 or −1, and wherein noise is a random vector indicating the target spectrum.

In an embodiment, said random vector noise may, e.g., be scaled such that its quadratic mean is similar to the quadratic mean of the spectrum of the encoded audio signal being comprised by one of the frames being last received by the receiving interface.

According to a general embodiment, the processor may, e.g., be configured to generate the reconstructed audio signal, by employing a random vector which is scaled such that its quadratic mean is similar to the quadratic mean of the spectrum of the encoded audio signal being comprised by one of the frames being last received by the receiving interface.

Moreover, a method for decoding an encoded audio signal to obtain a reconstructed audio signal is provided. The method comprises:

Receiving one or more frames comprising information on a plurality of audio signal samples of an audio signal spectrum of the encoded audio signal. And:

Generating the reconstructed audio signal.

Generating the reconstructed audio signal is conducted by fading a modified spectrum to a target spectrum, if a current frame is not received or if the current frame is received but is corrupted, wherein the modified spectrum comprises a plurality of modified signal samples, wherein, for each of the modified signal samples of the modified spectrum, an absolute value of said modified signal sample is equal to an absolute value of one of the audio signal samples of the audio signal spectrum. The modified spectrum is not faded to a white noise spectrum, if the current frame of the one or more frames is received and if the current frame being received is not corrupted.

Moreover, a computer program for implementing the above-described method when being executed on a computer or signal processor is provided.

Embodiments realize a fade MDCT spectrum to white noise prior to FDNS Application (FDNS=Frequency Domain Noise Substitution).

According to conventional technology, in ACELP based codecs, the innovative codebook is replaced with a random vector (e.g., with noise). In embodiments, the ACELP approach, which consists of replacing the innovative codebook with a random vector (e.g., with noise) is adopted to the TCX decoder structure. Here, the equivalent of the innovative codebook is the MDCT spectrum usually received within the bitstream and fed into the FDNS.

The classical MDCT concealment approach would be to simply repeat this spectrum as is or to apply a certain randomization process, which basically prolongs the spectral shape of the last received frame [LS01]. This has the drawback that the short-term spectral shape is prolonged, leading frequently to a repetitive, metallic sound which is not background noise like, and thus cannot be used as comfort noise.

Using the proposed method the short term spectral shaping is performed by the FDNS and the TCX LTP, the spectral shaping on the long run is performed by the FDNS only. The shaping by the FDNS is faded from the short-term spectral shape to the traced long-term spectral shape of the background noise, and the TCX LTP is faded to zero.

Fading the FDNS coefficients to traced background noise coefficients leads to having a smooth transition between the last good spectral envelope and the spectral background envelope which should be targeted in the long run, in order to achieve a pleasant background noise in case of long burst frame losses.

In contrast, according to the state of the art, for transform based codecs, noise like concealment is conducted by frame repetition or noise substitution in the frequency domain [LS01]. In conventional technology, the noise substitution is usually performed by sign scrambling of the spectral bins. If in conventional technology TCX (frequency domain) sign scrambling is used during concealment, the last received MDCT coefficients are re-used and each sign is randomized before the spectrum is inversely transformed to the time domain. The drawback of this procedure of conventional technology is, that for consecutively lost frames the same spectrum is used again and again, just with different sign randomizations and global attenuation. When looking to the spectral envelope over time on a coarse time grid, it can be seen that the envelope is approximately constant during consecutive frame loss, because the band energies are kept constant relatively to each other within a frame and are just globally attenuated. In the used coding system, according to conventional technology, the spectral values are processed using FDNS, in order to restore the original spectrum. This means, that if one wants to fade the MDCT spectrum to a certain spectral envelope (using FDNS coefficients, e.g., describing the current background noise), the result is not just dependent on the FDNS coefficients, but also dependent on the previously decoded spectrum which was sign scrambled. The above-mentioned embodiments overcome these disadvantages of conventional technology.

Embodiments are based on the finding that it may be useful to fade the spectrum used for the sign scrambling to white noise before feeding it into the FDNS processing. Otherwise the outputted spectrum will never match the targeted envelope used for FDNS processing.

In embodiments, the same fading speed is used for LTP gain fading as for the white noise fading.

Moreover, an apparatus for decoding an encoded audio signal to obtain a reconstructed audio signal is provided. The apparatus comprises a receiving interface for receiving a plurality of frames, a delay buffer for storing audio signal samples of the decoded audio signal, a sample selector for selecting a plurality of selected audio signal samples from the audio signal samples being stored in the delay buffer, and a sample processor for processing the selected audio signal samples to obtain reconstructed audio signal samples of the reconstructed audio signal. The sample selector is configured to select, if a current frame is received by the receiving interface and if the current frame being received by the receiving interface is not corrupted, the plurality of selected audio signal samples from the audio signal samples being stored in the delay buffer depending on a pitch lag information being comprised by the current frame. Moreover, the sample selector is configured to select, if the current frame is not received by the receiving interface or if the current frame being received by the receiving interface is corrupted, the plurality of selected audio signal samples from the audio signal samples being stored in the delay buffer depending on a pitch lag information being comprised by another frame being received previously by the receiving interface.

According to an embodiment, the sample processor may, e.g., be configured to obtain the reconstructed audio signal samples, if the current frame is received by the receiving interface and if the current frame being received by the receiving interface is not corrupted, by rescaling the selected audio signal samples depending on the gain information being comprised by the current frame. Moreover, the sample selector may, e.g., be configured to obtain the reconstructed audio signal samples, if the current frame is not received by the receiving interface or if the current frame being received by the receiving interface is corrupted, by rescaling the selected audio signal samples depending on the gain information being comprised by said another frame being received previously by the receiving interface.

In an embodiment, the sample processor may, e.g., be configured to obtain the reconstructed audio signal samples, if the current frame is received by the receiving interface and if the current frame being received by the receiving interface is not corrupted, by multiplying the selected audio signal samples and a value depending on the gain information being comprised by the current frame. Moreover, the sample selector is configured to obtain the reconstructed audio signal samples, if the current frame is not received by the receiving interface or if the current frame being received by the receiving interface is corrupted, by multiplying the selected audio signal samples and a value depending on the gain information being comprised by said another frame being received previously by the receiving interface.

According to an embodiment, the sample processor may, e.g., be configured to store the reconstructed audio signal samples into the delay buffer.

In an embodiment, the sample processor may, e.g., be configured to store the reconstructed audio signal samples into the delay buffer before a further frame is received by the receiving interface.

According to an embodiment, the sample processor may, e.g., be configured to store the reconstructed audio signal samples into the delay buffer after a further frame is received by the receiving interface.

In an embodiment, the sample processor may, e.g., be configured to rescale the selected audio signal samples depending on the gain information to obtain rescaled audio signal samples and by combining the rescaled audio signal samples with input audio signal samples to obtain the processed audio signal samples.

According to an embodiment, the sample processor may, e.g., be configured to store the processed audio signal samples, indicating the combination of the rescaled audio signal samples and the input audio signal samples, into the delay buffer, and to not store the rescaled audio signal samples into the delay buffer, if the current frame is received by the receiving interface and if the current frame being received by the receiving interface is not corrupted. Moreover, the sample processor is configured to store the rescaled audio signal samples into the delay buffer and to not store the processed audio signal samples into the delay buffer, if the current frame is not received by the receiving interface or if the current frame being received by the receiving interface is corrupted.

According to another embodiment, the sample processor may, e.g., be configured to store the processed audio signal samples into the delay buffer, if the current frame is not received by the receiving interface or if the current frame being received by the receiving interface is corrupted.

In an embodiment, the sample selector may, e.g., be configured to obtain the reconstructed audio signal samples by rescaling the selected audio signal samples depending on a modified gain, wherein the modified gain is defined according to the formula:

gain=gain_past*damping;

wherein gain is the modified gain, wherein the sample selector may, e.g., be configured to set gain_past to gain after gain and has been calculated, and wherein damping is a real value.

According to an embodiment, the sample selector may, e.g., be configured to calculate the modified gain.

In an embodiment, damping may, e.g., be defined according to: 0≤damping≤1.

According to an embodiment, the modified gain gain may, e.g., be set to zero, if at least a predefined number of frames have not been received by the receiving interface since a frame last has been received by the receiving interface.

Moreover, a method for decoding an encoded audio signal to obtain a reconstructed audio signal is provided. The method comprises:

Receiving a plurality of frames.

Storing audio signal samples of the decoded audio signal.

Selecting a plurality of selected audio signal samples from the audio signal samples being stored in the delay buffer. And:

Processing the selected audio signal samples to obtain reconstructed audio signal samples of the reconstructed audio signal.

If a current frame is received and if the current frame being received is not corrupted, the step of selecting the plurality of selected audio signal samples from the audio signal samples being stored in the delay buffer is conducted depending on a pitch lag information being comprised by the current frame. Moreover, if the current frame is not received or if the current frame being received is corrupted, the step of selecting the plurality of selected audio signal samples from the audio signal samples being stored in the delay buffer is conducted depending on a pitch lag information being comprised by another frame being received previously by the receiving interface.

Moreover, a computer program for implementing the above-described method when being executed on a computer or signal processor is provided.

Embodiments employ TCX LTP (TXC LTP=Transform Coded Excitation Long-Term Prediction). During normal operation, the TCX LTP memory is updated with the synthesized signal, containing noise and reconstructed tonal components.

Instead of disabling the TCX LTP during concealment, its normal operation may be continued during concealment with the parameters received in the last good frame. This preserves the spectral shape of the signal, particularly those tonal components which are modelled by the LTP filter.

Moreover, embodiments decouple the TCX LTP feedback loop. A simple continuation of the normal TCX LTP operation introduces additional noise, since with each update step further randomly generated noise from the LTP excitation is introduced. The tonal components are hence getting distorted more and more over time by the added noise.

To overcome this, only the updated TCX LTP buffer may be fed back (without adding noise), in order to not pollute the tonal information with undesired random noise.

Furthermore, according to embodiments, the TCX LTP gain is faded to zero.

These embodiments are based on the finding that continuing the TCX LTP helps to preserve the signal characteristics on the short term, but has drawbacks on the long term: The signal played out during concealment will include the voicing/tonal information which was present preceding to the loss. Especially for clean speech or speech over background noise, it is extremely unlikely that a tone or harmonic will decay very slowly over a very long time. By continuing the TCX LTP operation during concealment, particularly if the LTP memory update is decoupled (just tonal components are fed back and not the sign scrambled part), the voicing/tonal information will stay present in the concealed signal for the whole loss, being attenuated just by the overall fade-out to the comfort noise level. Moreover, it is impossible to reach the comfort noise envelope during burst packet losses, if the TCX LTP is applied during the burst loss without being attenuated over time, because the signal will then incorporate the voicing information of the LTP.

Therefore, the TCX LTP gain is faded towards zero, such that tonal components represented by the LTP will be faded to zero, at the same time the signal is faded to the background signal level and shape, and such that the fade-out reaches the desired spectral background envelope (comfort noise) without incorporating undesired tonal components.

In embodiments, the same fading speed is used for LTP gain fading as for the white noise fading.

In contrast, in conventional technology, there is no transform codec known that uses LTP during concealment. For the MPEG-4 LTP [ISO09] no concealment approaches exist in conventional technology. Another MDCT based codec of conventional technology which makes use of an LTP is CELT, but this codec uses an ACELP-like concealment for the first five frames, and for all subsequent frames background noise is generated, which does not make use of the LTP. A drawback of conventional technology of not using the TCX LTP is, that all tonal components being modelled with the LTP disappear abruptly. Moreover, in ACELP based codecs of conventional technology, the LTP operation is prolonged during concealment, and the gain of the adaptive codebook is faded towards zero. With regard to the feedback loop operation, conventional technology employs two approaches, either the whole excitation, e.g., the sum of the innovative and the adaptive excitation, is fed back (AMR-WB); or only the updated adaptive excitation, e.g., the tonal signal parts, is fed back (G.718). The above-mentioned embodiments overcome the disadvantages of conventional technology.

BRIEF DESCRIPTION OF THE DRAWINGS

Embodiments of the present invention will be detailed subsequently referring to the appended drawings, in which.

DETAILED DESCRIPTION OF THE INVENTION

Figure 1A:
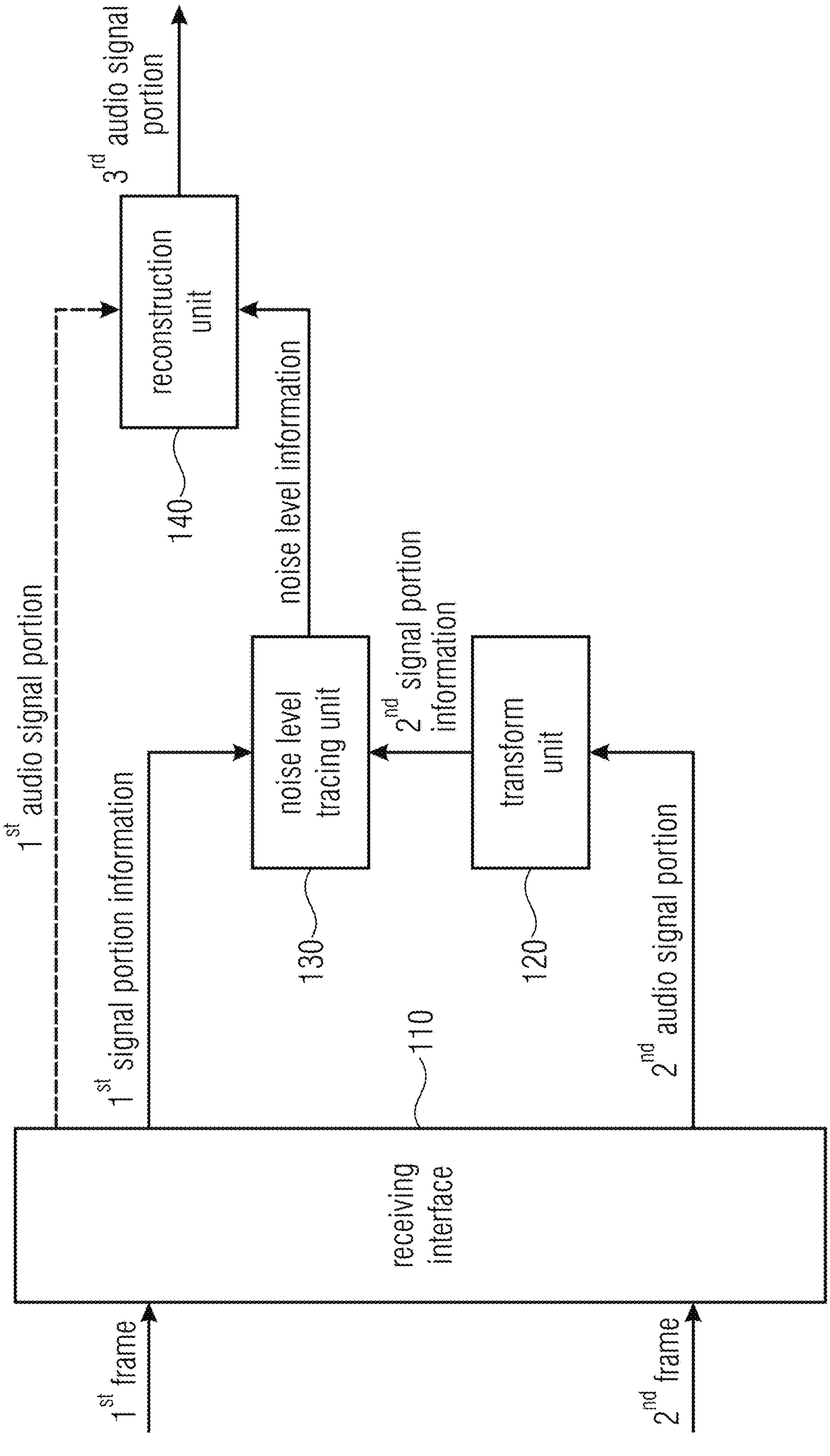
FIG. 1*a* illustrates an apparatus for decoding an audio signal according to an embodiment.

FIG. 1*a* illustrates an apparatus for decoding an audio signal according to an embodiment.

The apparatus comprises a receiving interface 110. The receiving interface is configured to receive a plurality of frames, wherein the receiving interface 110 is configured to receive a first frame of the plurality of frames, said first frame comprising a first audio signal portion of the audio signal, said first audio signal portion being represented in a first domain. Moreover, the receiving interface 110 is configured to receive a second frame of the plurality of frames, said second frame comprising a second audio signal portion of the audio signal.

Moreover, the apparatus comprises a transform unit 120 for transforming the second audio signal portion or a value or signal derived from the second audio signal portion from a second domain to a tracing domain to obtain a second signal portion information, wherein the second domain is different from the first domain, wherein the tracing domain is different from the second domain, and wherein the tracing domain is equal to or different from the first domain.

Furthermore, the apparatus comprises a noise level tracing unit 130, wherein the noise level tracing unit is configured to receive a first signal portion information being represented in the tracing domain, wherein the first signal portion information depends on the first audio signal portion, wherein the noise level tracing unit is configured to receive the second signal portion being represented in the tracing domain, and wherein the noise level tracing unit is configured to determine noise level information depending on the first signal portion information being represented in the tracing domain and depending on the second signal portion information being represented in the tracing domain.

Moreover, the apparatus comprises a reconstruction unit for reconstructing a third audio signal portion of the audio signal depending on the noise level information, if a third frame of the plurality of frames is not received by the receiving interface but is corrupted.

Regarding the first and/or the second audio signal portion, for example, the first and/or the second audio signal portion may, e.g., be fed into one or more processing units (not shown) for generating one or more loudspeaker signals for one or more loudspeakers, so that the received sound information comprised by the first and/or the second audio signal portion can be replayed.

Moreover, however, the first and second audio signal portion are also used for concealment, e.g., in case subsequent frames do not arrive at the receiver or in case that subsequent frames are erroneous.

Inter alia, the present invention is based on the finding that noise level tracing should be conducted in a common domain, herein referred to as "tracing domain". The tracing domain, may, e.g., be an excitation domain, for example, the domain in which the signal is represented by LPCs (LPC=Linear Predictive Coefficient) or by ISPs (ISP=Immittance Spectral Pair) as described in AMR-WB and AMR-WB+(see [3GP12a], [3GP12b], [3GP09a], [3GP09b], [3GP09c]). Tracing the noise level in a single domain has inter alia the advantage that aliasing effects are avoided when the signal switches between a first representation in a first domain and a second representation in a second domain (for example, when the signal representation switches from ACELP to TCX or vice versa).

Regarding the transform unit 120, what is transformed is either the second audio signal portion itself, or a signal derived from the second audio signal portion (e.g., the second audio signal portion has been processed to obtain the derived signal), or a value derived from the second audio signal portion (e.g., the second audio signal portion has been processed to obtain the derived value).

Regarding the first audio signal portion, in some embodiments, the first audio signal portion may be processed and/or transformed to the tracing domain.

In other embodiments, however, the first audio signal portion may be already represented in the tracing domain.

In some embodiments, the first signal portion information is identical to the first audio signal portion. In other embodiments, the first signal portion information is, e.g., an aggregated value depending on the first audio signal portion.

Now, at first, fade-out to a comfort noise level is considered in more detail.

The fade-out approach described may, e.g., be implemented in a low-delay version of xHE-AAC [NMR+12] (xHE-AAC=Extended High Efficiency AAC), which is able to switch seamlessly between ACELP (speech) and MDCT (music/noise) coding on a per-frame basis.

Regarding common level tracing in a tracing domain, for example, an excitation domain, as to apply a smooth fade-out to an appropriate comfort noise level during packet loss, such comfort noise level needs to be identified during the normal decoding process. It may, e.g., be assumed, that a noise level similar to the background noise is most comfortable. Thus, the background noise level may be derived and constantly updated during normal decoding.

The present invention is based on the finding that when having a switched core codec (e.g., ACELP and TCX), considering a common background noise level independent from the chosen core coder is particularly suitable.

Figure 6:
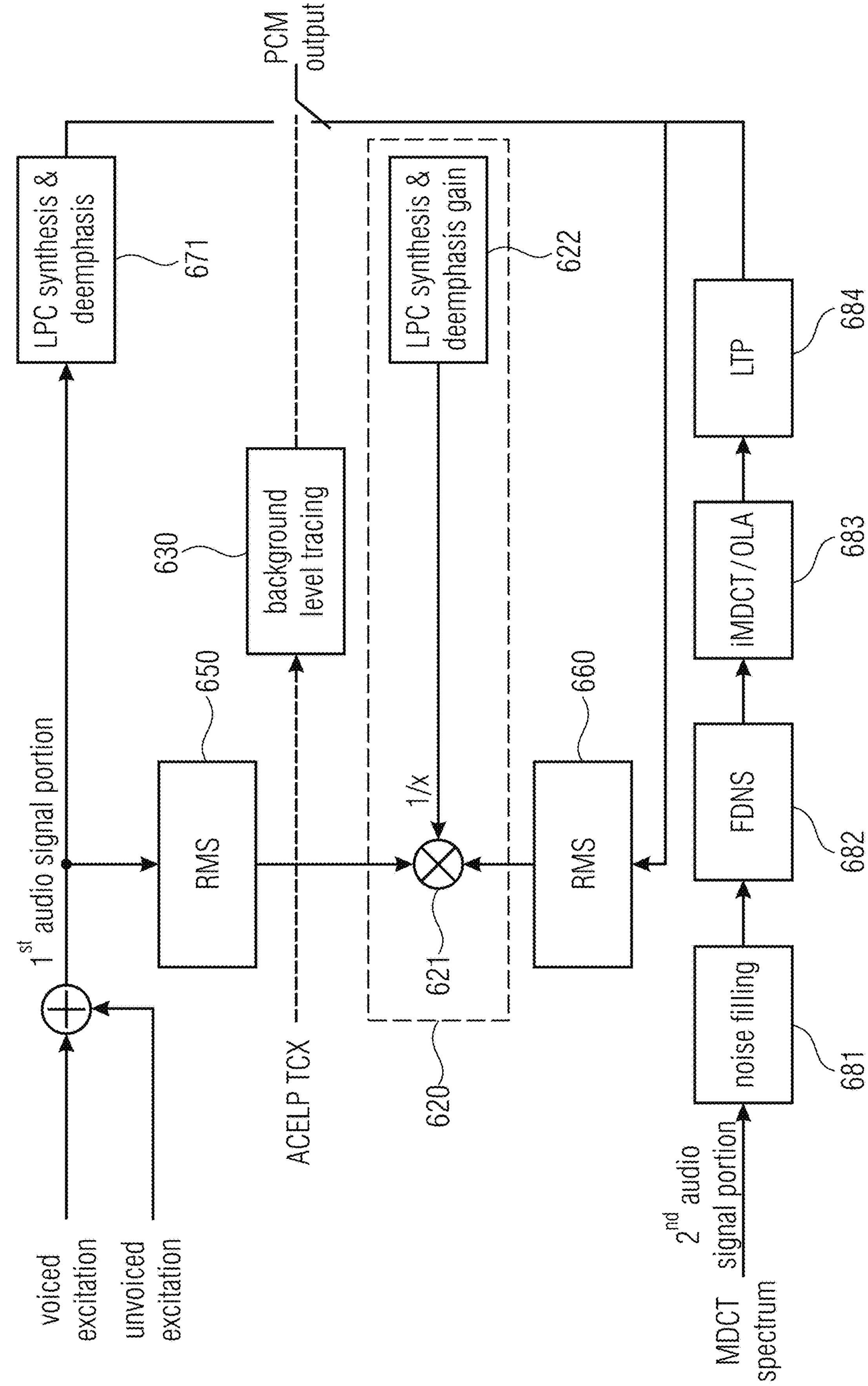
FIG. 6 shows a background noise level tracing according to an embodiment in the decoder during an error-free operation mode.

FIG. 6 depicts a background noise level tracing according to an advantageous embodiment in the decoder during the error-free operation mode, e.g., during normal decoding.

The tracing itself may, e.g., be performed using the minimum statistics approach (see [March01]).

This traced background noise level may, e.g, be considered as the noise level information mentioned above.

For example, the minimum statistics noise estimation presented in the document: "Rainer Martin, *Noise power spectral density estimation based on optimal smoothing and minimum statistics*, IEEE Transactions on Speech and Audio Processing 9 (2001), no. 5, 504-512" [March01] may be employed for background noise level tracing.

Correspondingly, in some embodiments, the noise level tracing unit 130 is configured to determine noise level information by applying a minimum statistics approach, e.g., by employing the minimum statistics noise estimation of [March01].

Subsequently, some considerations and details of this tracing approach are described.

Regarding level tracing, the background is supposed to be noise-like. Hence it is advantageous to perform the level tracing in the excitation domain to avoid tracing foreground tonal components which are taken out by the LPC. For example, ACELP noise filling may also employ the background noise level in the excitation domain. With tracing in the excitation domain, only one single tracing of the background noise level can serve two purposes, which saves computational complexity. In an advantageous embodiment, the tracing is performed in the ACELP excitation domain.

Figure 7:
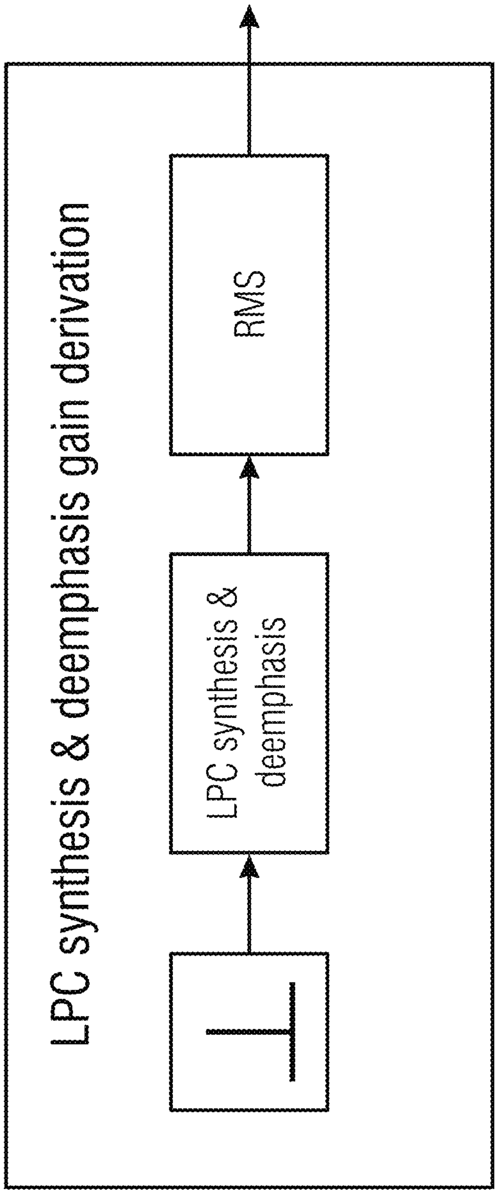
FIG. 7 illustrates gain derivation of LPC synthesis and deemphasis according to an embodiment.

FIG. 7 illustrates gain derivation of LPC synthesis and deemphasis according to an embodiment.

Regarding level derivation, the level derivation may, for example, be conducted either in time domain or in excitation domain, or in any other suitable domain. If the domains for the level derivation and the level tracing differ, a gain compensation may, e.g., be needed.

In the advantageous embodiment, the level derivation for ACELP is performed in the excitation domain. Hence, no gain compensation is required.

For TCX, a gain compensation may, e.g., be needed to adjust the derived level to the ACELP excitation domain.

In the advantageous embodiment, the level derivation for TCX takes place in the time domain. A manageable gain compensation was found for this approach: The gain introduced by LPC synthesis and deemphasis is derived as shown in FIG. 7 and the derived level is divided by this gain.

Alternatively, the level derivation for TCX could be performed in the TCX excitation domain. However, the gain compensation between the TCX excitation domain and the ACELP excitation domain was deemed too complicated.

Thus, returning to FIG. 1*a*, in some embodiments, the first audio signal portion is represented in a time domain as the first domain. The transform unit 120 is configured to transform the second audio signal portion or the value derived from the second audio signal portion from an excitation domain being the second domain to the time domain being the tracing domain. In such embodiments, the noise level tracing unit 130 is configured to receive the first signal portion information being represented in the time domain as the tracing domain. Moreover, the noise level tracing unit 130 is configured to receive the second signal portion being represented in the time domain as the tracing domain.

In other embodiments, the first audio signal portion is represented in an excitation domain as the first domain. The transform unit 120 is configured to transform the second audio signal portion or the value derived from the second audio signal portion from a time domain being the second domain to the excitation domain being the tracing domain. In such embodiments, the noise level tracing unit 130 is configured to receive the first signal portion information being represented in the excitation domain as the tracing domain. Moreover, the noise level tracing unit 130 is configured to receive the second signal portion being represented in the excitation domain as the tracing domain.

In an embodiment, the first audio signal portion may, e.g., be represented in an excitation domain as the first domain, wherein the noise level tracing unit 130 may, e.g., be configured to receive the first signal portion information, wherein said first signal portion information is represented in the FFT domain, being the tracing domain, and wherein said first signal portion information depends on said first audio signal portion being represented in the excitation domain, wherein the transform unit 120 may, e.g., be configured to transform the second audio signal portion or the value derived from the second audio signal portion from a time domain being the second domain to an FFT domain being the tracing domain, and wherein the noise level tracing unit 130 may, e.g., be configured to receive the second audio signal portion being represented in the FFT domain.

Figure 1B:
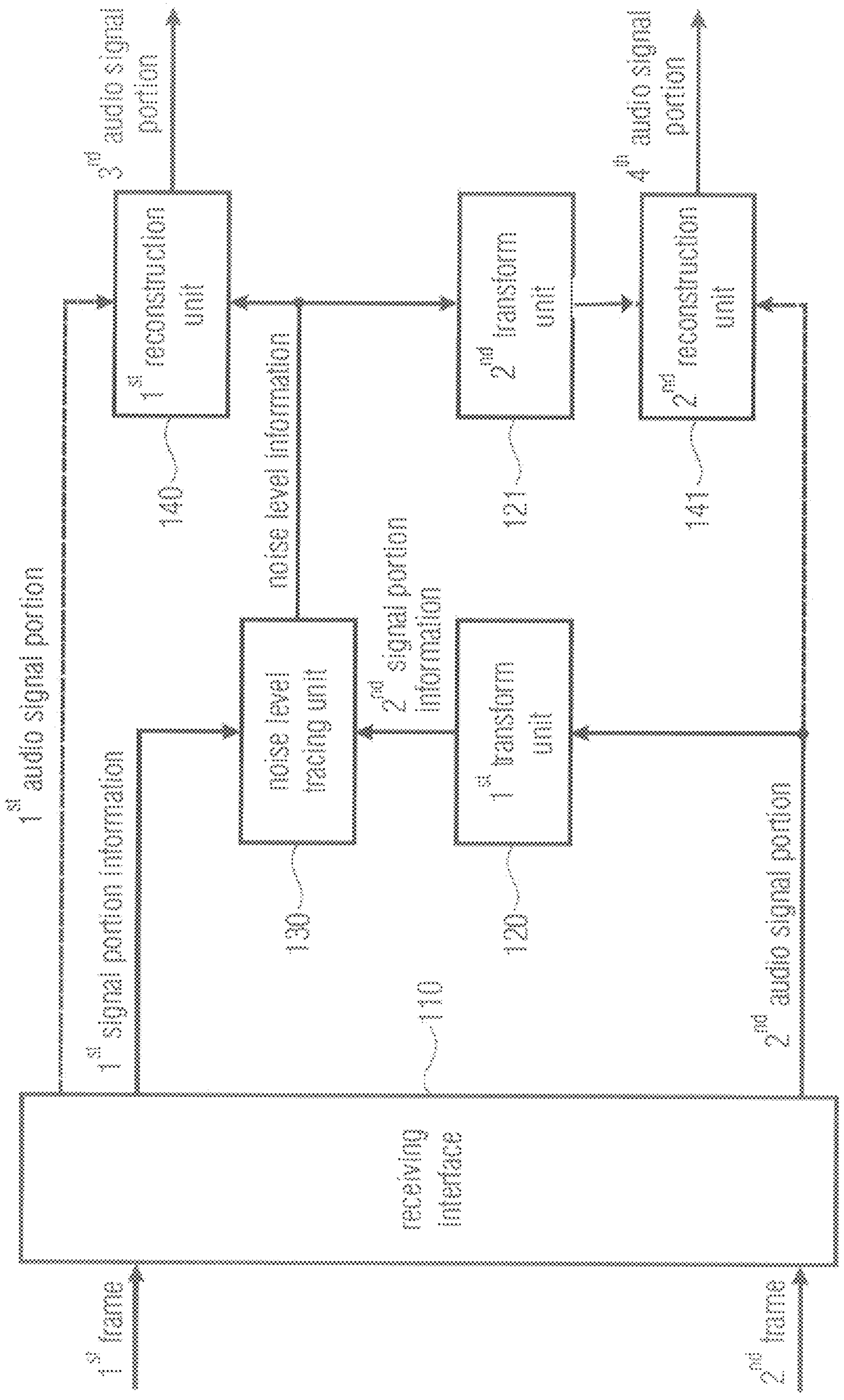
FIG. 1*b* illustrates an apparatus for decoding an audio signal according to another embodiment.

FIG. 1*b* illustrates an apparatus according to another embodiment. In FIG. 1*b*, the transform unit 120 of FIG. 1*a* is a first transform unit 120, and the reconstruction unit 140 of FIG. 1*a* is a first reconstruction unit 140. The apparatus further comprises a second transform unit 121 and a second reconstruction unit 141.

The second transform unit 121 is configured to transform the noise level information from the tracing domain to the second domain, if a fourth frame of the plurality of frames is not received by the receiving interface or if said fourth frame is received by the receiving interface but is corrupted.

Moreover, the second reconstruction unit 141 is configured to reconstruct a fourth audio signal portion of the audio signal depending on the noise level information being represented in the second domain if said fourth frame of the plurality of frames is not received by the receiving interface or if said fourth frame is received by the receiving interface but is corrupted.

Figure 1C:
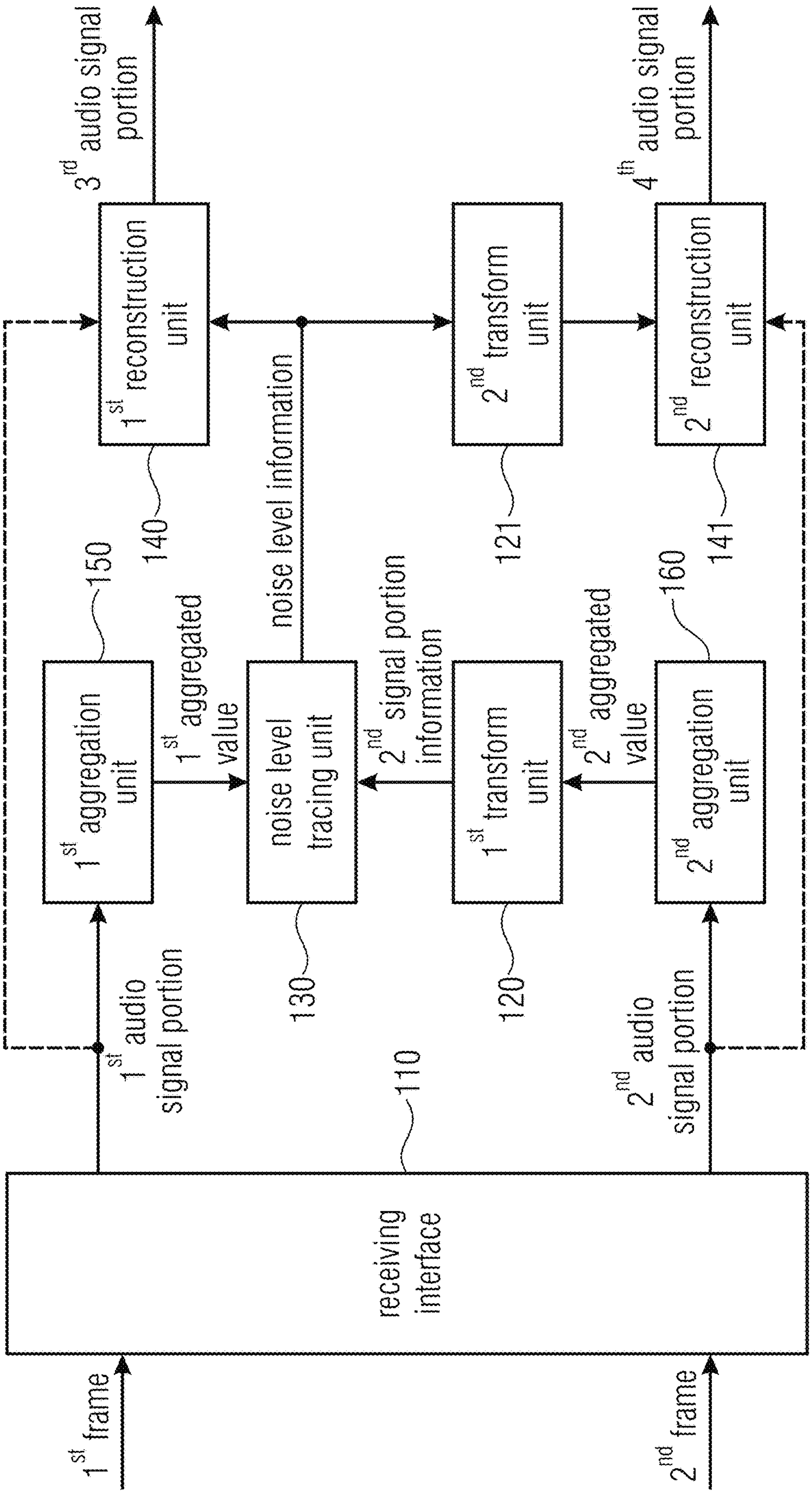
FIG. 1*c* illustrates an apparatus for decoding an audio signal according to another embodiment, wherein the apparatus further comprises a first and a second aggregation unit.

FIG. 1*c* illustrates an apparatus for decoding an audio signal according to another embodiment. The apparatus further comprises a first aggregation unit 150 for determining a first aggregated value depending on the first audio signal portion. Moreover, the apparatus of FIG. 1*c* further comprises a second aggregation unit 160 for determining a second aggregated value as the value derived from the second audio signal portion depending on the second audio signal portion. In the embodiment of FIG. 1*c*, the noise level tracing unit 130 is configured to receive first aggregated value as the first signal portion information being represented in the tracing domain, wherein the noise level tracing unit 130 is configured to receive the second aggregated value as the second signal portion information being represented in the tracing domain. The noise level tracing unit 130 is configured to determine noise level information depending on the first aggregated value being represented in the tracing domain and depending on the second aggregated value being represented in the tracing domain.

In an embodiment, the first aggregation unit 150 is configured to determine the first aggregated value such that the first aggregated value indicates a root mean square of the first audio signal portion or of a signal derived from the first audio signal portion. Moreover, the second aggregation unit 160 is configured to determine the second aggregated value such that the second aggregated value indicates a root mean square of the second audio signal portion or of a signal derived from the second audio signal portion.

FIG. 6 illustrates an apparatus for decoding an audio signal according to a further embodiment.

In FIG. 6, background level tracing unit 630 implements a noise level tracing unit 130 according to FIG. 1*a*.

Moreover, in FIG. 6, RMS unit 650 (RMS=root mean square) is a first aggregation unit and RMS unit 660 is a second aggregation unit.

According to some embodiments, the (first) transform unit 120 of FIG. 1*a*, FIG. 1*b* and FIG. 1*c* is configured to transform the value derived from the second audio signal portion from the second domain to the tracing domain by applying a gain value (x) on the value derived from the second audio signal portion, e.g., by dividing the value derived from the second audio signal portion by a gain value (x). In other embodiments, a gain value may, e.g., be multiplied.

In some embodiments, the gain value (x) may, e.g., indicate a gain introduced by Linear predictive coding synthesis, or the gain value (x) may, e.g., indicate a gain introduced by Linear predictive coding synthesis and deemphasis.

In FIG. 6, unit 622 provides the value (x) which indicates the gain introduced by Linear predictive coding synthesis and deemphasis. Unit 622 then divides the value, provided by the second aggregation unit 660, which is a value derived from the second audio signal portion, by the provided gain value (x) (e.g., either by dividing by x, or by multiplying the value 1/x). Thus, unit 620 of FIG. 6 which comprises units 621 and 622 implements the first transform unit of FIG. 1*a*, FIG. 1*b* or FIG. 1*c*.

The apparatus of FIG. 6 receives a first frame with a first audio signal portion being a voiced excitation and/or an unvoiced excitation and being represented in the tracing domain, in FIG. 6 an (ACELP) LPC domain. The first audio signal portion is fed into an LPC Synthesis and De-Emphasis unit 671 for processing to obtain a time-domain first audio signal portion output. Moreover, the first audio signal portion is fed into RMS module 650 to obtain a first value indicating a root mean square of the first audio signal portion. This first value (first RMS value) is represented in the tracing domain. The first RMS value, being represented in the tracing domain, is then fed into the noise level tracing unit 630.

Moreover, the apparatus of FIG. 6 receives a second frame with a second audio signal portion comprising an MDCT spectrum and being represented in an MDCT domain. Noise filling is conducted by a noise filling module 681, frequency-domain noise shaping is conducted by a frequency-domain noise shaping module 682, transformation to the time domain is conducted by an iMDCT/OLA module 683 (OLA=overlap-add) and long-term prediction is conducted by a long-term prediction unit 684. The long-term prediction unit may, e.g., comprise a delay buffer (not shown in FIG. 6).

The signal derived from the second audio signal portion is then fed into RMS module 660 to obtain a second value indicating a root mean square of that signal derived from the second audio signal portion is obtained. This second value (second RMS value) is still represented in the time domain. Unit 620 then transforms the second RMS value from the time domain to the tracing domain, here, the (ACELP) LPC domain. The second RMS value, being represented in the tracing domain, is then fed into the noise level tracing unit 630.

In embodiments, level tracing is conducted in the excitation domain, but TCX fade-out is conducted in the time domain.

Whereas during normal decoding the background noise level is traced, it may, e.g., be used during packet loss as an indicator of an appropriate comfort noise level, to which the last received signal is smoothly faded level-wise.

Deriving the level for tracing and applying the level fade-out are in general independent from each other and could be performed in different domains. In the advantageous embodiment, the level application is performed in the same domains as the level derivation, leading to the same benefits that for ACELP, no gain compensation is needed, and that for TCX, the inverse gain compensation as for the level derivation (see FIG. 6) is needed and hence the same gain derivation can be used, as illustrated by FIG. 7.

In the following, compensation of an influence of the high pass filter on the LPC synthesis gain according to embodiments is described.

Figure 8:
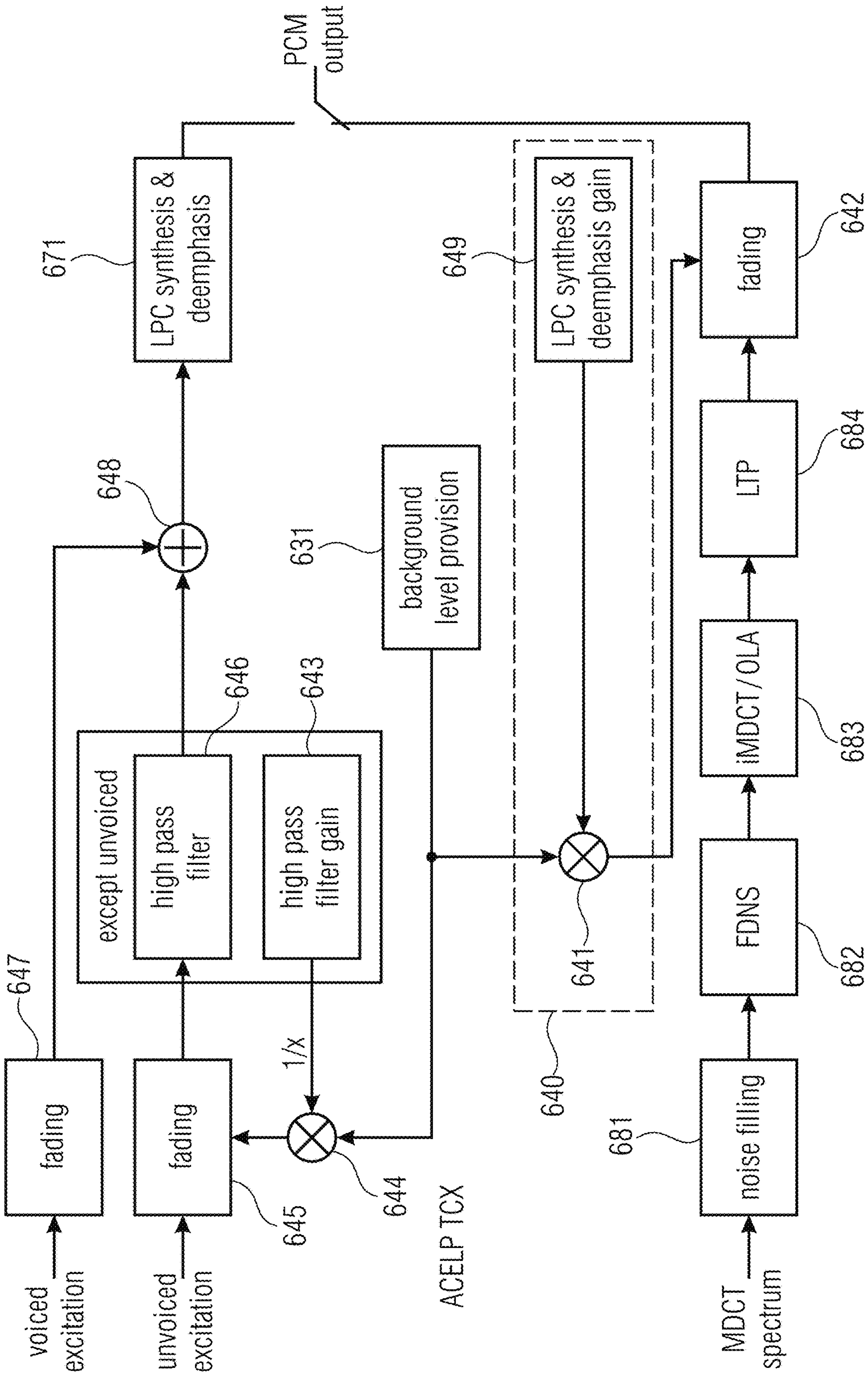
FIG. 8 depicts comfort noise level application during packet loss according to an embodiment.

FIG. 8 outlines this approach. In particular, FIG. 8 illustrates comfort noise level application during packet loss.

In FIG. 8, high pass gain filter unit 643, multiplication unit 644, fading unit 645, high pass filter unit 646, fading unit 647 and combination unit 648 together form a first reconstruction unit.

Moreover, in FIG. 8, background level provision unit 631 provides the noise level information. For example, background level provision unit 631 may be equally implemented as background level tracing unit 630 of FIG. 6.

Furthermore, in FIG. 8, LPC Synthesis & De-Emphasis Gain Unit 649 and multiplication unit 641 together for a second transform unit 640.

Moreover, in FIG. 8, fading unit 642 represents a second reconstruction unit.

In the embodiment of FIG. 8, voiced and unvoiced excitation are faded separately: The voiced excitation is faded to zero, but the unvoiced excitation is faded towards the comfort noise level. FIG. 8 furthermore depicts a high pass filter, which is introduced into the signal chain of the unvoiced excitation to suppress low frequency components for all cases except when the signal was classified as unvoiced.

As to model the influence of the high pass filter, the level after LPC synthesis and de-emphasis is computed once with and once without the high pass filter. Subsequently the ratio of those two levels is derived and used to alter the applied background level.

Figure 9:
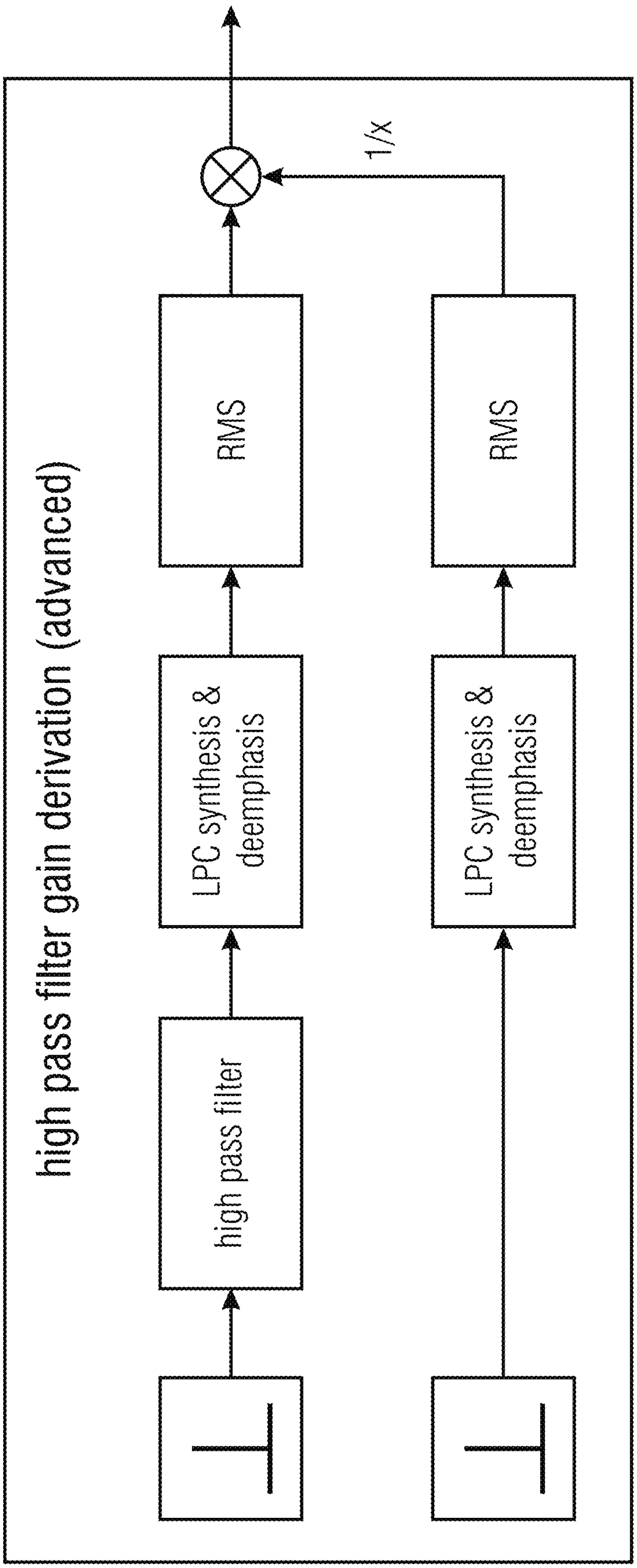
FIG. 9 illustrates advanced high pass gain compensation during ACELP concealment according to an embodiment.

This is illustrated by FIG. 9. In particular, FIG. 9 depicts advanced high pass gain compensation during ACELP concealment according to an embodiment.

Instead of the current excitation signal just a simple impulse is used as input for this computation. This allows for a reduced complexity, since the impulse response decays quickly and so the RMS derivation can be performed on a shorter time frame. In practice, just one subframe is used instead of the whole frame.

According to an embodiment, the noise level tracing unit 130 is configured to determine a comfort noise level as the noise level information. The reconstruction unit 140 is configured to reconstruct the third audio signal portion depending on the noise level information, if said third frame of the plurality of frames is not received by the receiving interface 110 or if said third frame is received by the receiving interface 110 but is corrupted.

According to an embodiment, the noise level tracing unit 130 is configured to determine a comfort noise level as the noise level information. The reconstruction unit 140 is configured to reconstruct the third audio signal portion depending on the noise level information, if said third frame of the plurality of frames is not received by the receiving interface 110 or if said third frame is received by the receiving interface 110 but is corrupted.

In an embodiment, the noise level tracing unit 130 is configured to determine a comfort noise level as the noise level information derived from a noise level spectrum, wherein said noise level spectrum is obtained by applying the minimum statistics approach. The reconstruction unit 140 is configured to reconstruct the third audio signal portion depending on a plurality of Linear Predictive coefficients, if said third frame of the plurality of frames is not received by the receiving interface 110 or if said third frame is received by the receiving interface 110 but is corrupted.

In an embodiment, the (first and/or second) reconstruction unit 140, 141 may, e.g., be configured to reconstruct the third audio signal portion depending on the noise level information and depending on the first audio signal portion, if said third (fourth) frame of the plurality of frames is not received by the receiving interface 110 or if said third (fourth) frame is received by the receiving interface 110 but is corrupted.

According to an embodiment, the (first and/or second) reconstruction unit 140, 141 may, e.g., be configured to reconstruct the third (or fourth) audio signal portion by attenuating or amplifying the first audio signal portion.

Figure 14:
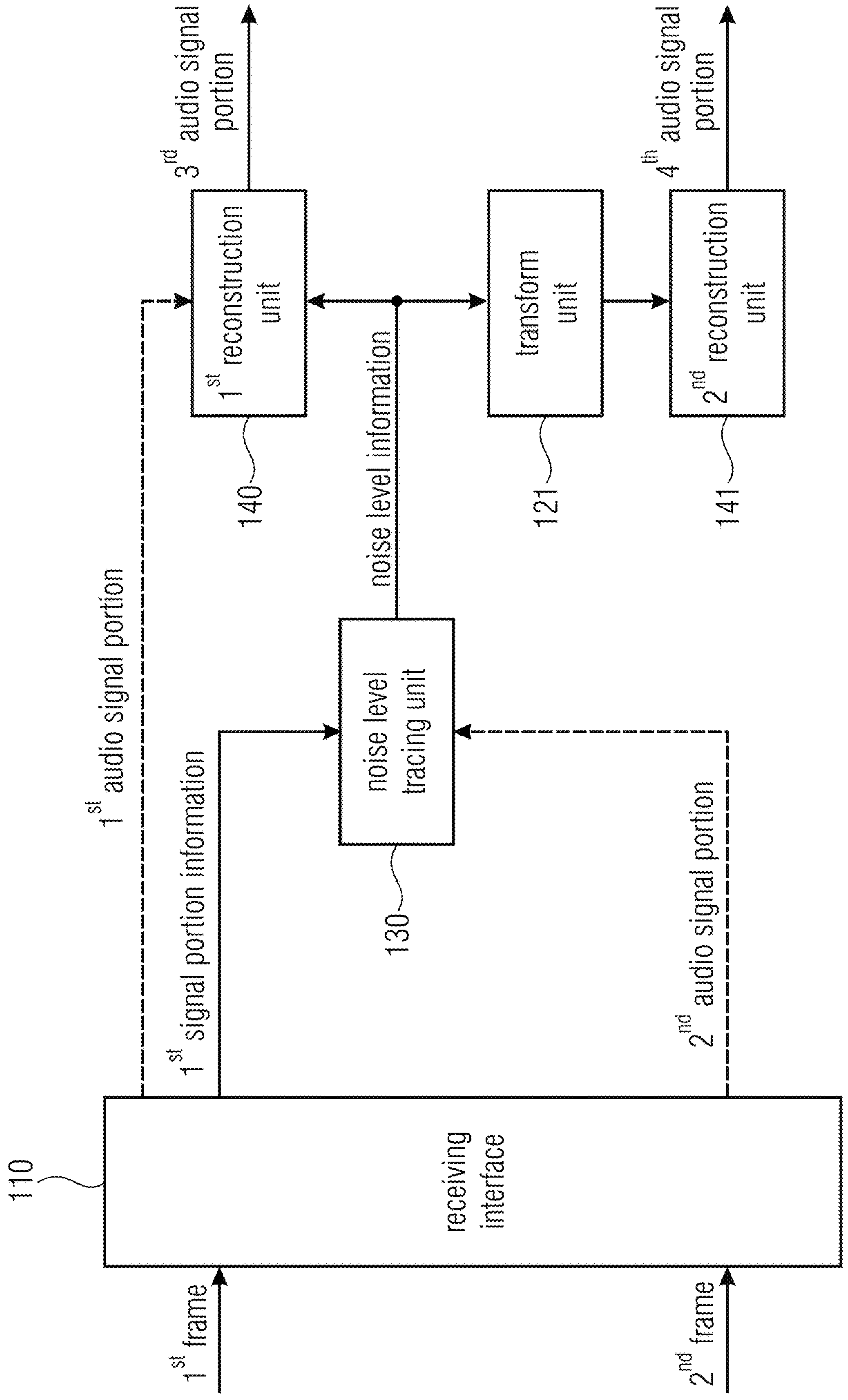
FIG. 14 illustrates an apparatus for decoding an encoded audio signal to obtain a reconstructed audio signal another embodiment.

FIG. 14 illustrates an apparatus for decoding an audio signal. The apparatus comprises a receiving interface 110, wherein the receiving interface 110 is configured to receive a first frame comprising a first audio signal portion of the audio signal, and wherein the receiving interface 110 is configured to receive a second frame comprising a second audio signal portion of the audio signal.

Moreover, the apparatus comprises a noise level tracing unit 130, wherein the noise level tracing unit 130 is configured to determine noise level information depending on at least one of the first audio signal portion and the second audio signal portion (this means: depending on the first audio signal portion and/or the second audio signal portion), wherein the noise level information is represented in a tracing domain.

Furthermore, the apparatus comprises a first reconstruction unit 140 for reconstructing, in a first reconstruction domain, a third audio signal portion of the audio signal depending on the noise level information, if a third frame of the plurality of frames is not received by the receiving interface 110 or if said third frame is received by the receiving interface 110 but is corrupted, wherein the first reconstruction domain is different from or equal to the tracing domain.

Moreover, the apparatus comprises a transform unit 121 for transforming the noise level information from the tracing domain to a second reconstruction domain, if a fourth frame of the plurality of frames is not received by the receiving interface 110 or if said fourth frame is received by the receiving interface 110 but is corrupted, wherein the second reconstruction domain is different from the tracing domain, and wherein the second reconstruction domain is different from the first reconstruction domain, and Furthermore, the apparatus comprises a second reconstruction unit 141 for reconstructing, in the second reconstruction domain, a fourth audio signal portion of the audio signal depending on the noise level information being represented in the second reconstruction domain, if said fourth frame of the plurality of frames is not received by the receiving interface 110 or if said fourth frame is received by the receiving interface 110 but is corrupted.

According to some embodiments, the tracing domain may, e.g., be wherein the tracing domain is a time domain, a spectral domain, an FFT domain, an MDCT domain, or an excitation domain. The first reconstruction domain may, e.g., be the time domain, the spectral domain, the FFT domain, the MDCT domain, or the excitation domain. The second reconstruction domain may, e.g., be the time domain, the spectral domain, the FFT domain, the MDCT domain, or the excitation domain.

In an embodiment, the tracing domain may, e.g., be the FFT domain, the first reconstruction domain may, e.g., be the time domain, and the second reconstruction domain may, e.g., be the excitation domain.

In another embodiment, the tracing domain may, e.g., be the time domain, the first reconstruction domain may, e.g., be the time domain, and the second reconstruction domain may, e.g., be the excitation domain.

According to an embodiment, said first audio signal portion may, e.g., be represented in a first input domain, and said second audio signal portion may, e.g., be represented in a second input domain. The transform unit may, e.g., be a second transform unit. The apparatus may, e.g., further comprise a first transform unit for transforming the second audio signal portion or a value or signal derived from the second audio signal portion from the second input domain to the tracing domain to obtain a second signal portion information. The noise level tracing unit may, e.g., be configured to receive a first signal portion information being represented in the tracing domain, wherein the first signal portion information depends on the first audio signal portion, wherein the noise level tracing unit is configured to receive the second signal portion being represented in the tracing domain, and wherein the noise level tracing unit is configured to the determine the noise level information depending on the first signal portion information being represented in the tracing domain and depending on the second signal portion information being represented in the tracing domain.

According to an embodiment, the first input domain may, e.g., be the excitation domain, and the second input domain may, e.g., be the MDCT domain.

In another embodiment, the first input domain may, e.g., be the MDCT domain, and wherein the second input domain may, e.g., be the MDCT domain.

If, for example, a signal is represented in a time domain, it may, e.g., be represented by time domain samples of the signal. Or, for example, if a signal is represented in a spectral domain, it may, e.g., be represented by spectral samples of a spectrum of the signal.

In an embodiment, the tracing domain may, e.g., be the FFT domain, the first reconstruction domain may, e.g., be the time domain, and the second reconstruction domain may, e.g., be the excitation domain.

In another embodiment, the tracing domain may, e.g., be the time domain, the first reconstruction domain may, e.g., be the time domain, and the second reconstruction domain may, e.g., be the excitation domain.

In some embodiments, the units illustrated in FIG. 14, may, for example, be configured as described for FIGS. 1*a*, 1*b*, 1*c* and 1*d*.

Regarding particular embodiments, in, for example, a low rate mode, an apparatus according to an embodiment may, for example, receive ACELP frames as an input, which are represented in an excitation domain, and which are then transformed to a time domain via LPC synthesis. Moreover, in the low rate mode, the apparatus according to an embodiment may, for example, receive TCX frames as an input, which are represented in an MDCT domain, and which are then transformed to a time domain via an inverse MDCT.

Tracing is then conducted in an FFT-Domain, wherein the FFT signal is derived from the time domain signal by conducting an FFT (Fast Fourier Transform). Tracing may, for example, be conducted by conducting a minimum statistics approach, separate for all spectral lines to obtain a comfort noise spectrum.

Concealment is then conducted by conducting level derivation based on the comfort noise spectrum. Level derivation is conducted based on the comfort noise spectrum. Level conversion into the time domain is conducted for FD TCX PLC. A fading in the time domain is conducted. A level derivation into the excitation domain is conducted for ACELP PLC and for TD TCX PLC (ACELP like). A fading in the excitation domain is then conducted.

The following list summarizes this:

low rate:
- input:
  - acelp (excitation domain→time domain, via lpc synthesis)
  - tcx (mdct domain→time domain, via inverse MDCT)
- tracing:
  - fft-domain, derived from time domain via FFT
  - minimum statistics, separate for all spectral lines→comfort noise spectrum
- concealment:
  - level derivation based on the comfort noise spectrum
  - level conversion into time domain for
    - FD TCX PLC
      - →fading in the time domain
  - level conversion into excitation domain for
    - ACELP PLC
    - TD TCX PLC (ACELP like)
      - →fading in the excitation domain In, for example, a high rate mode, may, for example, receive TCX frames as an input, which are represented in the MDCT domain, and which are then transformed to the time domain via an inverse MDCT.

Tracing may then be conducted in the time domain. Tracing may, for example, be conducted by conducting a minimum statistics approach based on the energy level to obtain a comfort noise level.

For concealment, for FD TCX PLC, the level may be used as is and only a fading in the time domain may be conducted. For TD TCX PLC (ACELP like), level conversion into the excitation domain and fading in the excitation domain is conducted.

The following list summarizes this:

high rate:
- input:
  - tcx (mdct domain→time domain, via inverse MDCT)
- tracing:
  - time-domain
  - minimum statistics on the energy level→comfort noise level
- concealment:
  - level usage "as is"
    - FD TCX PLC
      - →fading in the time domain
  - level conversion into excitation domain for
    - TD TCX PLC (ACELP like)
      - →fading in the excitation domain The FFT domain and the MDCT domain are both spectral domains, whereas the excitation domain is some kind of time domain.

According to an embodiment, the first reconstruction unit 140 may, e.g., be configured to reconstruct the third audio signal portion by conducting a first fading to a noise like spectrum. The second reconstruction unit 141 may, e.g., be configured to reconstruct the fourth audio signal portion by conducting a second fading to a noise like spectrum and/or a second fading of an LTP gain. Moreover, the first reconstruction unit 140 and the second reconstruction unit 141 may, e.g., be configured to conduct the first fading and the second fading to a noise like spectrum and/or a second fading of an LTP gain with the same fading speed.

Now adaptive spectral shaping of comfort noise is considered.

To achieve adaptive shaping to comfort noise during burst packet loss, as a first step, finding appropriate LPC coefficients which represent the background noise may be conducted. These LPC coefficients may be derived during active speech using a minimum statistics approach for finding the background noise spectrum and then calculating LPC coefficients from it by using an arbitrary algorithm for LPC derivation known from the literature. Some embodiments, for example, may directly convert the background noise spectrum into a representation which can be used directly for FDNS in the MDCT domain.

The fading to comfort noise can be done in the ISF domain (also applicable in LSF domain; LSF Line spectral frequency):

$$f_{current}[i]=\alpha \cdot f_{last}[i]+(1-\alpha)\cdot pt_{mean}[i]\, i=0 \ldots 16 \qquad (26)$$

by setting $pt_{mean}$ to appropriate LP coefficients describing the comfort noise.

Figure 11:
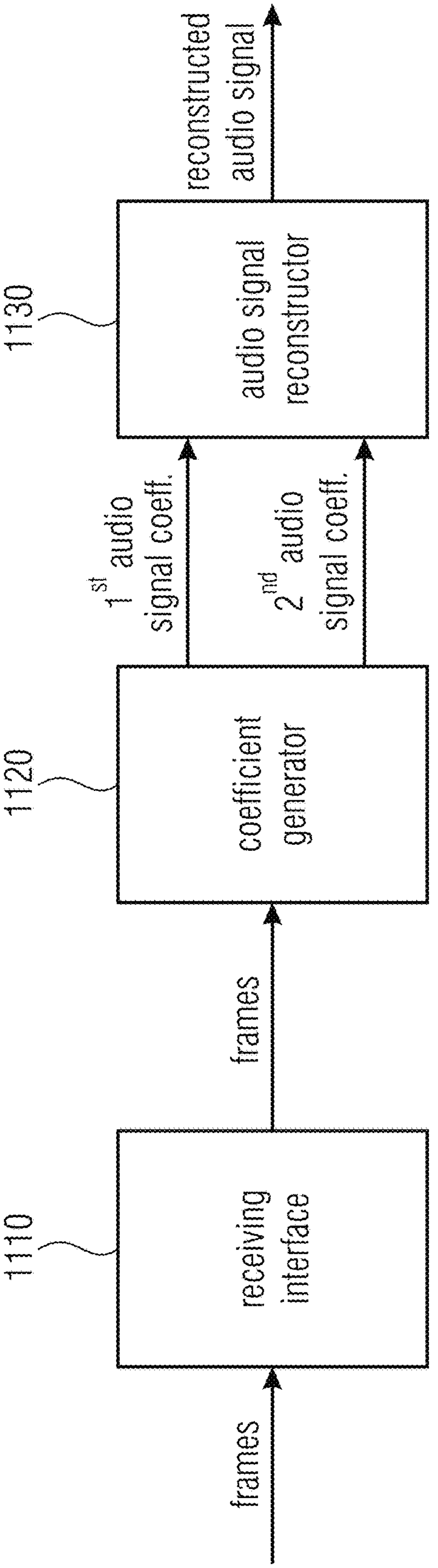
FIG. 11 illustrates an apparatus for decoding an encoded audio signal to obtain a reconstructed audio signal according to an embodiment.

Regarding the above-described adaptive spectral shaping of the comfort noise, a more general embodiment is illustrated by FIG. 11.

FIG. 11 illustrates an apparatus for decoding an encoded audio signal to obtain a reconstructed audio signal according to an embodiment.

The apparatus comprises a receiving interface 1110 for receiving one or more frames, a coefficient generator 1120, and a signal reconstructor 1130.

The coefficient generator 1120 is configured to determine, if a current frame of the one or more frames is received by the receiving interface 1110 and if the current frame being received by the receiving interface 1110 is not corrupted/erroneous, one or more first audio signal coefficients, being comprised by the current frame, wherein said one or more first audio signal coefficients indicate a characteristic of the encoded audio signal, and one or more noise coefficients indicating a background noise of the encoded audio signal. Moreover, the coefficient generator 1120 is configured to generate one or more second audio signal coefficients, depending on the one or more first audio signal coefficients and depending on the one or more noise coefficients, if the current frame is not received by the receiving interface 1110 or if the current frame being received by the receiving interface 1110 is corrupted/erroneous.

The audio signal reconstructor 1130 is configured to reconstruct a first portion of the reconstructed audio signal depending on the one or more first audio signal coefficients, if the current frame is received by the receiving interface 1110 and if the current frame being received by the receiving interface 1110 is not corrupted. Moreover, the audio signal reconstructor 1130 is configured to reconstruct a second portion of the reconstructed audio signal depending on the one or more second audio signal coefficients, if the current frame is not received by the receiving interface 1110 or if the current frame being received by the receiving interface 1110 is corrupted.

Determining a background noise is well known in the art (see, for example, [March01]: Rainer Martin, *Noise power spectral density estimation based on optimal smoothing and minimum statistics*, IEEE Transactions on Speech and Audio Processing 9 (2001), no. 5, 504-512), and in an embodiment, the apparatus proceeds accordingly.

In some embodiments, the one or more first audio signal coefficients may, e.g., be one or more linear predictive filter coefficients of the encoded audio signal. In some embodiments, the one or more first audio signal coefficients may, e.g., be one or more linear predictive filter coefficients of the encoded audio signal.

It is well known in the art how to reconstruct an audio signal, e.g., a speech signal, from linear predictive filter coefficients or from immittance spectral pairs (see, for example, [3GP09c]: *Speech codec speech processing functions; adaptive multi-rate-wideband* (*AMRWB*) *speech codec; transcoding functions,* 3GPP TS 26.190, 3rd Generation Partnership Project, 2009), and in an embodiment, the signal reconstructor proceeds accordingly.

According to an embodiment, the one or more noise coefficients may, e.g., be one or more linear predictive filter coefficients indicating the background noise of the encoded audio signal. In an embodiment, the one or more linear predictive filter coefficients may, e.g., represent a spectral shape of the background noise.

In an embodiment, the coefficient generator 1120 may, e.g., be configured to determine the one or more second audio signal portions such that the one or more second audio signal portions are one or more linear predictive filter coefficients of the reconstructed audio signal, or such that the one or more first audio signal coefficients are one or more immittance spectral pairs of the reconstructed audio signal.

According to an embodiment, the coefficient generator 1120 may, e.g., be configured to generate the one or more second audio signal coefficients by applying the formula:

$$f_{current}[i]=\alpha \cdot f_{last}[i]+(1-\alpha)\cdot pt_{mean}[i]$$

wherein $f_{current}[i]$ indicates one of the one or more second audio signal coefficients, wherein $f_{last}[i]$ indicates one of the one or more first audio signal coefficients, wherein $pt_{mean}[i]$ is one of the one or more noise coefficients, wherein α is a real number with $0 \le \alpha \le 1$, and wherein i is an index.

According to an embodiment, $f_{last}[i]$ indicates a linear predictive filter coefficient of the encoded audio signal, and wherein $f_{current}[i]$ indicates a linear predictive filter coefficient of the reconstructed audio signal.

In an embodiment, $pt_{mean}[i]$ may, e.g., be a linear predictive filter coefficient indicating the background noise of the encoded audio signal.

According to an embodiment, the coefficient generator 1120 may, e.g., be configured to generate at least 10 second audio signal coefficients as the one or more second audio signal coefficients.

In an embodiment, the coefficient generator 1120 may, e.g., be configured to determine, if the current frame of the one or more frames is received by the receiving interface 1110 and if the current frame being received by the receiving interface 1110 is not corrupted, the one or more noise coefficients by determining a noise spectrum of the encoded audio signal.

In the following, fading the MDCT Spectrum to White Noise prior to FDNS Application is considered.

Instead of randomly modifying the sign of an MDCT bin (sign scrambling), the complete spectrum is filled with white noise, being shaped using the FDNS. To avoid an instant change in the spectrum characteristics, a cross-fade between sign scrambling and noise filling is applied. The cross fade can be realized as follows:

```
for(i=0; i<L_frame; i++) {
  if (old_x[i] != 0) {
    x[i] = (1 - cum_damping)*noise[i] + cum_damping *
random_sign( ) * x_old[i];
  }
}
```

where:

cum_damping is the (absolute) attenuation factor—it decreases from frame to frame, starting from 1 and decreasing towards 0 x_old is the spectrum of the last received frame random_sign returns 1 or −1 noise contains a random vector (white noise) which is scaled such that its quadratic mean (RMS) is similar to the last good spectrum.

The term random_sign ( )*old_x[i] characterizes the sign-scrambling process to randomize the phases and such avoid harmonic repetitions.

Subsequently, another normalization of the energy level might be performed after the cross-fade to make sure that the summation energy does not deviate due to the correlation of the two vectors.

According to embodiments, the first reconstruction unit 140 may, e.g., be configured to reconstruct the third audio signal portion depending on the noise level information and depending on the first audio signal portion. In a particular embodiment, the first reconstruction unit 140 may, e.g., be configured to reconstruct the third audio signal portion by attenuating or amplifying the first audio signal portion.

In some embodiments, the second reconstruction unit 141 may, e.g., be configured to reconstruct the fourth audio signal portion depending on the noise level information and depending on the second audio signal portion. In a particular embodiment, the second reconstruction unit 141 may, e.g., be configured to reconstruct the fourth audio signal portion by attenuating or amplifying the second audio signal portion.

Figure 12:
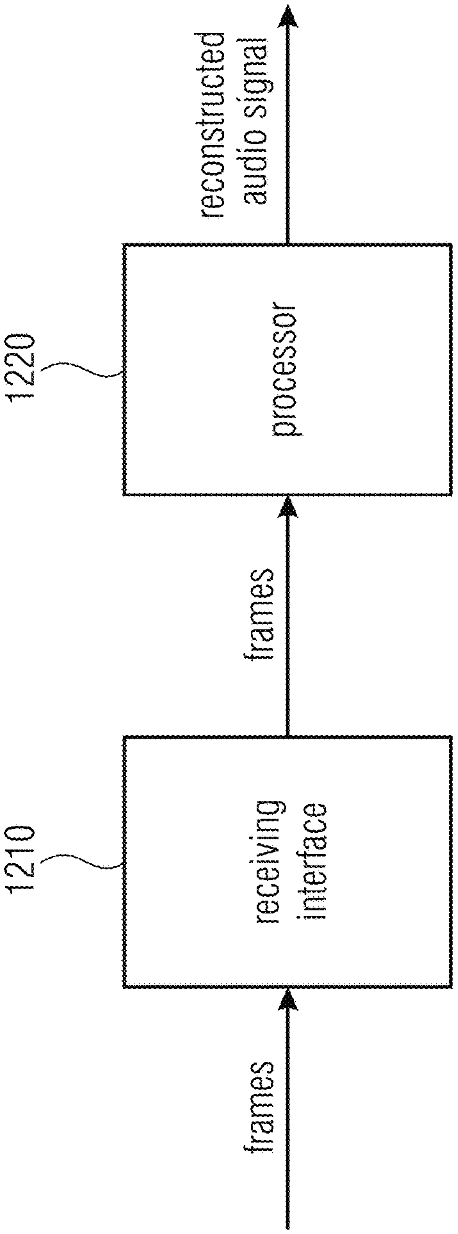
FIG. 12 shows an apparatus for decoding an encoded audio signal to obtain a reconstructed audio signal according to another embodiment.

Regarding the above-described fading of the MDCT Spectrum to white noise prior to the FDNS application, a more general embodiment is illustrated by FIG. 12.

FIG. 12 illustrates an apparatus for decoding an encoded audio signal to obtain a reconstructed audio signal according to an embodiment.

The apparatus comprises a receiving interface 1210 for receiving one or more frames comprising information on a plurality of audio signal samples of an audio signal spectrum of the encoded audio signal, and a processor 1220 for generating the reconstructed audio signal.

The processor 1220 is configured to generate the reconstructed audio signal by fading a modified spectrum to a target spectrum, if a current frame is not received by the receiving interface 1210 or if the current frame is received by the receiving interface 1210 but is corrupted, wherein the modified spectrum comprises a plurality of modified signal samples, wherein, for each of the modified signal samples of the modified spectrum, an absolute value of said modified signal sample is equal to an absolute value of one of the audio signal samples of the audio signal spectrum.

Moreover, the processor 1220 is configured to not fade the modified spectrum to the target spectrum, if the current frame of the one or more frames is received by the receiving interface 1210 and if the current frame being received by the receiving interface 1210 is not corrupted.

According to an embodiment, the target spectrum is a noise like spectrum.

In an embodiment, the noise like spectrum represents white noise.

According to an embodiment, the noise like spectrum is shaped.

In an embodiment, the shape of the noise like spectrum depends on an audio signal spectrum of a previously received signal.

According to an embodiment, the noise like spectrum is shaped depending on the shape of the audio signal spectrum.

In an embodiment, the processor 1220 employs a tilt factor to shape the noise like spectrum.

According to an embodiment, the processor 1220 employs the formula $$\text{shaped\_noise}[i]=\text{noise}*\text{power}(\text{tilt\_factor},i/N)$$

wherein N indicates the number of samples, wherein i is an index, wherein 0<=i<N, with tilt_factor>0, wherein power is a power function.

If the tilt_factor is smaller 1 this means attenuation with increasing i. If the tilt_factor is larger 1 means amplification with increasing i.

According to another embodiment, the processor 1220 may employ the formula $$\text{shaped\_noise}[i]=\text{noise}*(1+i/(N-1)*(\text{tilt\_factor}-1))$$

wherein N indicates the number of samples, wherein i is an index, wherein 0<=i<N, with tilt_factor>0.

According to an embodiment, the processor 1220 is configured to generate the modified spectrum, by changing a sign of one or more of the audio signal samples of the audio signal spectrum, if the current frame is not received by the receiving interface 1210 or if the current frame being received by the receiving interface 1210 is corrupted.

In an embodiment, each of the audio signal samples of the audio signal spectrum is represented by a real number but not by an imaginary number.

According to an embodiment, the audio signal samples of the audio signal spectrum are represented in a Modified Discrete Cosine Transform domain.

In another embodiment, the audio signal samples of the audio signal spectrum are represented in a Modified Discrete Sine Transform domain.

According to an embodiment, the processor 1220 is configured to generate the modified spectrum by employing a random sign function which randomly or pseudo-randomly outputs either a first or a second value.

In an embodiment, the processor 1220 is configured to fade the modified spectrum to the target spectrum by subsequently decreasing an attenuation factor.

According to an embodiment, the processor 1220 is configured to fade the modified spectrum to the target spectrum by subsequently increasing an attenuation factor.

In an embodiment, if the current frame is not received by the receiving interface 1210 or if the current frame being received by the receiving interface 1210 is corrupted, the processor 1220 is configured to generate the reconstructed audio signal by employing the formula:

$$x[i]=(1-\text{cum\_damping})*\text{noise}[i]+\text{cum\_damping}*\text{random\_sign}(\ )*x\_\text{old}[i]$$

wherein i is an index, wherein x[i] indicates a sample of the reconstructed audio signal, wherein cum_damping is an attenuation factor, wherein x_old[i] indicates one of the audio signal samples of the audio signal spectrum of the encoded audio signal, wherein random_sign ( ) returns 1 or −1, and wherein noise is a random vector indicating the target spectrum.

Some embodiments continue a TCX LTP operation. In those embodiments, the TCX LTP operation is continued during concealment with the LTP parameters (LTP lag and LTP gain) derived from the last good frame.

The LTP operations can be summarized as:

Feed the LTP delay buffer based on the previously derived output.

Based on the LTP lag: choose the appropriate signal portion out of the LTP delay buffer that is used as LTP contribution to shape the current signal.

Rescale this LTP contribution using the LTP gain.

Add this rescaled LTP contribution to the LTP input signal to generate the LTP output signal.

Different approaches could be considered with respect to the time, when the LTP delay buffer update is performed:

As the first LTP operation in frame n using the output from the last frame n−1. This updates the LTP delay buffer in frame n to be used during the LTP processing in frame n.

As the last LTP operation in frame n using the output from the current frame n. This updates the LTP delay buffer in frame n to be used during the LTP processing in frame n+1.

In the following, decoupling of the TCX LTP feedback loop is considered.

Decoupling the TCX LTP feedback loop avoids the introduction of additional noise (resulting from the noise substitution applied to the LPT input signal) during each feedback loop of the LTP decoder when being in concealment mode.

Figure 10:
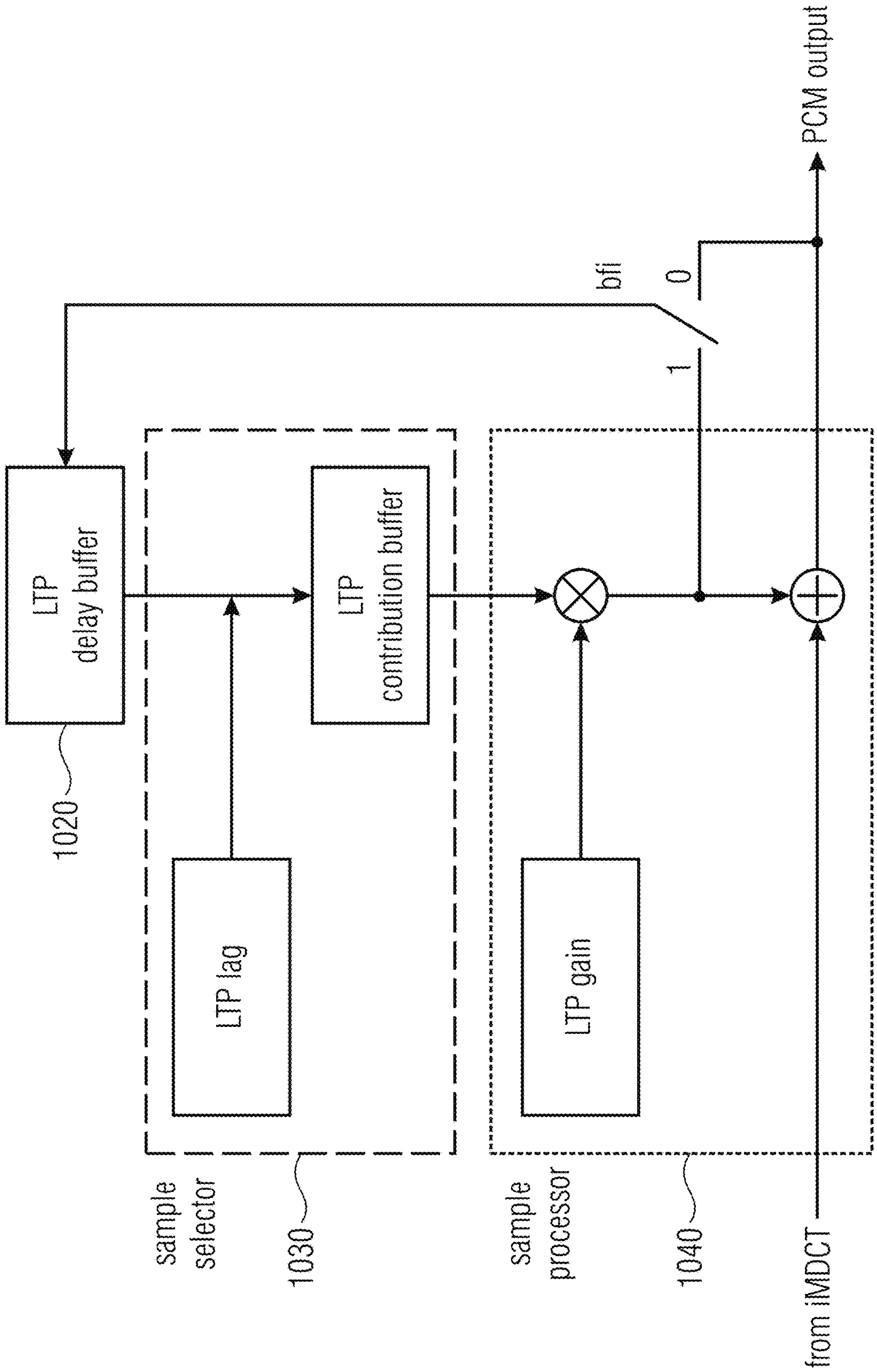
FIG. 10 depicts the decoupling of the LTP feedback loop during concealment according to an embodiment.

FIG. 10 illustrates this decoupling. In particular, FIG. 10 depicts the decoupling of the LTP feedback loop during concealment (bfi=1).

FIG. 10 illustrates a delay buffer 1020, a sample selector 1030, and a sample processor 1040 (the sample processor 1040 is indicated by the dashed line).

Towards the time, when the LTP delay buffer 1020 update is performed, some embodiments proceed as follows:

For the normal operation: To update the LTP delay buffer 1020 as the first LTP operation might be advantageous since the summed output signal is usually stored persistently. With this approach, a dedicated buffer can be omitted.

For the decoupled operation: To update the LTP delay buffer 1020 as the last LTP operation might be since the LTP contribution to the signal is usually just stored temporarily. With this approach, the transitorily LTP contribution signal is preserved. Implementation-wise this LTP contribution buffer could just be made persistent.

Assuming that the latter approach is used in any case (normal operation and concealment), embodiments, may, e.g., implement the following:

During normal operation: The time domain signal output of the LTP decoder after its addition to the LTP input signal is used to feed the LTP delay buffer.

During concealment: The time domain signal output of the LTP decoder prior to its addition to the LTP input signal is used to feed the LTP delay buffer.

Some embodiments fade the TCX LTP gain towards zero. In such embodiment, the TCX LTP gain may, e.g., be faded towards zero with a certain, signal adaptive fade-out factor. This may, e.g., be done iteratively, for example, according to the following pseudo-code:

```
gain=gain_past*damping;
[ . . . ]
gain_past=gain;
```

where:

gain is the TCX LTP decoder gain applied in the current frame;

gain_past is the TCX LTP decoder gain applied in the previous frame;

damping is the (relative) fade-out factor.

Figure 1D:
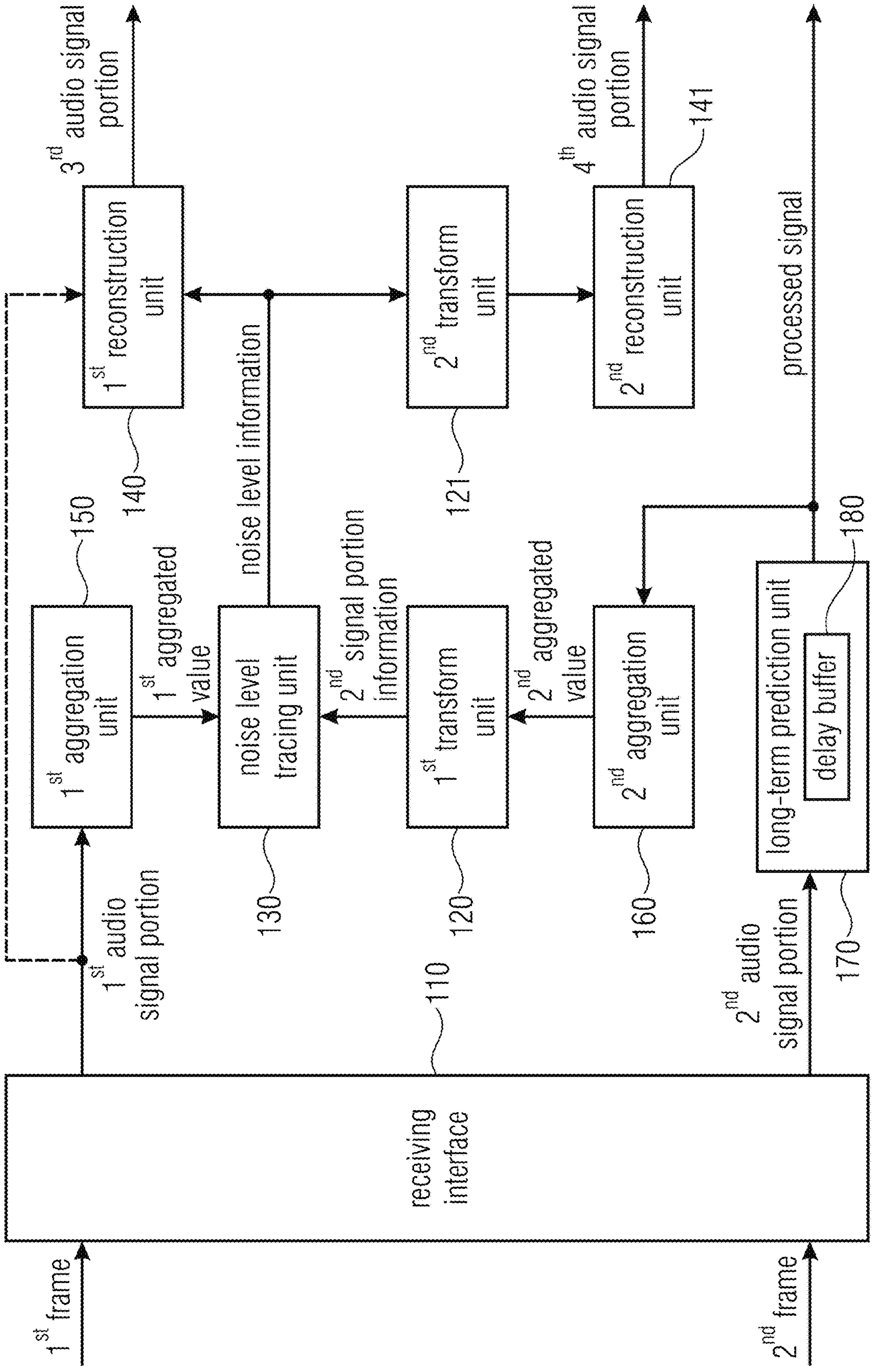
FIG. 1*d* illustrates an apparatus for decoding an audio signal according to a further embodiment, wherein the apparatus moreover comprises a long-term prediction unit comprising a delay buffer.
Figure 2:
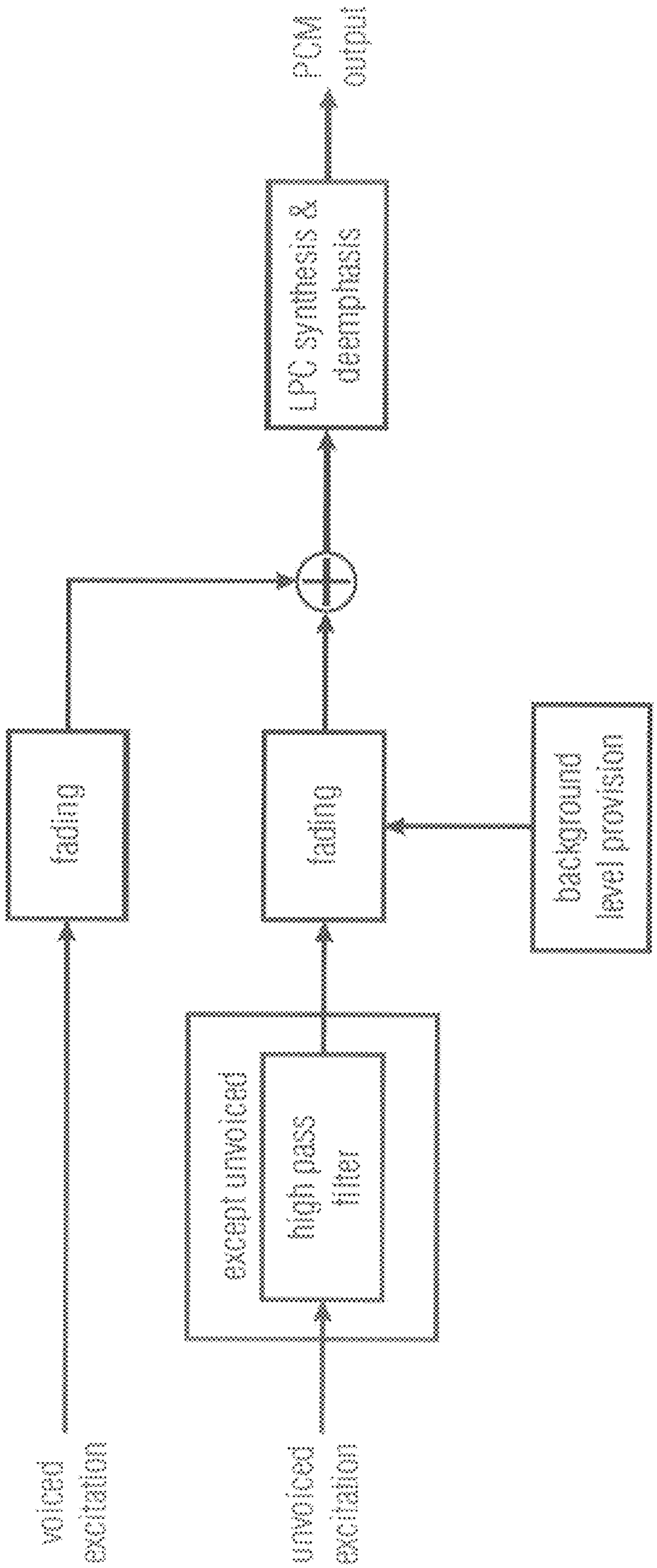
FIG 2 (PRIOR ART)
FIG. 2 illustrates the decoder structure of G.718.
Figure 3:
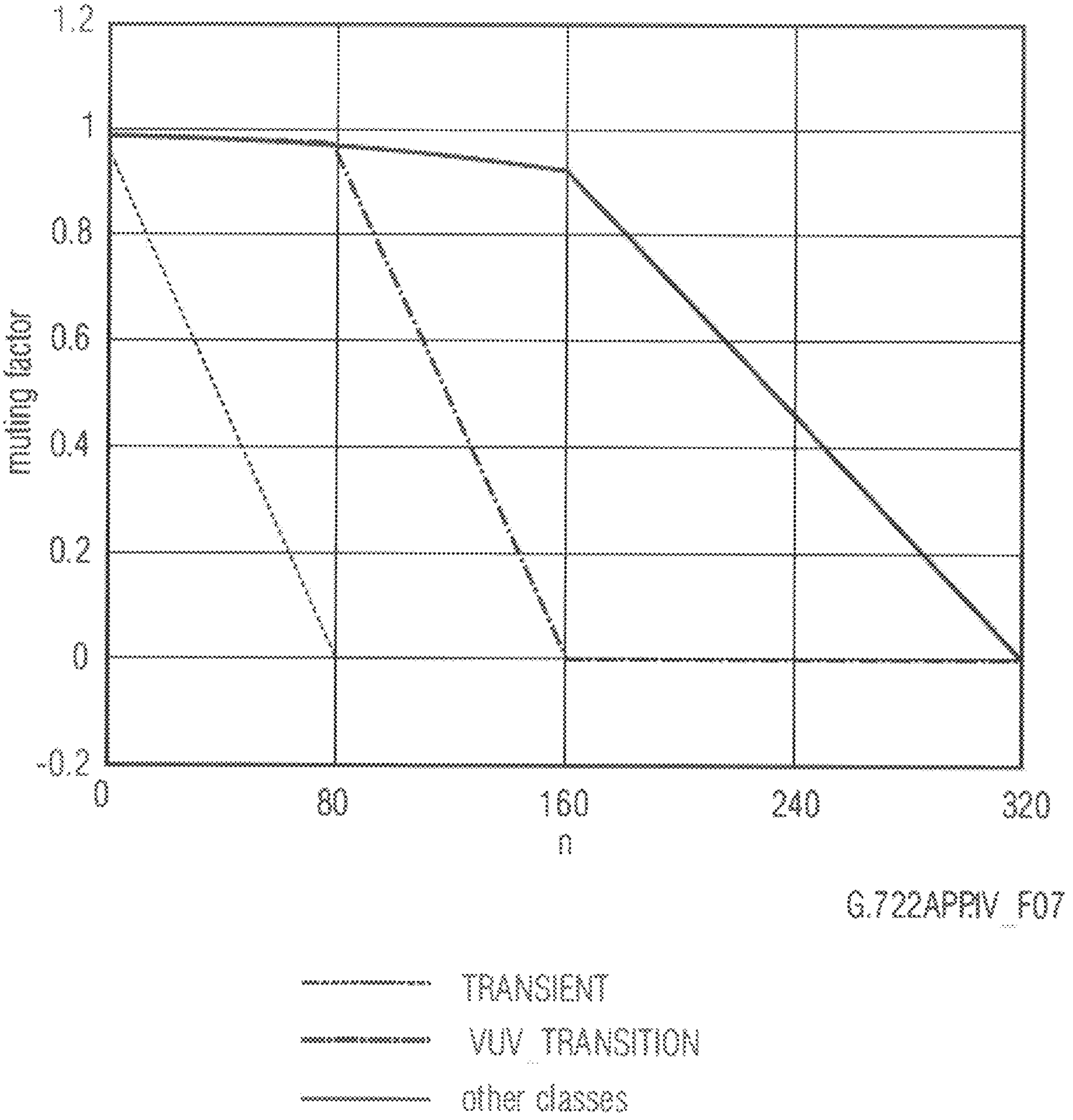
FIG 3 (PRIOR ART)
FIG. 3 depicts a scenario, where the fade-out factor of G.722 depends on class information.
Figure 4:
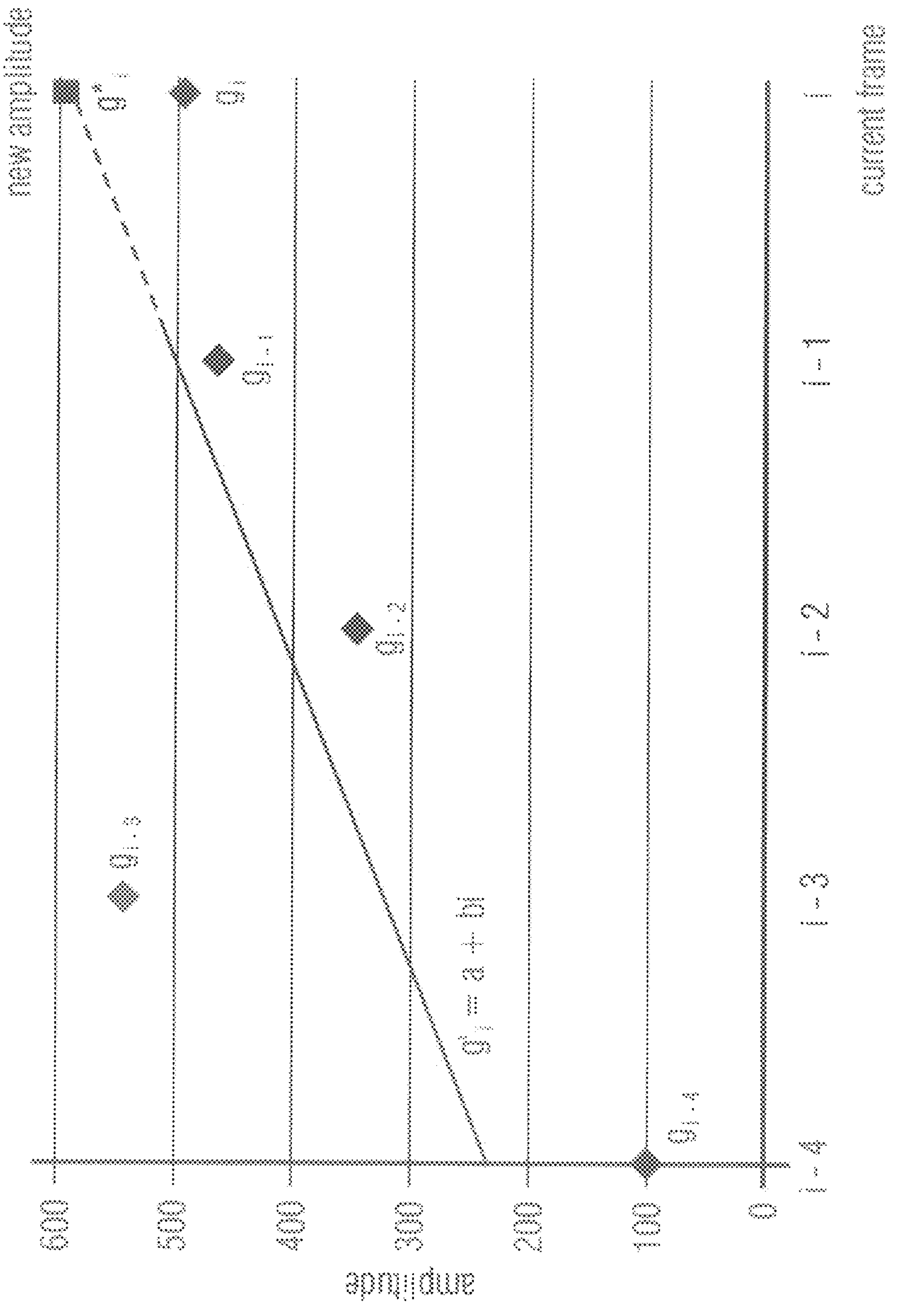
FIG 4 (PRIOR ART)
FIG. 4 shows an approach for amplitude prediction using linear regression.
Figure 5:
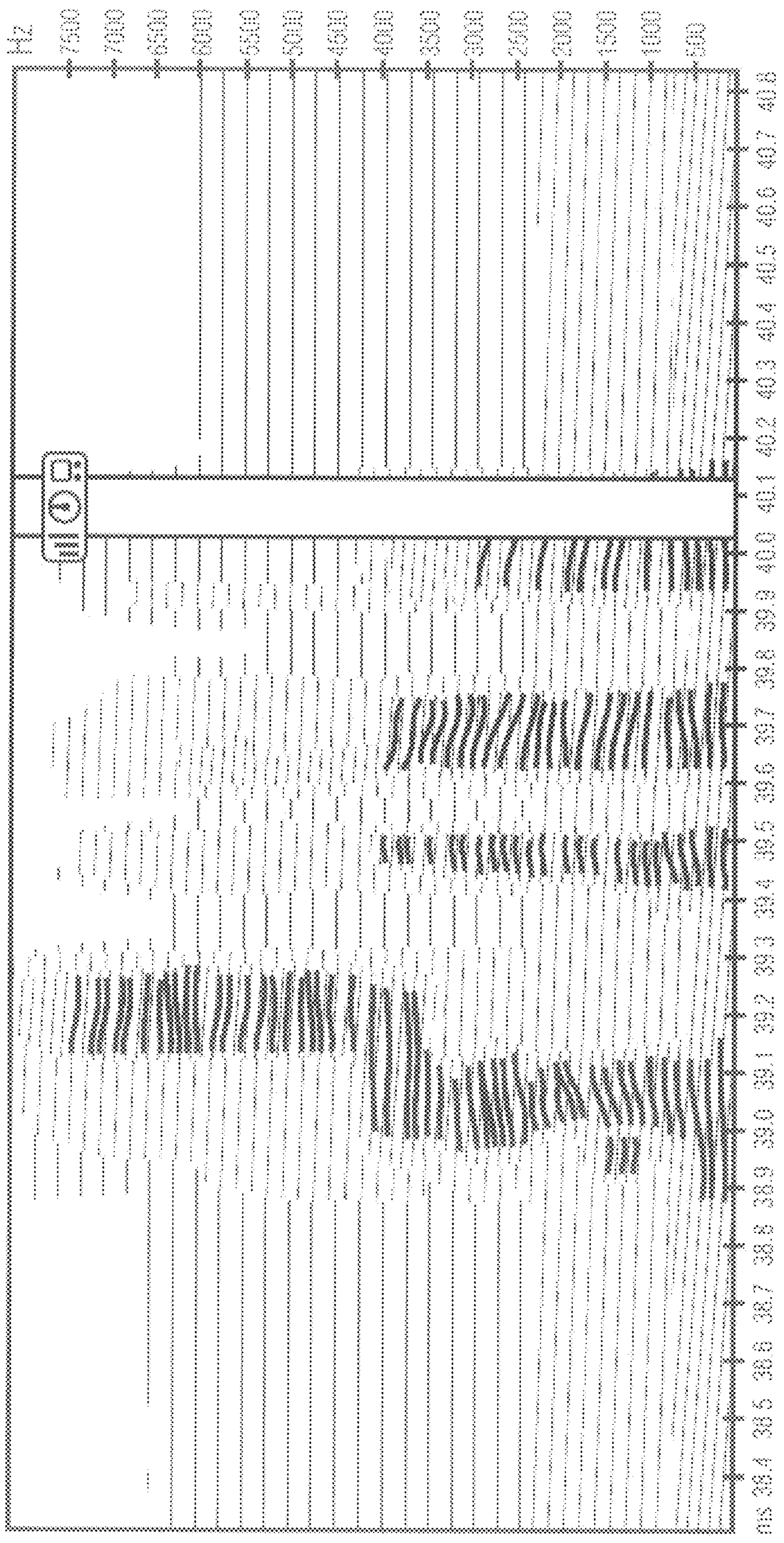
FIG 5 (PRIOR ART)
FIG. 5 illustrates the burst loss behavior of Constrained-Energy Lapped Transform (CELT)

FIG. 1*d* illustrates an apparatus according to a further embodiment, wherein the apparatus further comprises a long-term prediction unit 170 comprising a delay buffer 180. The long-term prediction unit 170 is configured to generate a processed signal depending on the second audio signal portion, depending on a delay buffer input being stored in the delay buffer 180 and depending on a long-term prediction gain. Moreover, the long-term prediction unit is configured to fade the long-term prediction gain towards zero, if said third frame of the plurality of frames is not received by the receiving interface 110 or if said third frame is received by the receiving interface 110 but is corrupted.

In other embodiments (not shown), the long-term prediction unit may, e.g., be configured to generate a processed signal depending on the first audio signal portion, depending on a delay buffer input being stored in the delay buffer and depending on a long-term prediction gain.

In FIG. 1*d*, the first reconstruction unit 140 may, e.g., generate the third audio signal portion furthermore depending on the processed signal.

In an embodiment, the long-term prediction unit 170 may, e.g., be configured to fade the long-term prediction gain towards zero, wherein a speed with which the long-term prediction gain is faded to zero depends on a fade-out factor.

Alternatively or additionally, the long-term prediction unit 170 may, e.g., be configured to update the delay buffer 180 input by storing the generated processed signal in the delay buffer 180 if said third frame of the plurality of frames is not received by the receiving interface 110 or if said third frame is received by the receiving interface 110 but is corrupted.

Figure 13:
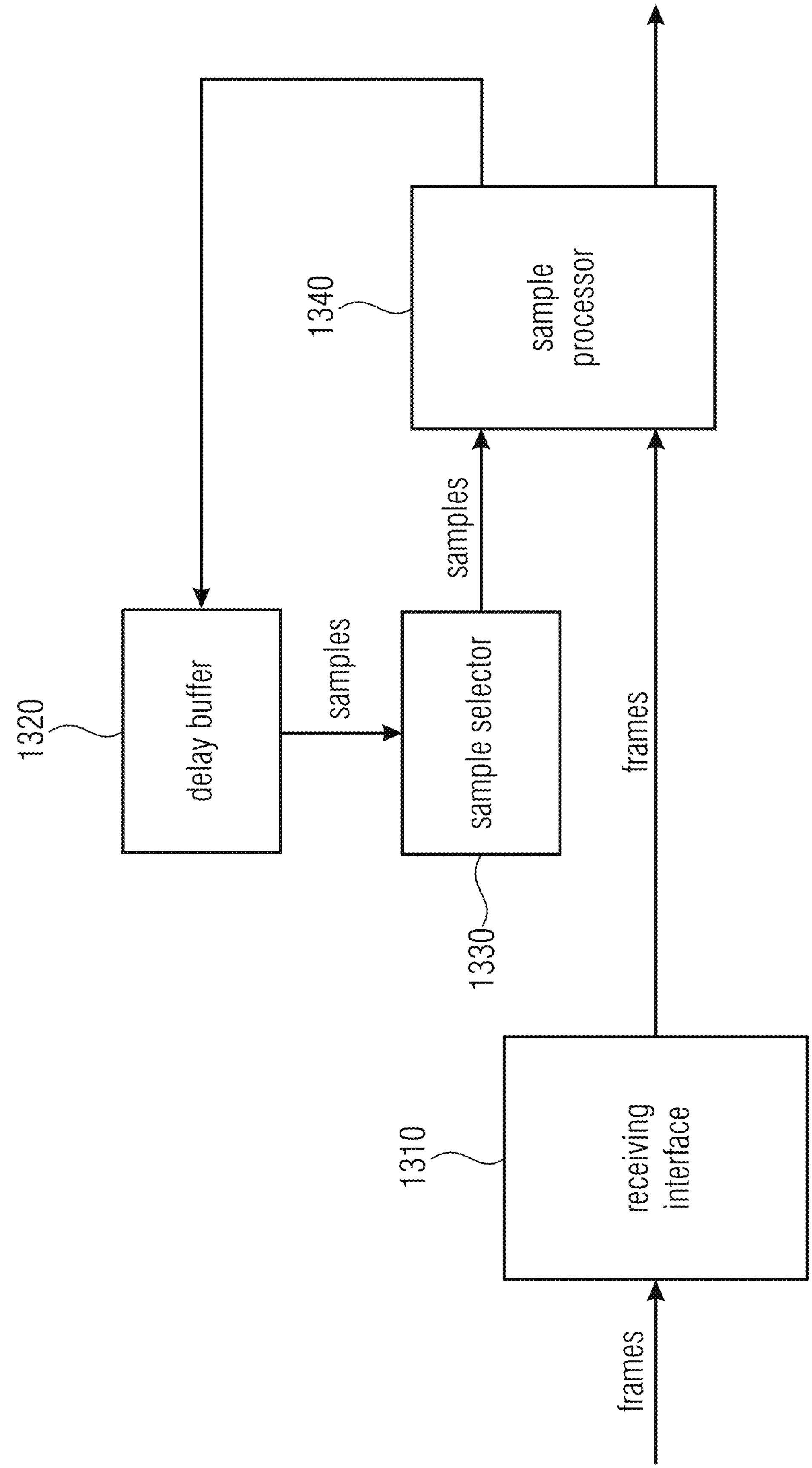
FIG. 13 illustrates an apparatus for decoding an encoded audio signal to obtain a reconstructed audio signal a further embodiment.

Regarding the above-described usage of TCX LTP, a more general embodiment is illustrated by FIG. 13.

FIG. 13 illustrates an apparatus for decoding an encoded audio signal to obtain a reconstructed audio signal.

The apparatus comprises a receiving interface 1310 for receiving a plurality of frames, a delay buffer 1320 for storing audio signal samples of the decoded audio signal, a sample selector 1330 for selecting a plurality of selected audio signal samples from the audio signal samples being stored in the delay buffer 1320, and a sample processor 1340 for processing the selected audio signal samples to obtain reconstructed audio signal samples of the reconstructed audio signal.

The sample selector 1330 is configured to select, if a current frame is received by the receiving interface 1310 and if the current frame being received by the receiving interface 1310 is not corrupted, the plurality of selected audio signal samples from the audio signal samples being stored in the delay buffer 1320 depending on a pitch lag information being comprised by the current frame. Moreover, the sample selector 1330 is configured to select, if the current frame is not received by the receiving interface 1310 or if the current frame being received by the receiving interface 1310 is corrupted, the plurality of selected audio signal samples from the audio signal samples being stored in the delay buffer 1320 depending on a pitch lag information being comprised by another frame being received previously by the receiving interface 1310.

According to an embodiment, the sample processor 1340 may, e.g., be configured to obtain the reconstructed audio signal samples, if the current frame is received by the receiving interface 1310 and if the current frame being received by the receiving interface 1310 is not corrupted, by rescaling the selected audio signal samples depending on the gain information being comprised by the current frame. Moreover, the sample selector 1330 may, e.g., be configured to obtain the reconstructed audio signal samples, if the current frame is not received by the receiving interface 1310 or if the current frame being received by the receiving interface 1310 is corrupted, by rescaling the selected audio signal samples depending on the gain information being comprised by said another frame being received previously by the receiving interface 1310.

In an embodiment, the sample processor 1340 may, e.g., be configured to obtain the reconstructed audio signal samples, if the current frame is received by the receiving interface 1310 and if the current frame being received by the receiving interface 1310 is not corrupted, by multiplying the selected audio signal samples and a value depending on the gain information being comprised by the current frame. Moreover, the sample selector 1330 is configured to obtain the reconstructed audio signal samples, if the current frame is not received by the receiving interface 1310 or if the current frame being received by the receiving interface 1310 is corrupted, by multiplying the selected audio signal samples and a value depending on the gain information being comprised by said another frame being received previously by the receiving interface 1310.

According to an embodiment, the sample processor 1340 may, e.g., be configured to store the reconstructed audio signal samples into the delay buffer 1320.

In an embodiment, the sample processor 1340 may, e.g., be configured to store the reconstructed audio signal samples into the delay buffer 1320 before a further frame is received by the receiving interface 1310.

According to an embodiment, the sample processor 1340 may, e.g., be configured to store the reconstructed audio signal samples into the delay buffer 1320 after a further frame is received by the receiving interface 1310.

In an embodiment, the sample processor 1340 may, e.g., be configured to rescale the selected audio signal samples depending on the gain information to obtain rescaled audio signal samples and by combining the rescaled audio signal samples with input audio signal samples to obtain the processed audio signal samples.

According to an embodiment, the sample processor 1340 may, e.g., be configured to store the processed audio signal samples, indicating the combination of the rescaled audio signal samples and the input audio signal samples, into the delay buffer 1320, and to not store the rescaled audio signal samples into the delay buffer 1320, if the current frame is received by the receiving interface 1310 and if the current frame being received by the receiving interface 1310 is not corrupted. Moreover, the sample processor 1340 is configured to store the rescaled audio signal samples into the delay buffer 1320 and to not store the processed audio signal samples into the delay buffer 1320, if the current frame is not received by the receiving interface 1310 or if the current frame being received by the receiving interface 1310 is corrupted.

According to another embodiment, the sample processor 1340 may, e.g., be configured to store the processed audio signal samples into the delay buffer 1320, if the current frame is not received by the receiving interface 1310 or if the current frame being received by the receiving interface 1310 is corrupted.

In an embodiment, the sample selector 1330 may, e.g., be configured to obtain the reconstructed audio signal samples by rescaling the selected audio signal samples depending on a modified gain, wherein the modified gain is defined according to the formula:

$$gain=gain\_past*damping;$$

wherein gain is the modified gain, wherein the sample selector 1330 may, e.g., be configured to set gain_past to gain after gain and has been calculated, and wherein damping is a real number.

According to an embodiment, the sample selector 1330 may, e.g., be configured to calculate the modified gain.

In an embodiment, damping may, e.g., be defined according to: $0<damping<1$.

According to an embodiment, the modified gain gain may, e.g., be set to zero, if at least a predefined number of frames have not been received by the receiving interface 1310 since a frame last has been received by the receiving interface 1310.

In the following, the fade-out speed is considered. There are several concealment modules which apply a certain kind of fade-out. While the speed of this fade-out might be differently chosen across those modules, it is beneficial to use the same fade-out speed for all concealment modules for one core (ACELP or TCX). For example:

For ACELP, the same fade out speed should be used, in particular, for the adaptive codebook (by altering the gain), and/or for the innovative codebook signal (by altering the gain).

Also, for TCX, the same fade out speed should be used, in particular, for time domain signal, and/or for the LTP gain (fade to zero), and/or for the LPC weighting (fade to one), and/or for the LP coefficients (fade to background spectral shape), and/or for the cross-fade to white noise.

It might further be advantageous to also use the same fade-out speed for ACELP and TCX, but due to the different nature of the cores it might also be chosen to use different fade-out speeds.

This fade-out speed might be static, but is advantageously adaptive to the signal characteristics. For example, the fade-out speed may, e.g., depend on the LPC stability factor (TCX) and/or on a classification, and/or on a number of consecutively lost frames.

The fade-out speed may, e.g., be determined depending on the attenuation factor, which might be given absolutely or relatively, and which might also change over time during a certain fade-out.

In embodiments, the same fading speed is used for LTP gain fading as for the white noise fading.

An apparatus, method and computer program for generating a comfort noise signal as described above have been provided.

Although some aspects have been described in the context of an apparatus, it is clear that these aspects also represent a description of the corresponding method, where a block or device corresponds to a method step or a feature of a method step. Analogously, aspects described in the context of a method step also represent a description of a corresponding block or item or feature of a corresponding apparatus.

The inventive decomposed signal can be stored on a digital storage medium or can be transmitted on a transmission medium such as a wireless transmission medium or a wired transmission medium such as the Internet.

Depending on certain implementation requirements, embodiments of the invention can be implemented in hardware or in software. The implementation can be performed using a digital storage medium, for example a floppy disk, a DVD, a CD, a ROM, a PROM, an EPROM, an EEPROM or a FLASH memory, having electronically readable control signals stored thereon, which cooperate (or are capable of cooperating) with a programmable computer system such that the respective method is performed.

Some embodiments according to the invention comprise a non-transitory data carrier having electronically readable control signals, which are capable of cooperating with a programmable computer system, such that one of the methods described herein is performed.

Generally, embodiments of the present invention can be implemented as a computer program product with a program code, the program code being operative for performing one of the methods when the computer program product runs on a computer. The program code may for example be stored on a machine readable carrier.

Other embodiments comprise the computer program for performing one of the methods described herein, stored on a machine readable carrier.

In other words, an embodiment of the inventive method is, therefore, a computer program having a program code for performing one of the methods described herein, when the computer program runs on a computer.

A further embodiment of the inventive methods is, therefore, a data carrier (or a digital storage medium, or a computer-readable medium) comprising, recorded thereon, the computer program for performing one of the methods described herein.

A further embodiment of the inventive method is, therefore, a data stream or a sequence of signals representing the computer program for performing one of the methods described herein. The data stream or the sequence of signals may for example be configured to be transferred via a data communication connection, for example via the Internet.

A further embodiment comprises a processing means, for example a computer, or a programmable logic device, configured to or adapted to perform one of the methods described herein.

A further embodiment comprises a computer having installed thereon the computer program for performing one of the methods described herein.

In some embodiments, a programmable logic device (for example a field programmable gate array) may be used to perform some or all of the functionalities of the methods described herein. In some embodiments, a field programmable gate array may cooperate with a microprocessor in order to perform one of the methods described herein. Generally, the methods are advantageously performed by any hardware apparatus.

While this invention has been described in terms of several embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations and equivalents as fall within the true spirit and scope of the present invention.

REFERENCES

[3GP09a] 3GPP; Technical Specification Group Services and System Aspects, *Extended adaptive multi-rate-wideband (AMR-WB+) codec,* 3GPP TS 26.290, 3rd Generation Partnership Project, 2009.

[3GP09b] *Extended adaptive multi-rate-wideband (AMR-WB+) codec; floating-point ANSI-C code,* 3GPP TS 26.304, 3rd Generation Partnership Project, 2009.

[3GP09c] *Speech codec speech processing functions; adaptive multi-rate-wideband (AMRWB) speech codec; transcoding functions,* 3GPP TS 26.190, 3rd Generation Partnership Project, 2009.

[3GP12a] *Adaptive multi-rate (AMR) speech codec; error concealment of lost frames (release* 11), 3GPP TS 26.091, 3rd Generation Partnership Project, September 2012.

[3GP12b] *Adaptive multi-rate (AMR) speech codec; transcoding functions (release* 11), 3GPP TS 26.090, 3rd Generation Partnership Project, September 2012.

[3GP12c], ANSI-C code for the adaptive multi-rate-wideband (AMR-WB) speech codec, 3GPP TS 26.173, 3rd Generation Partnership Project, September 2012.

[3GP12d] *ANSI-C code for the floating-point adaptive multi-rate (AMR) speech codec (release*11), 3GPP TS 26.104, 3rd Generation Partnership Project, September 2012.

[3GP12e] *General audio codec audio processing functions; Enhanced aacPlus general audio codec; additional decoder tools (release* 11), 3GPP TS 26.402, 3rd Generation Partnership Project, September 2012.

[3GP12f] *Speech codec speech processing functions; adaptive multi-rate-wideband (amr-wb) speech codec; ansi-c code,* 3GPP TS 26.204, 3rd Generation Partnership Project, 2012.

[3GP12g] *Speech codec speech processing functions; adaptive multi-rate-wideband (AMR-WB) speech codec; error concealment of erroneous or lost frames,* 3GPP TS 26.191, 3rd Generation Partnership Project, September 2012.

[BJH06] I. Batina, J. Jensen, and R. Heusdens, *Noise power spectrum estimation for speech enhancement using an autoregressive model for speech power spectrum dynamics*, in Proc. IEEE Int. Conf. Acoust., Speech, Signal Process. 3 (2006), 1064-1067.

[BP06] A. Borowicz and A. Petrovsky, *Minima controlled noise estimation for kit-based speech enhancement*, CD-ROM, 2006, Italy, Florence.

[Coh03] I. Cohen, *Noise spectrum estimation in adverse environments: Improved minima controlled recursive averaging*, IEEE Trans. Speech Audio Process. 11 (2003), no. 5, 466-475.

[CPK08] Choong Sang Cho, Nam In Park, and Hong Kook Kim, *A packet loss concealment algorithm robust to burst packet loss for celp-type speech coders*, Tech. report, Korea Enectronics Technology Institute, Gwang Institute of Science and Technology, 2008, The 23rd International Technical Conference on Circuits/Systems, Computers and Communications (ITC-CSCC 2008).

[Dob95] G. Doblinger, *Computationally efficient speech enhancement by spectral minima tracking in subbands*, in Proc. Eurospeech (1995), 1513-1516.

[EBU10] EBU/ETSI JTC Broadcast, *Digital audio broadcasting (DAB); transport of advanced audio coding (AAC) audio*, ETSI TS 102 563, European Broadcasting Union, May 2010.

[EBU12] *Digital radio mondiale (DRM); system specification*, ETSI ES 201 980, ETSI, June 2012.

[EH08] Jan S. Erkelens and Richards Heusdens, *Tracking of Nonstationary Noise Based on Data-Driven Recursive Noise Power Estimation*, Audio, Speech, and Language Processing, IEEE Transactions on 16 (2008), no. 6, 1112-1123.

[EM84] Y. Ephraim and D. Malah, *Speech enhancement using a minimum mean-square error short-time spectral amplitude estimator*, IEEE Trans. Acoustics, Speech and Signal Processing 32 (1984), no. 6, 1109-1121.

[EM85] *Speech enhancement using a minimum mean-square error log-spectral amplitude estimator*, IEEE Trans. Acoustics, Speech and Signal Processing 33 (1985), 443-445.

[Gan05] S. Gannot, *Speech enhancement: Application of the kalman filter in the estimate-maximize (em framework)*, Springer, 2005.

[HE95] H. G. Hirsch and C. Ehrlicher, *Noise estimation techniques for robust speech recognition*, Proc. IEEE Int. Conf. Acoustics, Speech, Signal Processing, no. pp. 153-156, IEEE, 1995.

[HHJ10] Richard C. Hendriks, Richard Heusdens, and Jesper Jensen, *MMSE based noise PSD tracking with low complexity*, Acoustics Speech and Signal Processing (ICASSP), 2010 IEEE International Conference on, March 2010, pp. 4266-4269.

[HJH08] Richard C. Hendriks, Jesper Jensen, and Richard Heusdens, *Noise tracking using dft domain subspace decompositions*, IEEE Trans. Audio, Speech, Lang. Process. 16 (2008), no. 3, 541-553.

[IET12] IETF, *Definition of the Opus Audio Codec*, Tech. Report RFC 6716, Internet Engineering Task Force, September 2012.

[ISO09] ISO/IEC JTC1/SC29/WG11, *Information technology—coding of audio-visual objects—part* 3*: Audio*, ISO/IEC IS 14496-3, International Organization for Standardization, 2009.

[ITU03] ITU-T, *Wideband coding of speech at around* 16 *kbit/s using adaptive multi-rate wideband* (*amr-wb*), Recommendation ITU-T G.722.2, Telecommunication Standardization Sector of ITU, July 2003.

[ITU05] *Low-complexity coding at* 24 *and* 32 *kbit/s for hands-free operation in systems with low frame loss*, Recommendation ITU-T G.722.1, Telecommunication Standardization Sector of ITU, May 2005.

[ITU06a] *G.*722 *Appendix III: A high-complexity algorithm for packet loss concealment for G.*722, ITU-T Recommendation, ITU-T, November 2006.

[ITU06b] *G.*729.1*: G.*729*-based embedded variable bit-rate coder: An* 8-32 *kbit/s scalable wideband coder bitstream interoperable with g.*729, Recommendation ITU-T G.729.1, Telecommunication Standardization Sector of ITU, May 2006.

[ITU07] *G.*722 *Appendix IV: A low-complexity algorithm for packet loss concealment with G.*722, ITU-T Recommendation, ITU-T, August 2007.

[ITU08a] *G.*718*: Frame error robust narrow-band and wideband embedded variable bit-rate coding of speech and audio from* 8-32 *kbit/s*, Recommendation ITU-T G.718, Telecommunication Standardization Sector of ITU, June 2008.

[ITU08b] *G.*719*: Low-complexity, full-band audio coding for high-quality, conversational applications*, Recommendation ITU-T G.719, Telecommunication Standardization Sector of ITU, June 2008.

[ITU12] *G.*729*: Coding of speech at* 8 *kbit/s using conjugate-structure algebraic-code-excited linear prediction* (*cs-acelp*), Recommendation ITU-T G.729, Telecommunication Standardization Sector of ITU, June 2012.

[LS01] Pierre Lauber and Ralph Sperschneider, *Error concealment for compressed digital audio*, Audio Engineering Society Convention 111, no. 5460, September 2001.

[March01] Rainer Martin, *Noise power spectral density estimation based on optimal smoothing and minimum statistics*, IEEE Transactions on Speech and Audio Processing 9 (2001), no. 5, 504-512.

[March03] *Statistical methods for the enhancement of noisy speech*, International Workshop on Acoustic Echo and Noise Control (IWAENC2003), Technical University of Braunschweig, September 2003.

[MC99] R. Martin and R. Cox, *New speech enhancement techniques for low bit rate speech coding*, in Proc. IEEE Workshop on Speech Coding (1999), 165-167.

[MCA99] D. Malah, R. V. Cox, and A. J. Accardi, *Tracking speech-presence uncertainty to improve speech enhancement in nonstationary noise environments*, Proc. IEEE Int. Conf. on Acoustics Speech and Signal Processing (1999), 789-792.

[MEP01] Nikolaus Meine, Bernd Edler, and Heiko Purnhagen, *Error protection and concealment for HILN MPEG*-4 *parametric audio coding*, Audio Engineering Society Convention 110, no. 5300, May 2001.

[MPC89] Y. Mahieux, J.-P. Petit, and A. Charbonnier, *Transform coding of audio signals using correlation between successive transform blocks*, Acoustics, Speech, and Signal Processing, 1989. ICASSP-89, 1989 International Conference on, 1989, pp. 2021-2024 vo1.3.

[NMR+12] Max Neuendorf, Markus Multrus, Nikolaus Rettelbach, Guillaume Fuchs, Julien Robilliard, Jérémie Lecomte, Stephan Wilde, Stefan Bayer, Sascha Disch, Christian Helmrich, Roch Lefebvre, Philippe Gournay, Bruno Bessette, Jimmy Lapierre, Kristopfer Kjörling, Heiko Purnhagen, Lars Villemoes, Werner Oomen, Erik Schuijers, Kei Kikuiri, Toru Chinen, Takeshi Norimatsu, Chong Kok Seng, Eunmi Oh, Miyoung Kim, Schuyler Quackenbush, and Berndhard Grill, *MPEG Unified Speech and Audio Coding—The ISO/MPEG Standard for High-Efficiency Audio Coding of all Content Types*, Convention Paper 8654, AES, April 2012, Presented at the 132nd Convention Budapest, Hungary.

[PKJ+11] Nam In Park, Hong Kook Kim, Min A Jung, Seong Ro Lee, and Seung Ho Choi, *Burst packet loss concealment using multiple codebooks and comfort noise for celp-type speech coders in wireless sensor networks*, Sensors 11 (2011), 5323-5336.

[QD03] Schuyler Quackenbush and Peter F. Driessen, *Error mitigation in MPEG*-4 *audio packet communication systems*, Audio Engineering Society Convention 115, no. 5981, October 2003.

[RL06] S. Rangachari and P. C. Loizou, *A noise-estimation algorithm for highly non-stationary environments*, Speech Commun. 48 (2006), 220-231.

[SFB00] V. Stahl, A. Fischer, and R. Bippus, *Quantile based noise estimation for spectral subtraction and wiener filtering*, in Proc. IEEE Int. Conf. Acoust., Speech and Signal Process. (2000), 1875-1878.

[SS98] J. Sohn and W. Sung, *A voice activity detector employing soft decision based noise spectrum adaptation*, Proc. IEEE Int. Conf. Acoustics, Speech, Signal Processing, no. pp. 365-368, IEEE, 1998.

[Yu09] Rongshan Yu, *A low-complexity noise estimation algorithm based on smoothing of noise power estimation and estimation bias correction*, Acoustics, Speech and Signal Processing, 2009. ICASSP 2009. IEEE International Conference on, April 2009, pp. 4421-4424.

The invention claimed is:

1. An audio signal decoder for decoding an encoding of an audio signal, comprising:

a transform unit for transforming a second audio signal portion or a value or signal derived from the second audio signal portion from a second domain to a tracing domain to acquire a-second signal portion information, wherein the second domain is different from a first domain, wherein the tracing domain is different from the second domain, and wherein the tracing domain is equal to or different from the first domain, and a noise level tracing unit, wherein the noise level tracing unit is configured to receive a first signal portion information being represented in the tracing domain, wherein the first signal portion information depends on a first audio signal portion being represented in the first domain, wherein the noise level tracing unit is configured to receive the second signal portion being represented in the tracing domain, and wherein the noise level tracing unit is configured to determine noise level information depending on the first signal portion information being represented in the tracing domain and depending on the second signal portion information being represented in the tracing domain, wherein the noise level information is represented in the tracing domain, a reconstruction unit for obtaining the audio signal depending on the noise level information.

2. The audio signal decoder according to claim 1, wherein the first audio signal portion is represented in a time domain as the first domain, wherein the transform unit is configured to transform the second audio signal portion or the value derived from the second audio signal portion from an excitation domain being the second domain to the time domain being the tracing domain, wherein the noise level tracing unit is configured to receive the first signal portion information being represented in the time domain as the tracing domain, and wherein the noise level tracing unit is configured to receive the second signal portion being represented in the time domain as the tracing domain.

3. The audio signal decoder according to claim 1, wherein the first audio signal portion is represented in an excitation domain as the first domain, wherein the transform unit is configured to transform the second audio signal portion or the value derived from the second audio signal portion from a time domain being the second domain to the excitation domain being the tracing domain, wherein the noise level tracing unit is configured to receive the first signal portion information being represented in the excitation domain as the tracing domain, and wherein the noise level tracing unit is configured to receive the second signal portion being represented in the excitation domain as the tracing domain.

4. The audio signal decoder according to claim 1, wherein the first audio signal portion is represented in an excitation domain as the first domain, wherein the noise level tracing unit is configured to receive the first signal portion information, wherein said first signal portion information is represented in the FFT domain, being the tracing domain, and wherein said first signal portion information depends on said first audio signal portion being represented in the excitation domain, wherein the transform unit is configured to transform the second audio signal portion or the value derived from the second audio signal portion from a time domain being the second domain to an FFT domain being the tracing domain, and wherein the noise level tracing unit is configured to receive the second audio signal portion being represented in the FFT domain.

5. The audio signal decoder according to claim 1, wherein the apparatus further comprises a first aggregation unit for determining a first aggregated value depending on the first audio signal portion, wherein the apparatus further comprises a second aggregation unit for determining, depending on the second audio signal portion, a second aggregated value as the value derived from the second audio signal portion, wherein the noise level tracing unit is configured to receive the first aggregated value as the first signal portion information being represented in the tracing domain, wherein the noise level tracing unit is configured to receive the second aggregated value as the second signal portion information being represented in the tracing domain, and wherein the noise level tracing unit is configured to determine noise level information depending on the first aggregated value being represented in the tracing domain and depending on the second aggregated value being represented in the tracing domain.

6. The audio signal decoder according to claim 5, wherein the first aggregation unit is configured to determine the first aggregated value such that the first aggregated value indicates a root mean square of the first audio signal portion or of a signal derived from the first audio signal portion, and wherein the second aggregation unit is configured to determine the second aggregated value such that the second aggregated value indicates a root mean square of the second audio signal portion or of a signal derived from the second audio signal portion.

7. The audio signal decoder according to claim 1, wherein the transform unit is configured to transform the value derived from the second audio signal portion from the second domain to the tracing domain by applying a gain value on the value derived from the second audio signal portion.

8. The audio signal decoder according to claim 7, wherein the gain value indicates a gain introduced by Linear predictive coding synthesis, or wherein the gain value indicates a gain introduced by Linear predictive coding synthesis and deemphasis.

9. The audio signal decoder according to claim 1, wherein the noise level tracing unit is configured to determine noise level information by applying a minimum statistics approach.

10. The audio signal decoder according to claim 1, wherein the noise level tracing unit is configured to determine a comfort noise level as the noise level information.

11. The audio signal decoder according to claim 9, wherein the noise level tracing unit is configured to determine a comfort noise level as the noise level information derived from a noise level spectrum, wherein said noise level spectrum is acquired by applying the minimum statistics approach.

12. The audio signal decoder according to claim 1, wherein the noise level tracing unit is configured to determine a plurality of FFT coefficients indicating a comfort noise level as the noise level information.

13. The audio signal decoder according to claim 1, wherein the apparatus further comprises a long-term prediction unit comprising a delay buffer, and wherein the long-term prediction unit is configured to generate a processed signal depending on the first or the second audio signal portion, depending on a delay buffer input being stored in the delay buffer and depending on a long-term prediction gain.

14. The audio signal decoder according to claim 13, wherein the long-term prediction unit is configured to fade the long-term prediction gain towards zero, wherein a speed with which the long-term prediction gain is faded towards zero depends on a fade-out factor.

15. A method for decoding an encoding of an audio signal, wherein the method is conducted by an audio signal decoder, wherein the method comprises:

transforming, by a transform unit of the audio signal decoder, a second audio signal portion or a value or signal derived from the second audio signal portion from a second domain to a tracing domain to acquire a second signal portion information, wherein the second domain is different from a first domain, wherein the tracing domain is different from the second domain, and wherein the tracing domain is equal to or different from the first domain, and receiving, by a noise level tracing unit of the audio signal decoder, first signal portion information being represented in the tracing domain, wherein the first signal portion information depends on a first audio signal portion being represented in the first domain, receiving, by the noise level tracing unit of the audio signal decoder, the second signal portion information being represented in the tracing domain, determining, by the noise level tracing unit of the audio signal decoder, noise level information depending on the first signal portion information being represented in the tracing domain and depending on the second signal portion information being represented in the tracing domain, wherein the noise level information is represented in the tracing domain, and obtaining, by a reconstruction unit of the audio signal decoder, the audio signal depending on the noise level information.

16. A non-transitory computer-readable medium comprising a computer program for implementing the method of claim 15 when being executed on a computer or signal processor.

* * * * *